(12) United States Patent
Kondo

(10) Patent No.: US 7,865,065 B2
(45) Date of Patent: Jan. 4, 2011

(54) APPARATUS AND METHOD OF RECORDING INFORMATION ON A RECORDING MEDIUM

(75) Inventor: Tetsujiro Kondo, Tokyo (JP)

(73) Assignee: Sony Corporation, Tokyo (JP)

(*) Notice: Subject to any disclaimer, the term of this patent is extended or adjusted under 35 U.S.C. 154(b) by 2434 days.

(21) Appl. No.: 10/382,425

(22) Filed: Mar. 6, 2003

(65) Prior Publication Data

US 2003/0210890 A1 Nov. 13, 2003

(30) Foreign Application Priority Data

Mar. 8, 2002 (JP) ............................. 2002-064580

(51) Int. Cl.
*H04N 5/00* (2006.01)
*G11B 5/02* (2006.01)
(52) U.S. Cl. ........................................ 386/125; 360/55
(58) Field of Classification Search ................. None
See application file for complete search history.

(56) References Cited

U.S. PATENT DOCUMENTS

| 4,647,962 A | * | 3/1987 | Rosen et al. | 358/534 |
| 5,241,387 A | * | 8/1993 | Fujikawa et al. | 348/607 |
| 5,689,612 A | * | 11/1997 | Abe | 386/109 |
| 2001/0038746 A1 | * | 11/2001 | Hughes et al. | 386/123 |
| 2002/0171637 A1 | * | 11/2002 | Kadowaki et al. | 345/204 |

FOREIGN PATENT DOCUMENTS

| JP | 8-307896 | 11/1996 |
| JP | 8-329614 | 12/1996 |
| JP | 2000-69435 | 3/2000 |
| JP | 2001 23172 | 1/2001 |
| JP | 2001 285881 | 10/2001 |
| JP | 2001-320682 | 11/2001 |

* cited by examiner

*Primary Examiner*—Daniell L Negrón
(74) *Attorney, Agent, or Firm*—Frommer Lawrence & Haug LLP; William S. Frommer; Thomas F. Presson

(57) ABSTRACT

A semiconductor device having a plurality of data recording areas is provided. The semiconductor device includes an input port that receives basic information; an additive data recording area on which additive data serving as information additive to the basic information is recorded; a processing unit which encodes the basic information based on the basic information and the additive data; and a calculation data recording area on which calculation data encoded by the processing unit is recorded such that the calculation data encoded by the processing unit is at a quality level higher than that of the basic information. The processing unit controls the additive data recording area in response to classifying the received basic information on the basis of a class classification adaptive processes.

16 Claims, 33 Drawing Sheets

FIG. 2
ST101
"BASIC DATA" AND "ADDITIVE DATA" ARE STORED IN RECORDING MEDIUM, AND REPRODUCED DATA IS OUTPUT WITH ADDITIVE DATA IMPARTING VALUE TO BASIC DATA
ST102
AMOUNT OF DATA IS INCREASED IF REPRODUCED DATA IS RECORDED AS ORDINARY DATA
ST103
UNAUTHORIZED COPING IS PREVENTED, AND WILLINGNESS TO BUY IS PROMOTED

APPARATUS AND METHOD OF RECORDING INFORMATION ON A RECORDING MEDIUM

BACKGROUND OF THE INVENTION

1. Field of the Invention

The present invention relates to a semiconductor device for use as a recording medium for recording information signals such as a video signal and music signal.

2. Description of the Related Art

Recording media for recording video signals, music signals, computer program, and the like have been proposed. One of the recording media is a semiconductor device (a semiconductor memory device).

Information signal recorded on the recording medium may be digital data or analog data.

The information signal recorded on the recording medium such as the semiconductor device is easily copied to another recording medium in the digital form thereof.

Unlike analog data, the digital data is not degraded in the quality of video and sound when the copied digital data is reproduced. When the reproduced digital data is used on a computer, the computer works on the reproduced digital data at the same error free level as on the original digital data. In other words, the copied digital data has the same value and the same quality as the original digital data.

However, if data is copied without involving any degradation in value and quality, there is a possibility that a copyright of original digital data is not sufficiently protected.

When a recording medium having authorized digital data recorded thereon is sold in an authorized manner, the price thereof contains a charge for using the recorded digital data, namely, a copyright fee. The copyright is protected if the charge for the digital data is paid to the copyright holder thereof. If the digital data copied without permission of the copyright holder has the same value and the same quality as the original-digital data, persons may not bother to buy a standard recording medium having the price containing the charge, but may buy and use a low-priced recording medium having unauthorized copied digital data. The copyright holder of the digital data suffers from the loss of copyright fee corresponding to the number of persons who actually own the recording medium having the digital data recorded thereon and the number of uses of the recording medium.

There is a need for a recording medium which is free from easy data copying to protect the copyright holder from copyright violation.

SUMMARY OF THE INVENTION

Accordingly, it is an object of the present invention to provide a recording medium from which data copying is difficult.

In one aspect of the present invention, a semiconductor device having a plurality data recording areas, includes an input port receiving basic information, an additive data recording area on which additive data serving as information additive to the basic information is recorded, a processing unit which encodes the basic information based on the basic information and the additive data, and a calculation data recording area on which calculation data encoded by the processing unit is recorded, wherein the calculation data encoded by the processing unit is at a quality level higher than the basic information.

Since the calculation data is at a quality level higher than the basic information in the above arrangement, the calculation data is larger in an amount of information than the basic data. If an attempt to record the calculation data on a disk type recording medium in the original form thereof, a large amount of recording medium is required.

In another aspect of the present invention, a semiconductor device having a plurality data recording areas includes an input port receiving basic data into which basic information is encoded, a basic data recording area on which the basic data is recorded, an additive data recording area on which additive data serving as information additive to the basic information is recorded, a processing unit which performs a calculation process based on the basic data and the additive data, and an output port which outputs calculation data obtained as a result of the calculation process of the processing unit, wherein the calculation data calculated by the processing unit is at a quality level higher than the basic information.

Since the calculation data is at a quality level higher than the basic information in this arrangement, the calculation data is larger in an amount of information than the basic data. If an attempt to record the calculation data on a disk type recording medium in the original form thereof, a large amount of recording medium is required.

BRIEF DESCRIPTION OF THE DRAWINGS

FIG. 2 is a flow diagram illustrating a copying operation of the semiconductor device;

DESCRIPTION OF THE PREFERRED EMBODIMENTS

The embodiments of the present invention are discussed with reference to the drawings.

A semiconductor device of the present invention, which is used as a recording medium, includes a first recording area for recording basic data, and a second recording area for recording additive data serving as information additive to the basic data. Information is reproduced by performing a predetermined process based on the basic data read from the first recording area and the additive data read from the second recording area in the semiconductor device.

Figure 1:
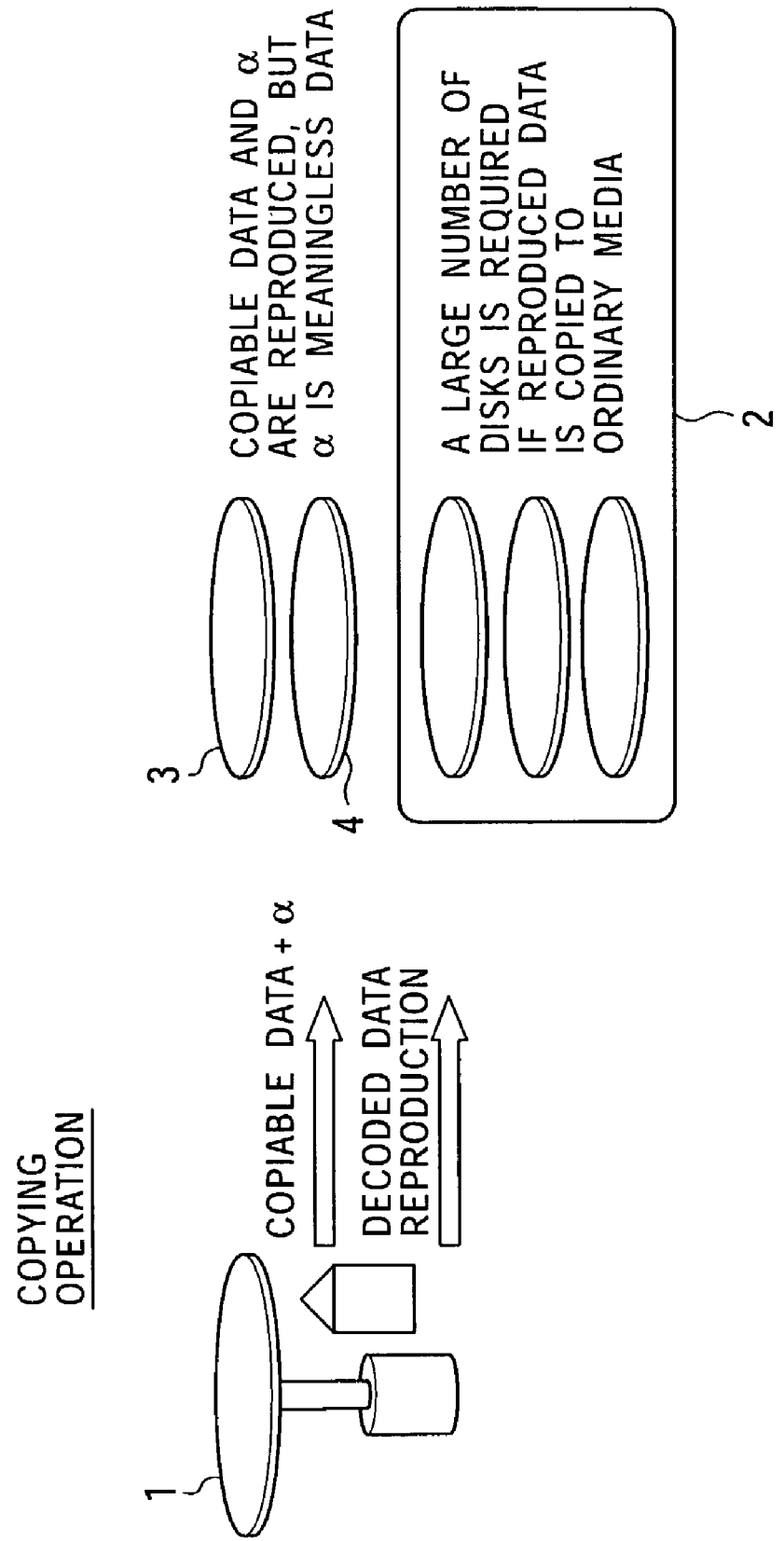
FIG. 1 is a perspective view illustrating a semiconductor device of the present invention.

The reproduced information is at a higher quality level than basic information that is reproduced from only the basic data stored in the first recording area. The reproduced information is larger in amount of information than the basic information. The reproduced information is larger in amount than the total amount of information of the basic information and the additive information used to generate the reproduced information. As shown in FIGS. 1 and 2, information is reproduced from a semiconductor device (step ST101 in FIG. 2). When the reproduced information is recorded as data, a semiconductor device having a capacity larger than the original semiconductor device, or a recording medium having a number of disk recording media are required (step ST102 in FIG. 2).

In the semiconductor device, each of the basic data and additive data is read in a "predetermined process" from the semiconductor device only when the basic data and additive data, associated with each other in a predetermined relationship, are recorded in a predetermined recording method.

Only the basic data in the semiconductor device is copiable to a semiconductor device 3 having a capacity substantially identical to that of the original semiconductor device. Basic information reproduced from the basic data only is lower in quality than basic information reproduced using the additive data. It is also possible to copy the additive data only in the semiconductor device to a semiconductor device 4 having a capacity substantially identical to that of the original semiconductor device. However, a meaningful information reproduction cannot be performed with the additive data only.

If the content of the "predetermined process" for reproducing information based on the basic data and additive data is set to be private, and difficult to analyze, it is extremely difficult to copy the information stored in the semiconductor device to another semiconductor device in a complete form. Recording the reproduced data obtained as a result of reproduction of information from the semiconductor device is complex and inconvenient because the recording medium 2 such as a large-capacity semiconductor device or a number of disk-like media is required.

Figure 3:
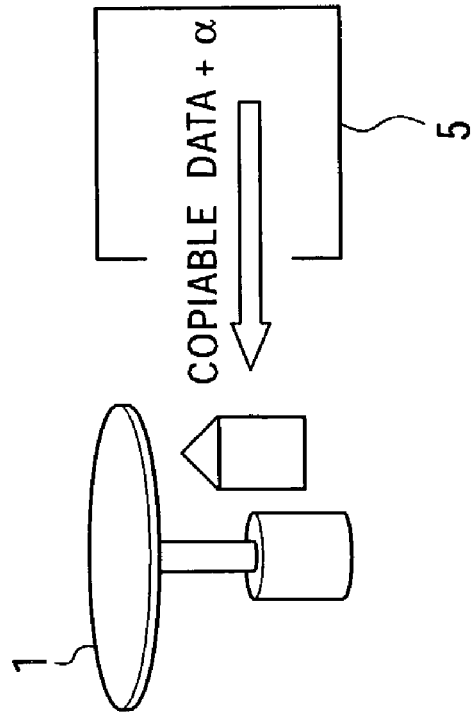
FIG. 3 is a perspective view illustrating a downloading operation of the semiconductor device for downloading data therefrom.

By setting the copying of recorded information to another semiconductor device to be difficult, a semiconductor device free from "unauthorized copying" results (step ST103 in FIG. 3). This is one of the objects of the present invention.

The basic information in the semiconductor device includes video information, audio information, and computer programs. The additive information includes information intended to improve qualities of the video information and the audio information reproduced from the basic data, for example, information intended to improve image quality and audio quality. The additive information may be coefficient data that is generated in a "class classification adaptive process" to be discussed later and is used in a signal processing, or coefficient type data that is used to generate the coefficient data. The "class classification adaptive process" may be carried out by a processing unit to be discussed later. In the "class classification adaptive process", the additive information is considered as predetermined coefficient information to perform calculations on the basic data such as video data.

A difference between the reproduced information and the basic information, namely, the content of high quality is a high spatial resolution or an addition of diversity of pieces of additive information.

Figure 4:
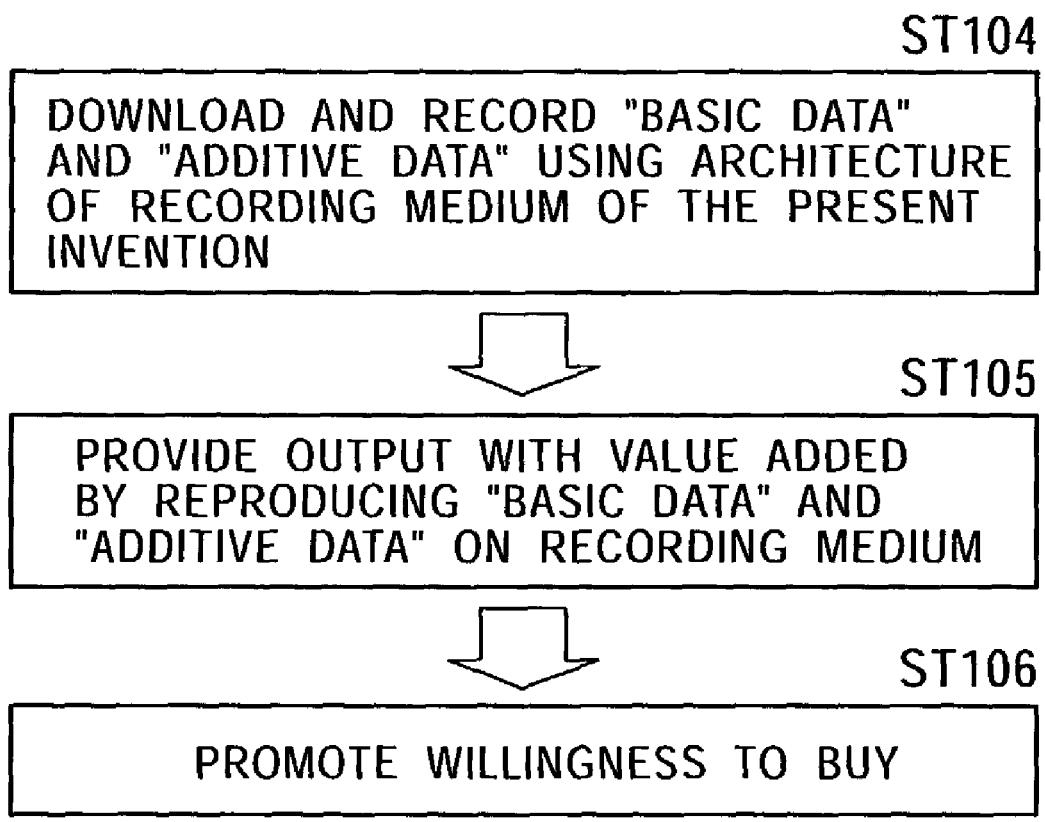
FIG. 4 is a flow diagram illustrating the downloading operation of the semiconductor device.

Referring to FIGS. 3 and 4, the basic data and additive data may be the ones that are acquired (downloaded) through an information network 5 using a public telephone line, such as the Internet and are recorded in the semiconductor device of the present invention (step ST104 in FIG. 4). The basic data and additive data are recorded in a predetermined relationship therebetween in the semiconductor device 1 using a predetermined recording method so that the basic data and additive data are read in a state that permits the "predetermined process" (step ST105 in FIG. 4). Since the semiconductor device of the present invention is protected from unauthorized copying, users may be willing to purchase standard recording media (step ST106 in FIG. 2).

The features of the semiconductor device of the present invention are common to all embodiments of the present invention to be discussed below.

First Embodiment of the Semiconductor Device

Figure 5:
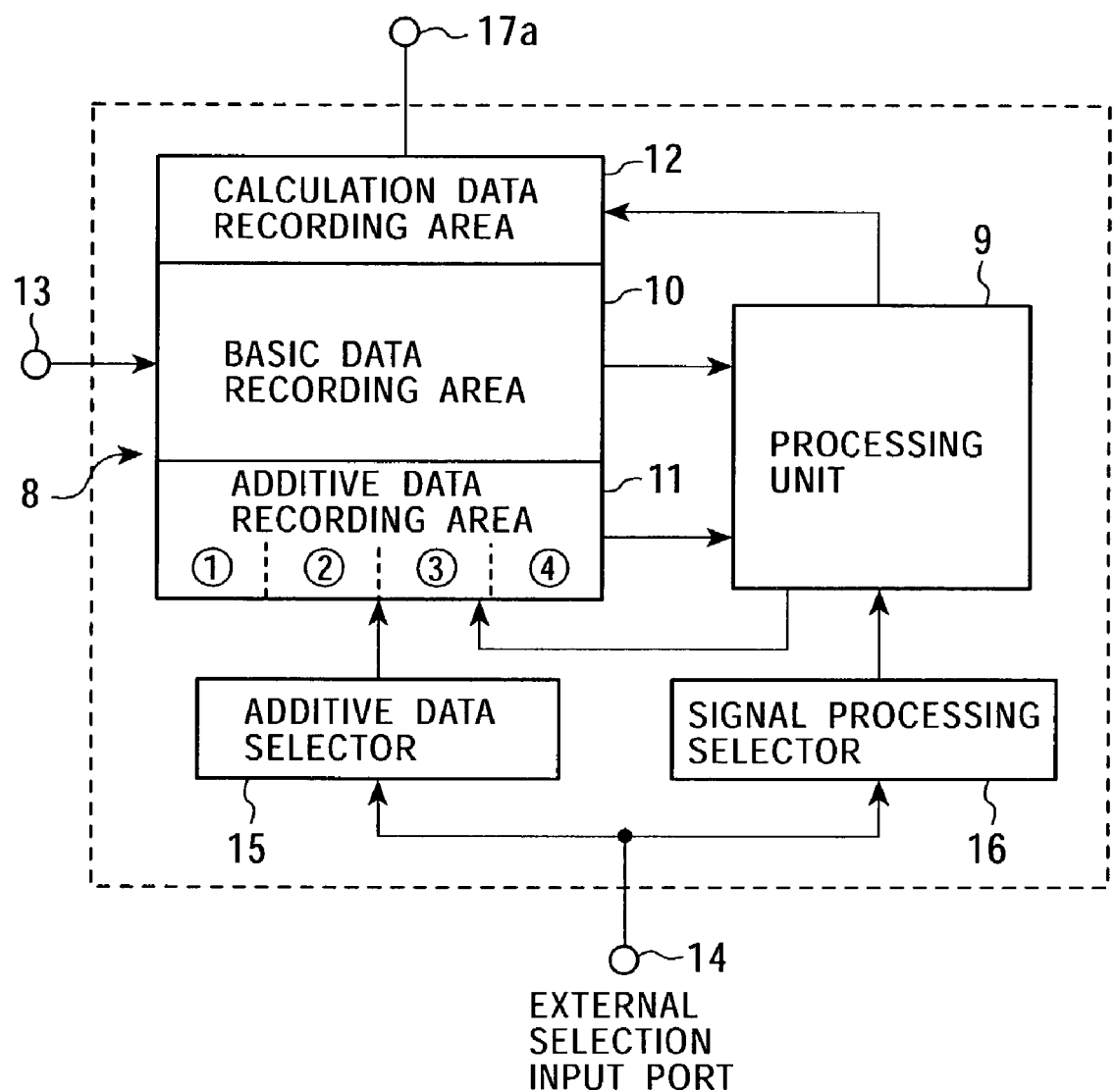
FIG. 5 is a block diagram illustrating the construction of a semiconductor device in accordance with a first embodiment of the present invention.

The semiconductor device of the present invention includes a data recording region 8 and a processing unit 9 as shown in FIG. 5. The data recording region 8 includes a plurality of data recording areas. Specifically, the data recording region 8 includes a basic data recording area 10 for recording basic information input through an input port 13, an additive data recording area 11 for recording additive data serving as information additive to the basic information, and a calculation data recording area 12 for recording calculation data encoded by the processing unit 9.

In the semiconductor device, the basic information, input from the input port 13, is stored in the basic data recording area 10. The processing unit 9 performs a predetermined process based on the basic data and the additive data recorded in the additive data recording area 11. A selection of additive data and a selection of a signal processing, carried by the processing unit 9, are respectively controlled by an additive value selector 15 and an signal processing selector 16 in response to an external selection signal input from an external selection input port 14.

Figure 6:
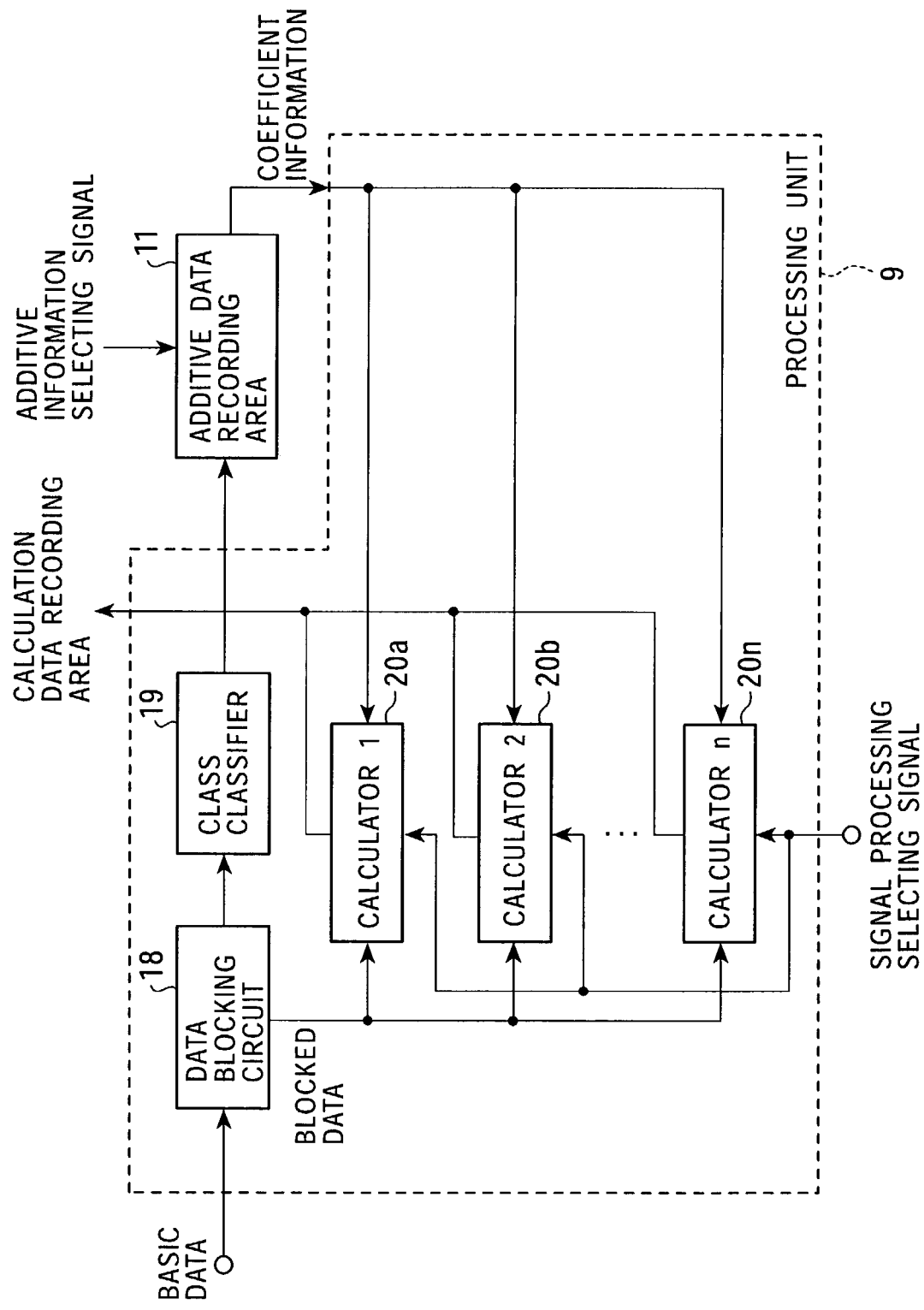
FIG. 6 is a block diagram illustrating a major portion of the semiconductor device.

The processing unit 9 performs a "class classification adaptive process" to be discussed later. As shown in FIG. 6, the processing unit 9 includes a data blocking circuit 18 for organizing the basic data into data blocks. The basic data in blocks output from the data blocking circuit 18 is sent to a class classifier 19, while being sent to first through n-th calculators 20*a*, 20*b*, . . . , 20*n* at the same time. The class classifier 19 class classifies the blocked basic data, thereby controlling the additive data recording area 11 in the data recording region 8 in response to the class classification result. Predetermined additive data is sent to the calculators 20*a*, 20*b*, . . . , 20*n* from the additive data recording area 11 under the control of the class classifier 19 and the control of the additive information selector 15 responding to an external selection signal. The calculator the signal processing selector 16 has selected from among the calculators 20*a*, 20*b*, . . . , 20*n* in response to the external selection signal performs calculations on the blocked basic data with the sent additive data serving as a coefficient, and sends resulting calculation data to the calculation data recording area 12 in the data recording region 8.

The calculation data accumulated in the calculation data recording area 12 is externally output through an output port 17*a* connected to the calculation data recording area 12.

In the "class classification adaptive process", the blocked basic data is class classified, and additive data corresponding to a resulting class is used as a coefficient. The content of the process will be discussed later. The calculation data output from the processing unit 9 is at a higher quality level than the basic information.

In the semiconductor device, the basic information may be video information. The calculation data may be video data corresponding to data higher in resolution than the basic information, or video data corresponding to data higher in tonal gradation than the basic information. The calculation data may be video data corresponding to the basic information with noise removed therefrom. The calculation data may be video data corresponding to data improved from the basic information in time resolution. For example, to improve the video signal in resolution, resolution is selected in response to information input to the external selection input port 14. The additive data corresponding to each of these function is used.

The processing unit 9 selects the additive data by detecting a predetermined feature of the basic information. The features of the basic data detected by the processing unit 9 include an amount of motion of an image. The processing unit 9 thus reads a coefficient corresponding to the amount of motion of the image.

The calculation data may be data corresponding to information relating to a vibration caused by an external vibrator. The calculation data may be data corresponding to information relating to a volume of audio sound reproduced by an external audio reproducer. The calculation data may be data corresponding to information of a flow of air caused by an external blower. In this way, the signal processing of the processing unit 9 may be different depending on a variety of applications.

Second Embodiment of the Semiconductor Device

Figure 7:
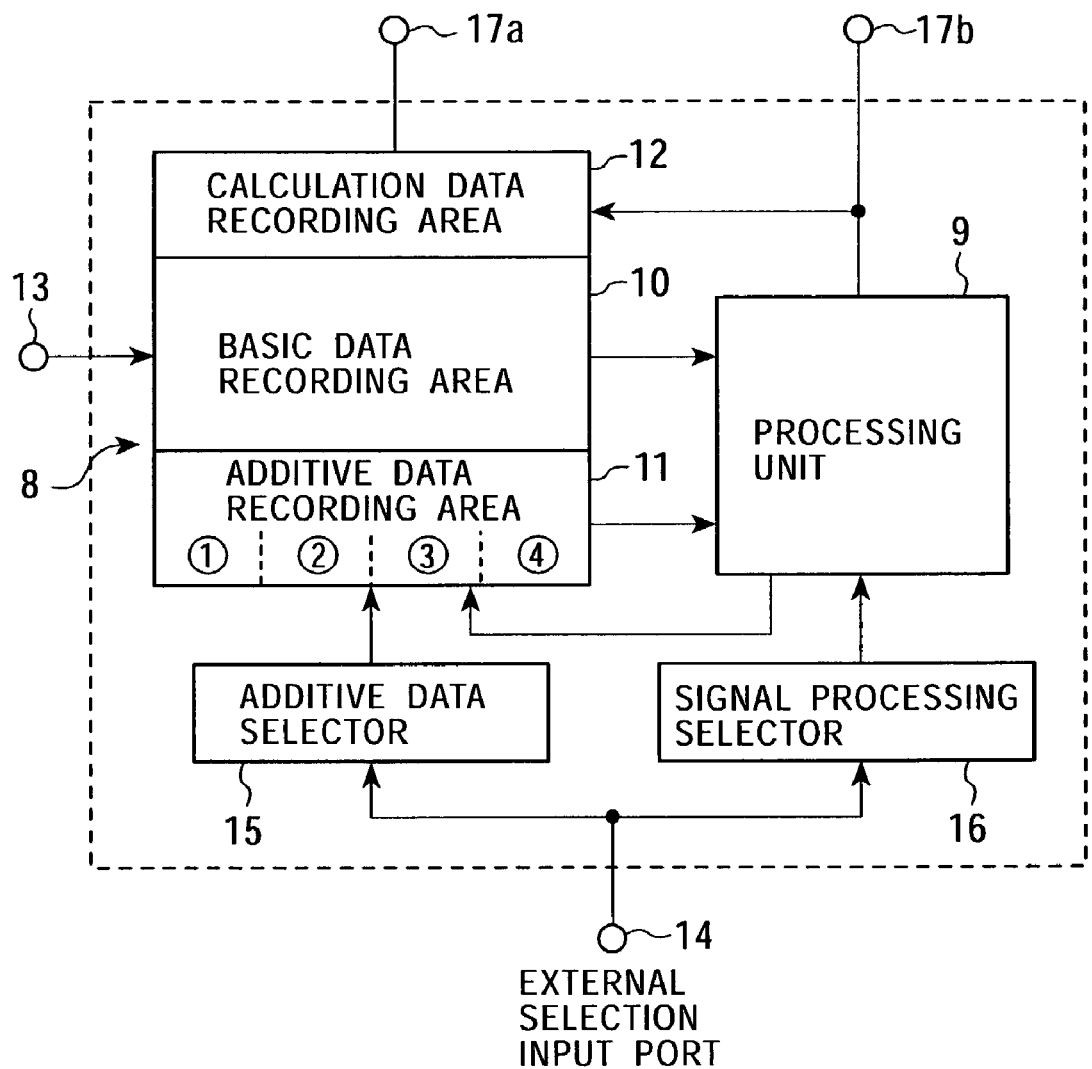
FIG. 7 is a block diagram illustrating the construction of a second embodiment of the present invention.

Like the above-referenced semiconductor device, a semiconductor device shown in FIG. 7 may include a data recording region 8, processing unit 9, input port 13 for receiving the basic data, and output port 17*b* for outputting directly externally the calculation data obtained through the calculation process of the processing unit 9. The input port 13 may receive already encoded basic data from the outside. An encoder for encoding the basic information into the basic data may be arranged in front of the input port 13 as a pre-stage unit.

The calculation data obtained through the calculation process of the processing unit 9 is directly output to the outside through the output port limb without being stored in the calculation data recording area 12. Each time the calculation data is required, the process of the processing unit 9 is carried out in this semiconductor device immediately before the calculation data is output. The operation and the content of this semiconductor device remain unchanged from those of the semiconductor device of the first embodiment.

Class Classification Adaptive Process

The "class classification adaptive process" carried out in the above-mentioned reproducer and semiconductor device will now be discussed. The discussion that follows focuses on the class classification adaptive process which is performed on video signal. Also in the following discussion, a SD (Standard Definition) signal corresponds to the basic data. An HD (High Definition) signal higher in resolution than the SD signal is obtained using the SD signal and the additive data in the class classification adaptive process.

The basic data is here the data that is recorded on and read from the semiconductor device. Coefficient data is generated by a coefficient generator. In accordance with the present invention, the coefficient data, generated by the coefficient generator and then recorded onto the semiconductor device, is read during use.

In accordance with the present invention, the basic data is recorded on the semiconductor device, and also "coefficient type data" to be discussed later is recorded on the semiconductor device. During a reproduction operation, the coefficient data is generated from the "coefficient type data" (additive data).

Figure 8:
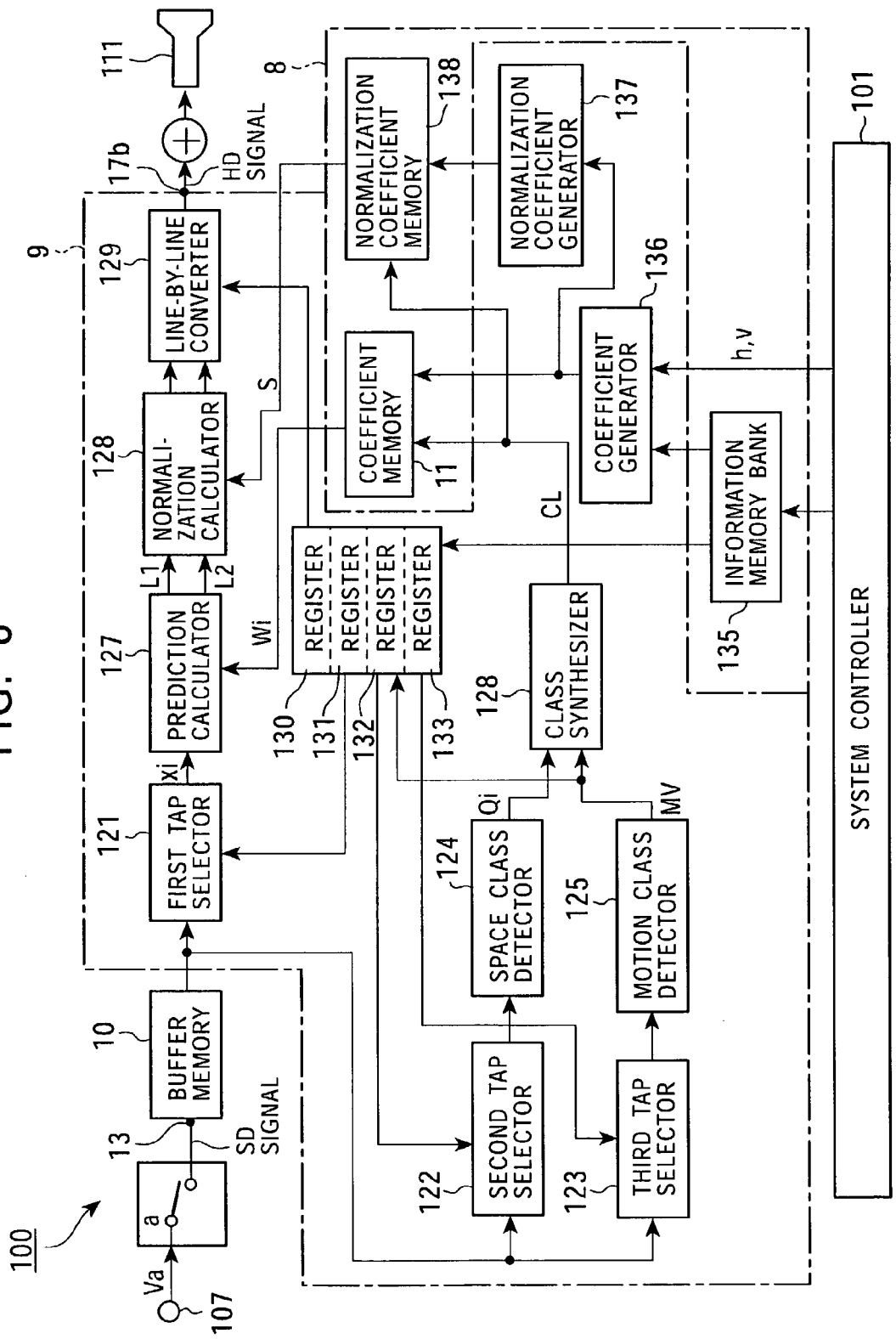
FIG. 8 is a block diagram illustrating a reproducing apparatus for performing a class classification adaptive process.

A conversion of the SD signal into the HD signal in the "class classification adaptive process" is discussed below. In the class classification adaptive process as shown in FIG. 8, a space class and motion class are detected from pixel data of a tap corresponding to a target pixel in the HD signal selectively picked out from the SD signal, and a class code CL representing the class of the target pixel in the HD signal is obtained. Additive data of each class is generated, and is then stored in a coefficient memory 11 contained in the data recording region 8. The coefficient memory 11 corresponds to the additive data recording area 11.

An estimation prediction calculator 127 calculates pixel data of a target pixel of the HD signal using an estimation equation, based on data xi of a tap corresponding to the target pixel in the HD signal selectively picked out from the SD signal by a first tap selector 121, and additive data Wi read according to the class code CL from the coefficient memory 11. A memory bank 135 stores coefficient type data of each class.

The class classification adaptive process is discussed below with reference to the drawings. Referring to FIG. 8, a reproducer 100 for performing the class classification adaptive process acquires a 525*i* signal as the SD (Standard Definition) signal, i.e., the basic data read from the semiconductor device, converts the 525*i* signal into a 525*p* signal or a 1050*i* signal as the HD (High Definition) signal, and displays an image of the 525*p* signal or the 1050*i* signal.

The 525*i* signal refers to an interlaced video signal having 525 lines, the 525*p* signal refers to a progressive video signal (non-interlaced video signal) having 525 lines, and the 1050*i* signal refers to an interlaced video signal having 1050 lines.

The reproducer 100 includes a system controller 101 having a microcomputer for controlling the operation of the entire system of the reproducer.

The reproducer 100 includes an input port 107 receiving a SD signal Va (525*i* signal), and a buffer memory 10, corresponding to the basic data recording area 10, for storing temporarily the SD signal Va, which is input through the input port 13. The reproducer 100 includes a processing unit 9 which converts the SD signal (525*i* signal), temporarily stored in the buffer memory 10, into the HD signal (one of the 525*p* signal and 1050*i* signal). The image of the HD signal, output from the processing unit 9 through the output port 17*b*, is presented on a display 111. The display 111 may be a CRT (Cathode-Ray Tube), or a flat-panel display such as an LCD (Liquid-Crystal Display).

The SD signal (525*i* signal) input through the input port 107 is temporarily stored in the buffer memory 10. The SD signal, temporarily stored in the buffer memory 10, is then fed to the processing unit 9 to be converted into the HD signal (one of the 525*p* signal and 1050*i* signal). In other words, the processing unit 9 obtains pixel data forming the HD signal (hereinafter referred to as "HD pixel data") from the pixel data forming the SD signal (hereinafter referred to as "SD pixel data"). The HD signal output from the processing unit 9 is fed to the display 111. The display 111 presents an image of the HD signal on the screen thereof.

The processing unit 9 will now be detailed with reference to FIG. 8. The processing unit 9 includes first through third tap selectors 121 through 123 which selectively pick out data of a plurality of SD pixels located in the vicinity of a target pixel of the HD signal (one of the 525*p* signal and 1050*i* signal) from the SD signal (the 525*i* signal) stored in the buffer memory 10.

The first tap selector 121 selectively picks out data of a SD pixel for use in prediction (referred to as a "predictive tap"). The second tap selector 122 selectively picks out data of a SD pixel for use in a class classification corresponding to a level distribution pattern of the SD pixels (referred to as a "space class tap"). The third tap selector 123 selectively picks out data of a SD pixel for use in a class classification corresponding to a motion (referred to as a "motion class tap").

When the space class is determined using the SD pixel data belonging to a plurality of fields, the space class also contains motion information.

Figure 9:
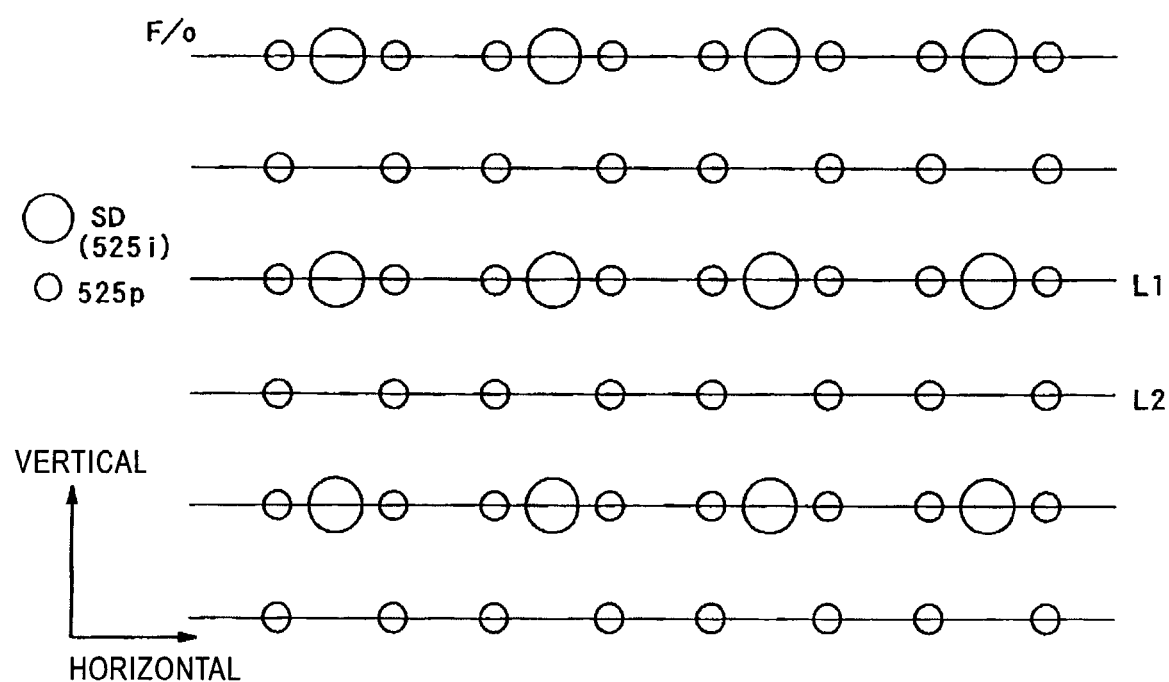
FIG. 9 illustrates a pixel positional relationship between a 525$i$ signal and 525$p$ signal.

FIG. 9 illustrates a pixel positional relationship of an odd field (o) of a given frame (F) in the 525*i* signal and 525*p* signal. Large circles represent pixels of the 525*i* signal, and small circles represent pixels for the output 525*p* signal. In an even field (e), lines of the 525*i* signal are spatially shifted by 0.5 line. As seen from FIG. 9, the pixel data of the 525*p* signal includes line data L1 at the same line as the 525*i* signal, and line data L2 at an intermediate position between two adjacent lines of the 525*i* signal. The number of pixels at each line of the 525*p* signal is twice the number of pixels at each line of the 525*i* signal.

Figure 10:
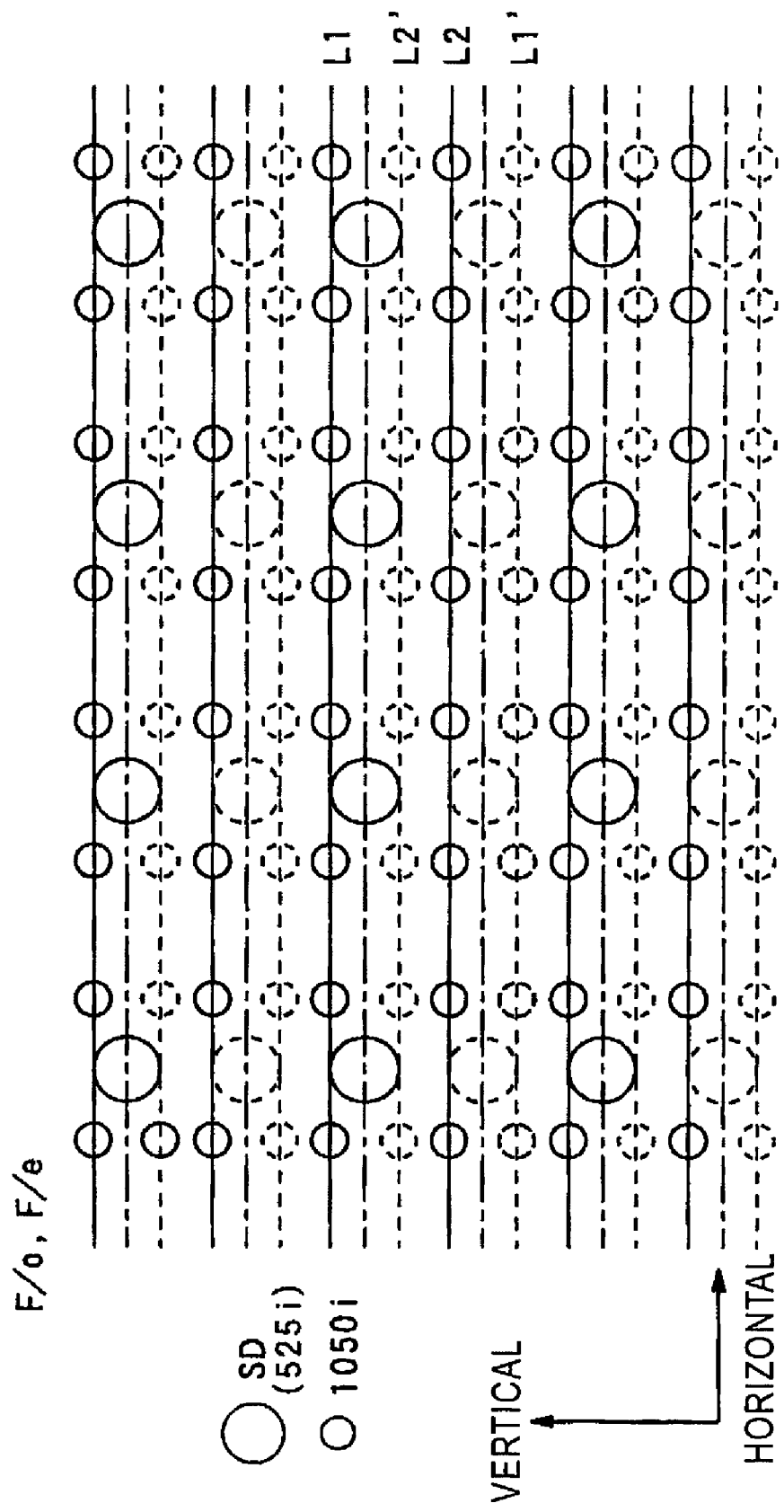
FIG. 10 illustrates a pixel positional relationship between a 525$i$ signal and 1050$i$ signal.

FIG. 10 illustrates a pixel positional relationship of a given frame (F) of the 525*i* signal and 1050*i* signal. The pixel position of the odd (o) field is represented by solid lines, and the pixel position of the even (e) field is represented by broken lines. Large circles represent pixels of the 525*i* signal, and small circles represent pixels of the output 1050*i* signal. As seen from FIG. 10, the pixel data of the 1050*i* signal contains line data L1 and L1' at positions close to the lines of the 525*i* signal, and line data L2 and L2' at positions far from the lines of the 525*i* signal. Here, L1 and L2 represent line data at the odd field, and L1' and L2' represent line data at the even field. The number of pixels per line in the 1050*i* signal is twice as large as the number of pixels per line in the 525*i* signal.

Figure 11:
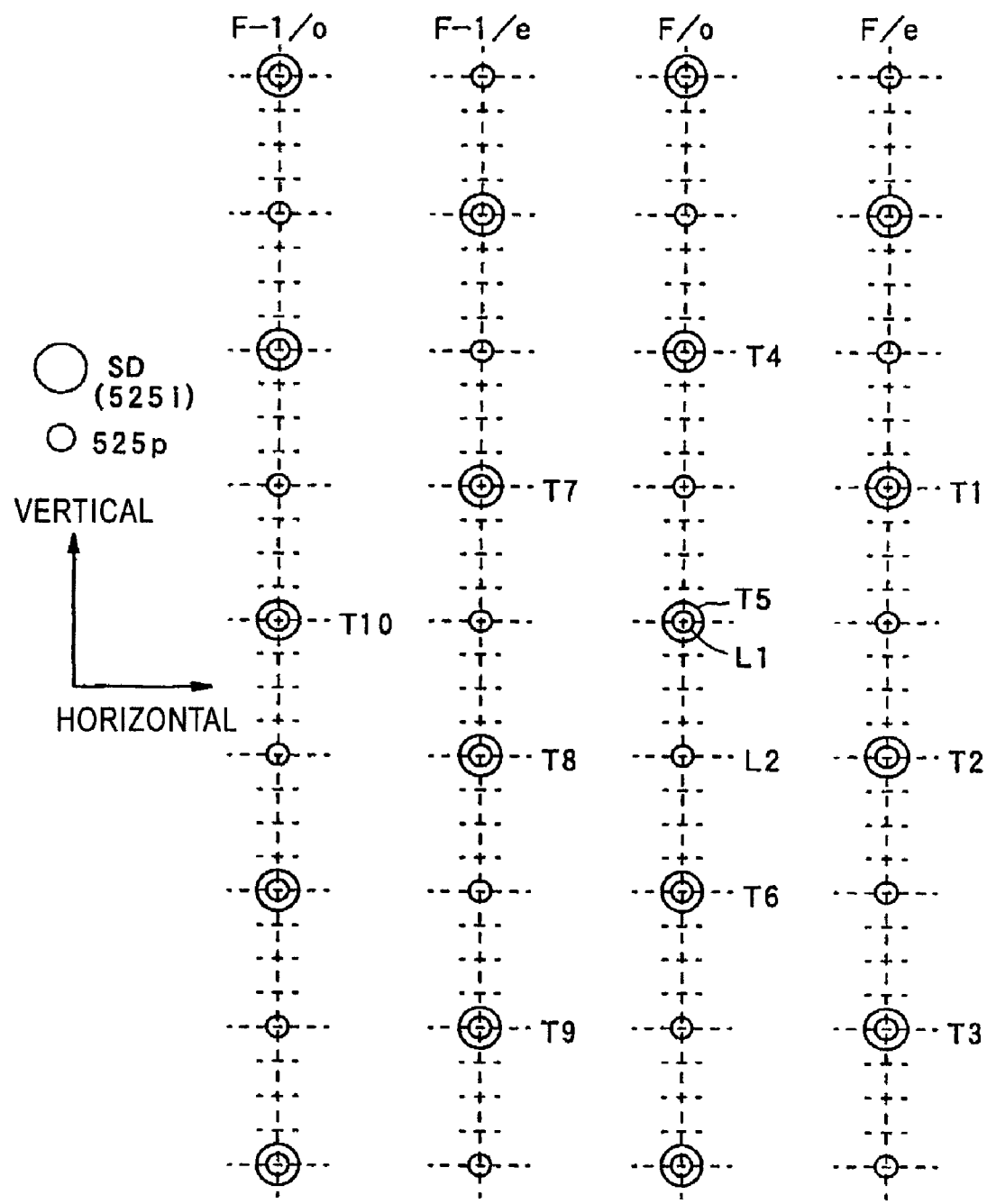
FIG. 11 illustrates a pixel positional relationship between a 525$i$ signal and 525$p$ signal, and a predictive tap.
Figure 12:
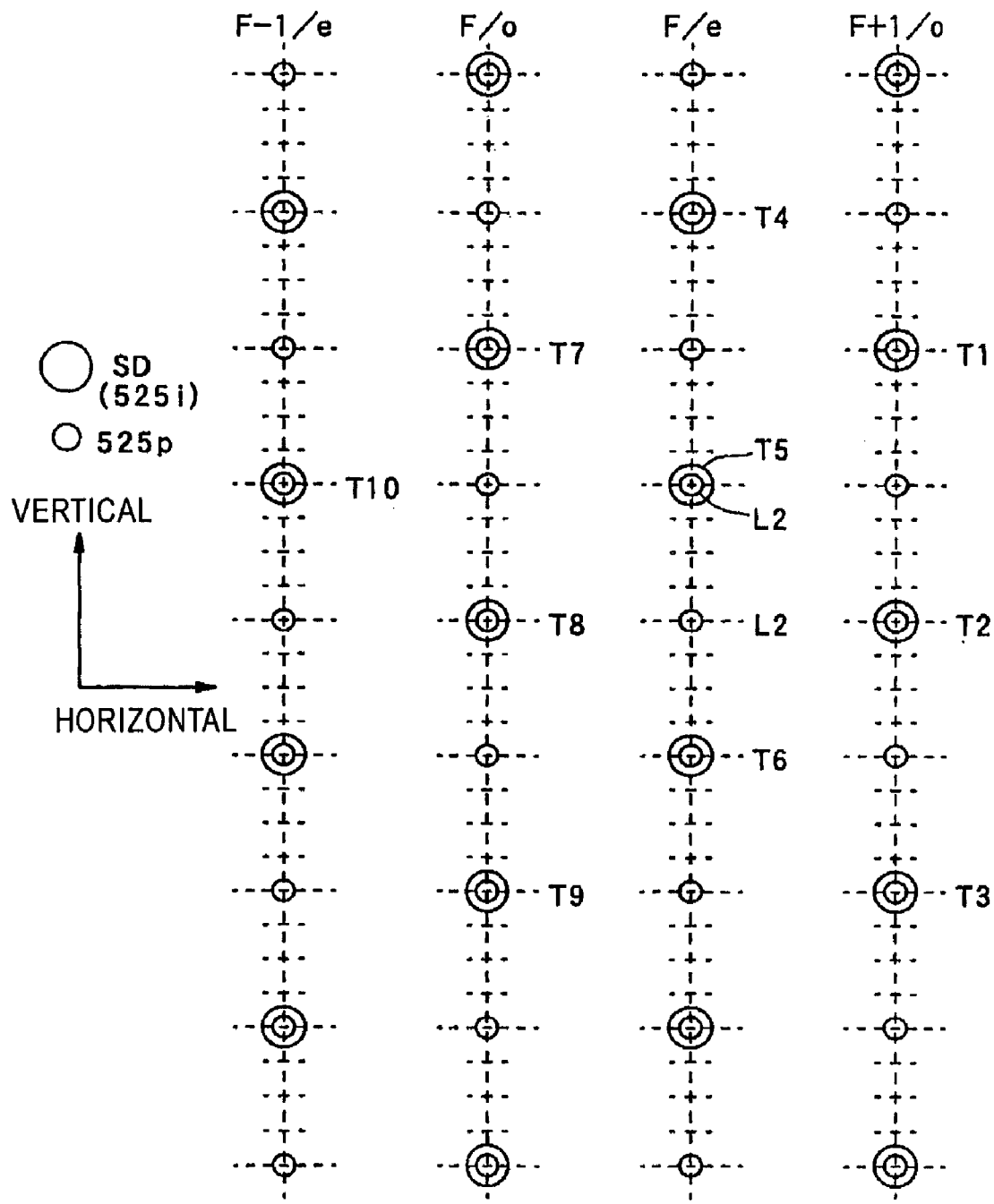
FIG. 12 illustrates a pixel positional relationship between a 525$i$ signal and 525$p$ signal, and a predictive tap.

FIGS. 11 and 12 illustrate predictive taps (SD pixels) selected by the first tap selector 121 when the 525*i* signal is converted into the 525*p* signal. FIGS. 11 and 12 illustrate the pixel positional relationship in a vertical direction of even (e) and odd (o) fields of frames F−1, F, F+1 consecutive in time.

Referring to FIG. 11, predictive taps for predicting the line data L1 and L2 of a field F/o are SD pixels T1, T2, and T3, contained in a next field F/e, spatially close to a pixel of the 525*p* signal to be produced (a target pixel), SD pixels T4, T5, and T6, contained in the field F/o, spatially close to a pixel of the 525*p* signal to be produced, SD pixels T7, T8, and T9, contained in a preceding field F−1/e, spatially close to a pixel of the 525*p* signal to be produced, and an SD pixel T10, contained in a preceding field F−1/o, spatially close to the pixel of the 525*p* signal to be produced.

Referring to FIG. 12, predictive taps for predicting the line data L1 and L2 of the field F/e are SD pixels T1, T2, and T3, contained in a next field F+1/o, spatially close to a pixel of the 525*p* signal to be produced, SD pixels T4, T5, and T6, contained in the field F/e, spatially close to the pixel of the 525*p* signal to be produced, SD pixels T7, T8, and T9, contained in the preceding field F/o, spatially close to the pixel of the 525*p* signal to be produced, and an SD pixel T10, contained in the preceding field F−1/e, spatially close to the pixel of the 525*p* signal to be produced.

When the line data L1 is predicted, the SD pixel T9 may be excluded from being selected as a predictive tap. When the line date L2 is predicted, the SD pixel T4 may be excluded from being selected as a predictive tap.

Figure 13:
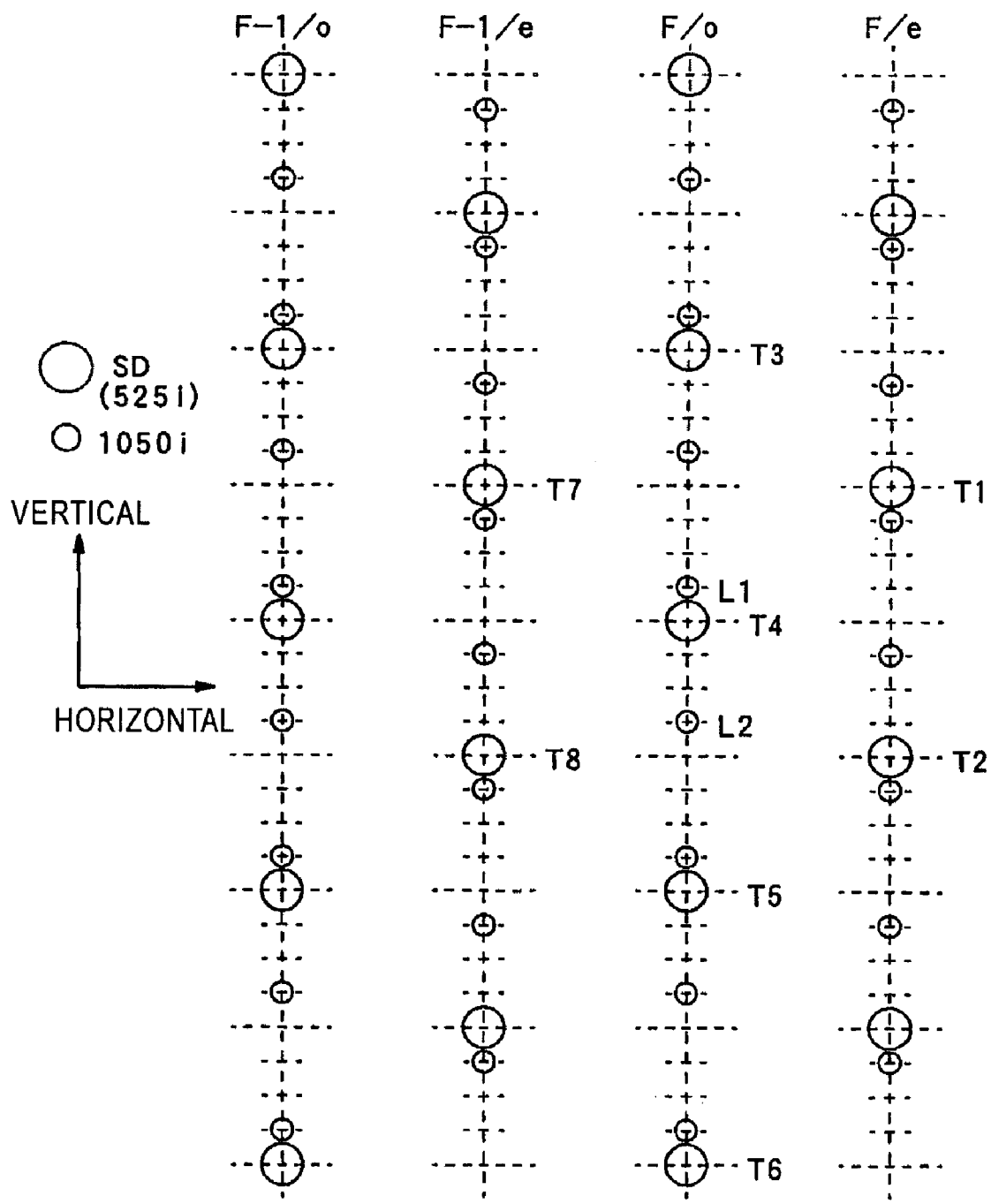
FIG. 13 illustrates a pixel positional relationship between a 525$i$ signal and 1050$i$ signal, and a predictive tap.
Figure 14:
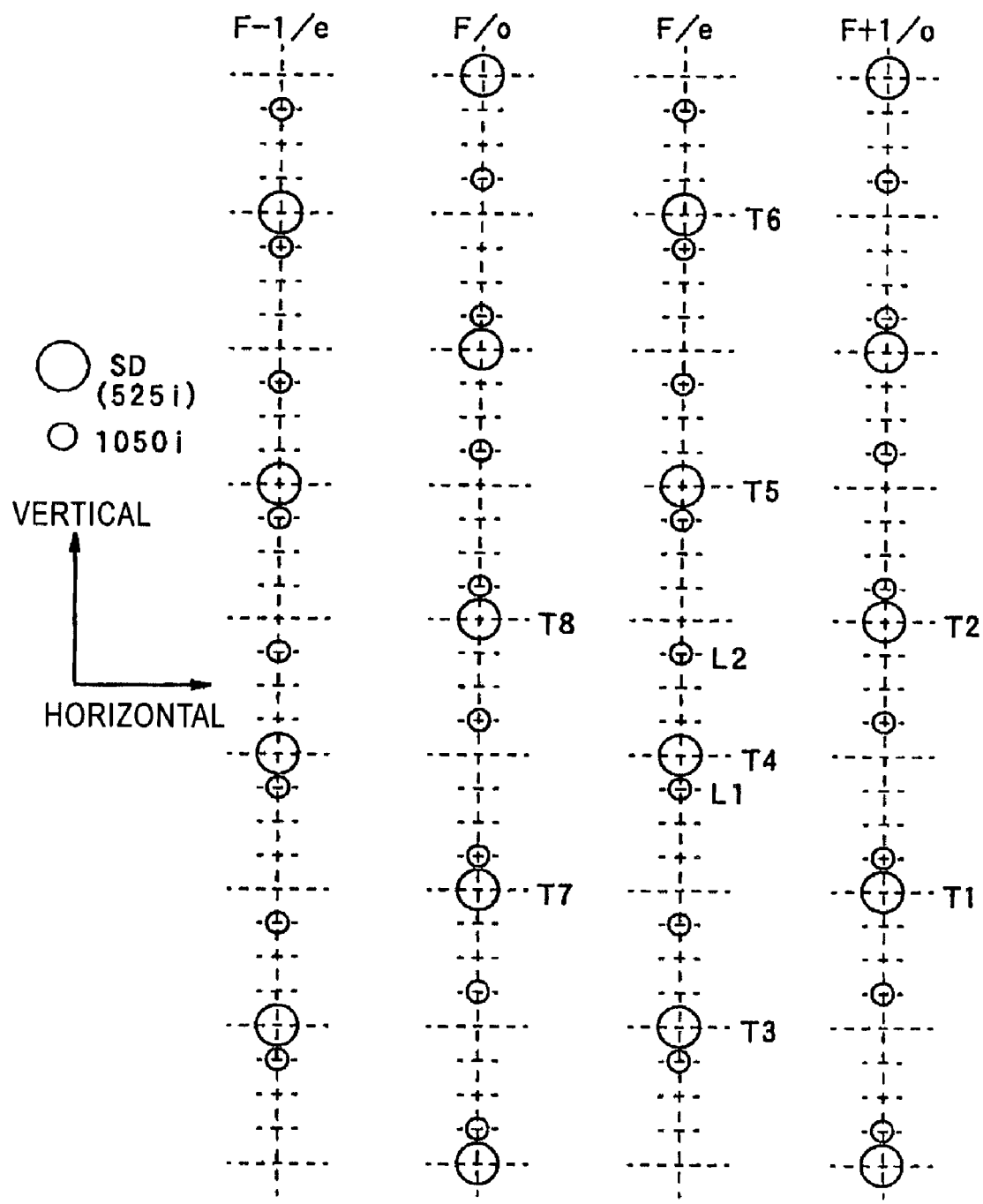
FIG. 14 illustrates a pixel positional relationship between a 525$i$ signal and 1050$i$ signal, and a predictive tap.

FIGS. 13 and 14 specifically illustrate predictive taps (SD pixels) selected by the first tap selector 121 when the 525*i* signal is converted into the 1050*i* signal. FIGS. 13 and 14 illustrate the pixel positional relationship in a vertical direction of even (e) and odd (o) fields of frames F−1, F, F+1 consecutive in time.

Referring to FIG. 13, predictive taps for predicting the line data L1 and L2 of a field F/o are SD pixels T1 and T2, contained in a next field F/e, spatially close to a pixel of the 1050*i* signal to be produced (a target pixel), SD pixels T3, T4, T5, and T6, contained in a field F/o, spatially close to a pixel of the 525*p* signal to be produced, and SD pixels T7 and T8, contained in a preceding F−1/e, a pixel of the 1050*i* signal to be produced.

Referring to FIG. 14, predictive taps for predicting the line data L1' and L2' of a field F/e are SD pixels T1 and T2, contained in a next field F+1/o, spatially close to a pixel of the 1050*i* signal to be produced, SD pixels T3, T4, T5, and T6, contained in a field F/e, spatially close to a pixel of the 1050*i* signal to be produced, and SD pixels T7 and T8, contained in a preceding field F/o, spatially close to a pixel of the 525*p* signal to be produced.

When the line data L1 and L1' are predicted, the SD pixel T6 may be excluded from being selected as a predictive tap. When the line data L2 and L2' are predicted, the SD pixel T3 may be excluded from being selected as a predictive tap.

Referring to FIGS. 11 through 14, at least one pixel in the horizontal direction may be selected as a predictive tap in addition to SD pixels at the same position across a plurality of fields.

Figure 15:
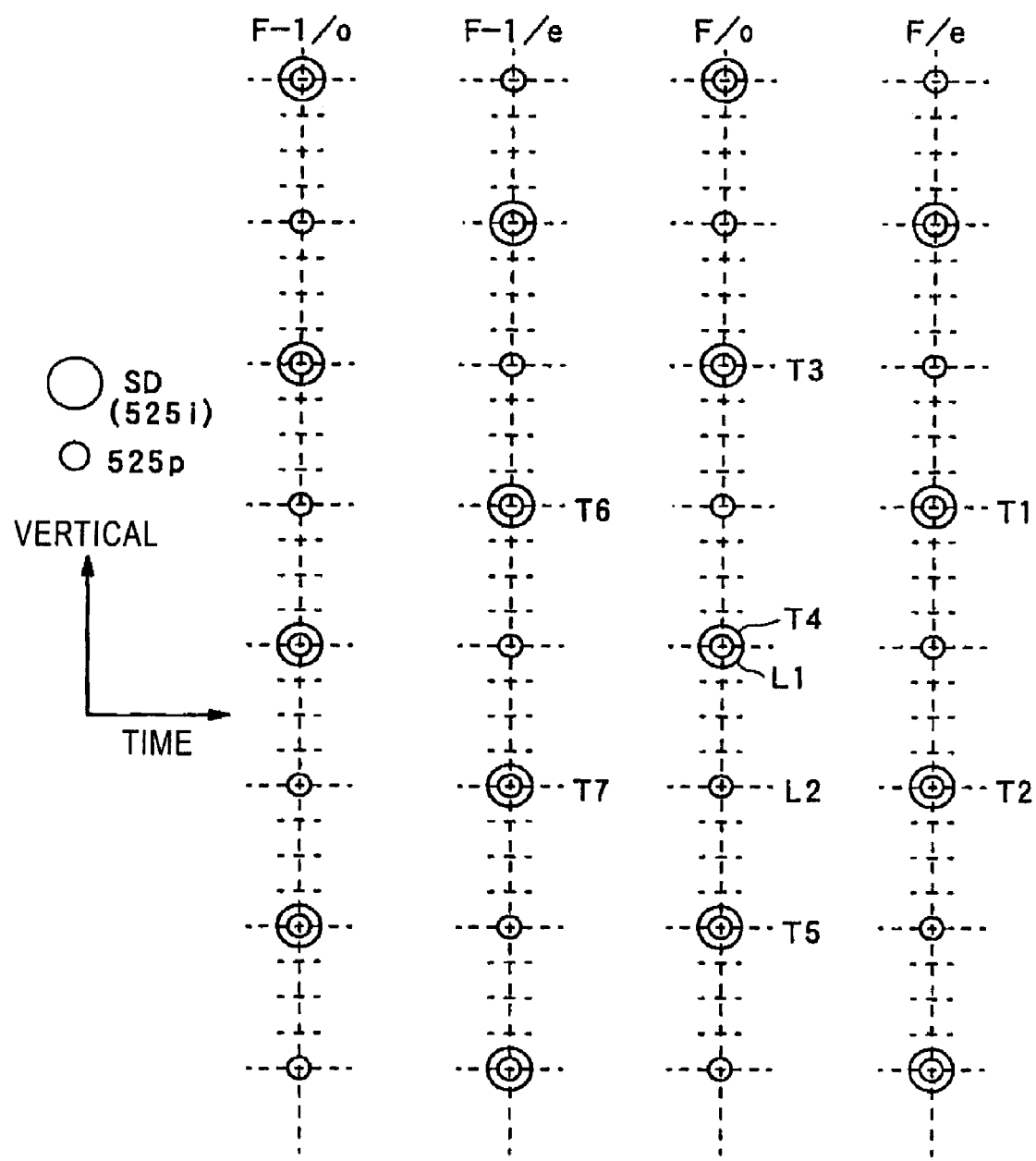
FIG. 15 illustrates a pixel positional relationship between a 525$i$ signal and 525$p$ signal, and a space class tap.
Figure 16:
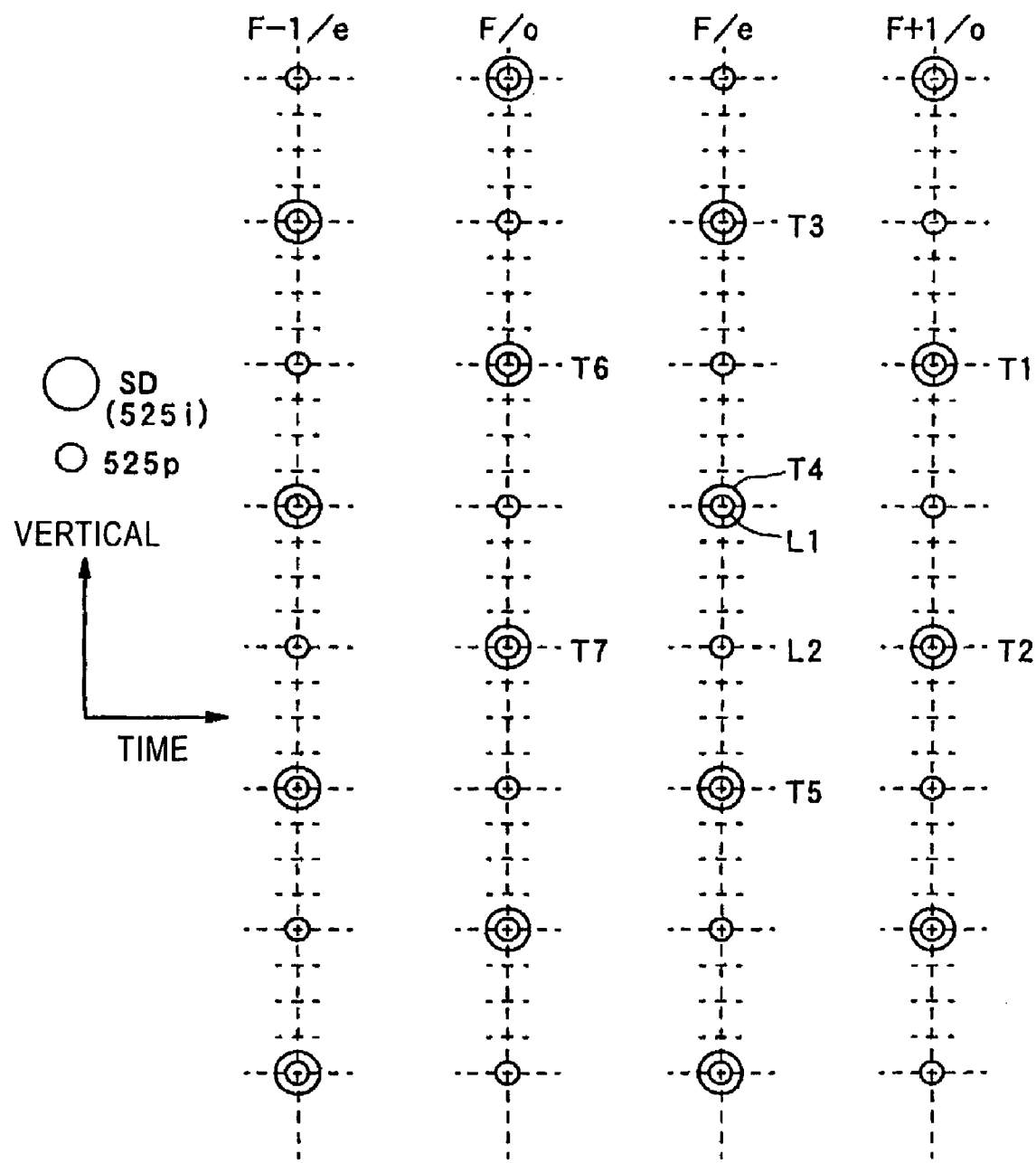
FIG. 16 illustrates a pixel positional relationship between a 525$i$ signal and 525$p$ signal, and a space class tap.

FIGS. 15 and 16 specifically illustrate space class taps (SD pixels) which are selected by the second tap selector 122 when the 525i signal is converted into the 525p signal. FIGS. 15 and 16 show a pixel positional relationship of odd fields (o) and even fields (e) in a vertical direction of frames F−1, F, and F+1 consecutive in time.

Referring to FIG. 15, space class taps for predicting the line data L1 and L2 of a field F/o are SD pixels T1 and T2, contained in a next field F/e, spatially close to a pixel of the 525p signal to be produced (a target pixel), SD pixels T3, T4, and T5, contained in a field F/o, spatially close to a pixel of the 525p signal to be produced, and SD pixels T6 and T7, contained in a preceding field F−1/e, spatially close to a pixel of the 525p signal to be produced.

Referring to FIG. 16, space class taps for predicting the line data L1 and L2 of a field F/e are SD pixels T1 and T2, contained in a next field F+1/o, spatially close to a pixel of the 525p signal to be produced, SD pixels T3, T4, T5, and T6, contained in the field F/e, spatially close to a pixel of the 525p signal to be produced, and SD pixels T6 and T7, contained in a preceding field F/o, spatially close to a pixel of the 525p signal to be produced.

When the line data L1 is predicted, the SD pixel T7 may be excluded from being selected as a space class tap. When the line data L2 is predicted, the SD pixel T6 may be excluded from being selected as a space class tap.

Figure 17:
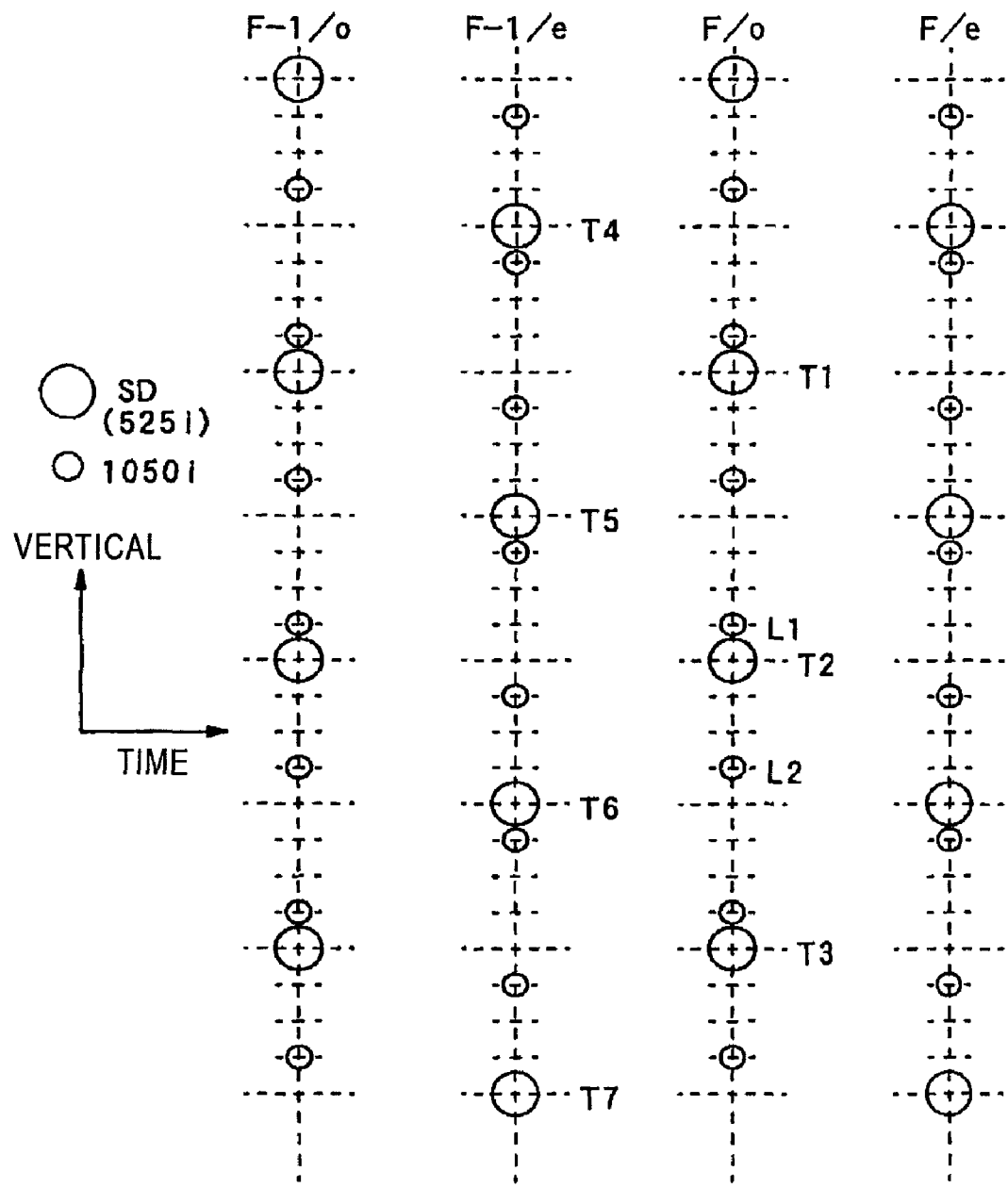
FIG. 17 illustrates a pixel positional relationship between a 525$i$ signal and 1050$i$ signal, and a space class tap.
Figure 18:
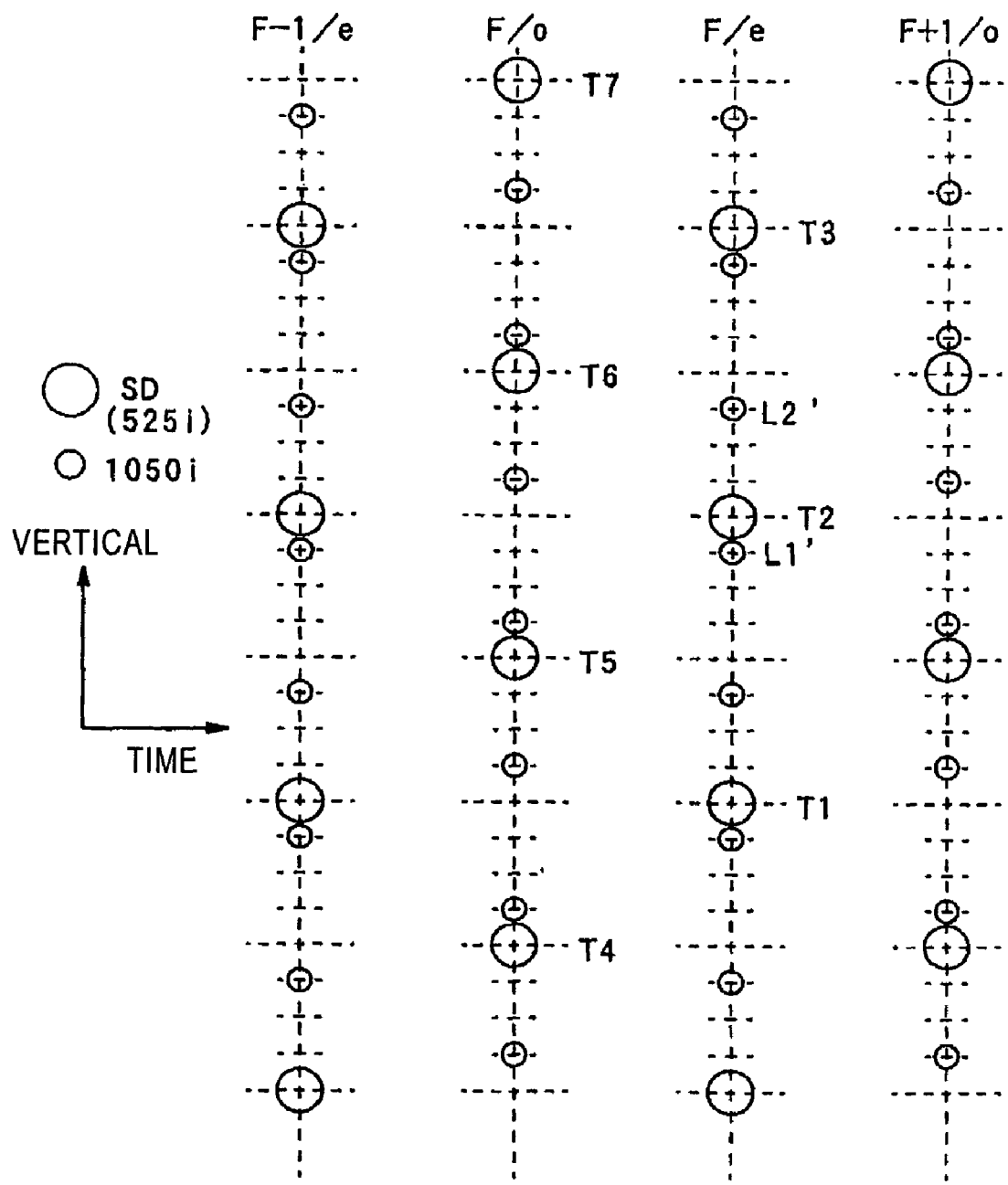
FIG. 18 illustrates a pixel positional relationship between a 525$i$ signal and 1050$i$ signal, and a space class tap.

FIGS. 17 and 18 specifically illustrate space class taps (SD pixels) which are selected by the second tap selector 122 when the 525i signal is converted into the 1050i signal. FIGS. 17 and 18 show a pixel positional relationship of odd fields (o) and even fields (e) in a vertical direction of frames F−1, F, and F+1 consecutive in time.

Referring to FIG. 17, space class taps for predicting the line data L1 and L2 of a field F/o are SD pixels T1, T2, and T3, contained in the field F/o, spatially close to a pixel of the 1050i signal to be produced (a target pixel), and SD pixels T4, T5, T6, and T7 contained in a preceding field F−1/e, spatially close to a pixel of the 1050i signal to be produced.

Referring to FIG. 18, space class taps for predicting the line L1' and L2' of a field F/e are SD pixels T1, T2, hand T3, contained in the field F/e, spatially close to a pixel of the 1050i signal to be produced, and SD pixels T4, T5, T6, and T7, contained in a field F/o, spatially close to a pixel of the 1050i signal to be produced.

When the line data L1 and L1' are predicted, the SD pixel T7 may be excluded from being selected as a space class tap. When the line data L2 and L2' are predicted, the SD pixel T4 may be excluded from being selected as a space class tap.

Referring to FIGS. 15 through 18, at least one pixel in the horizontal direction may be selected as a space tap in addition to SD pixels at the same position across a plurality of fields.

Figure 19:
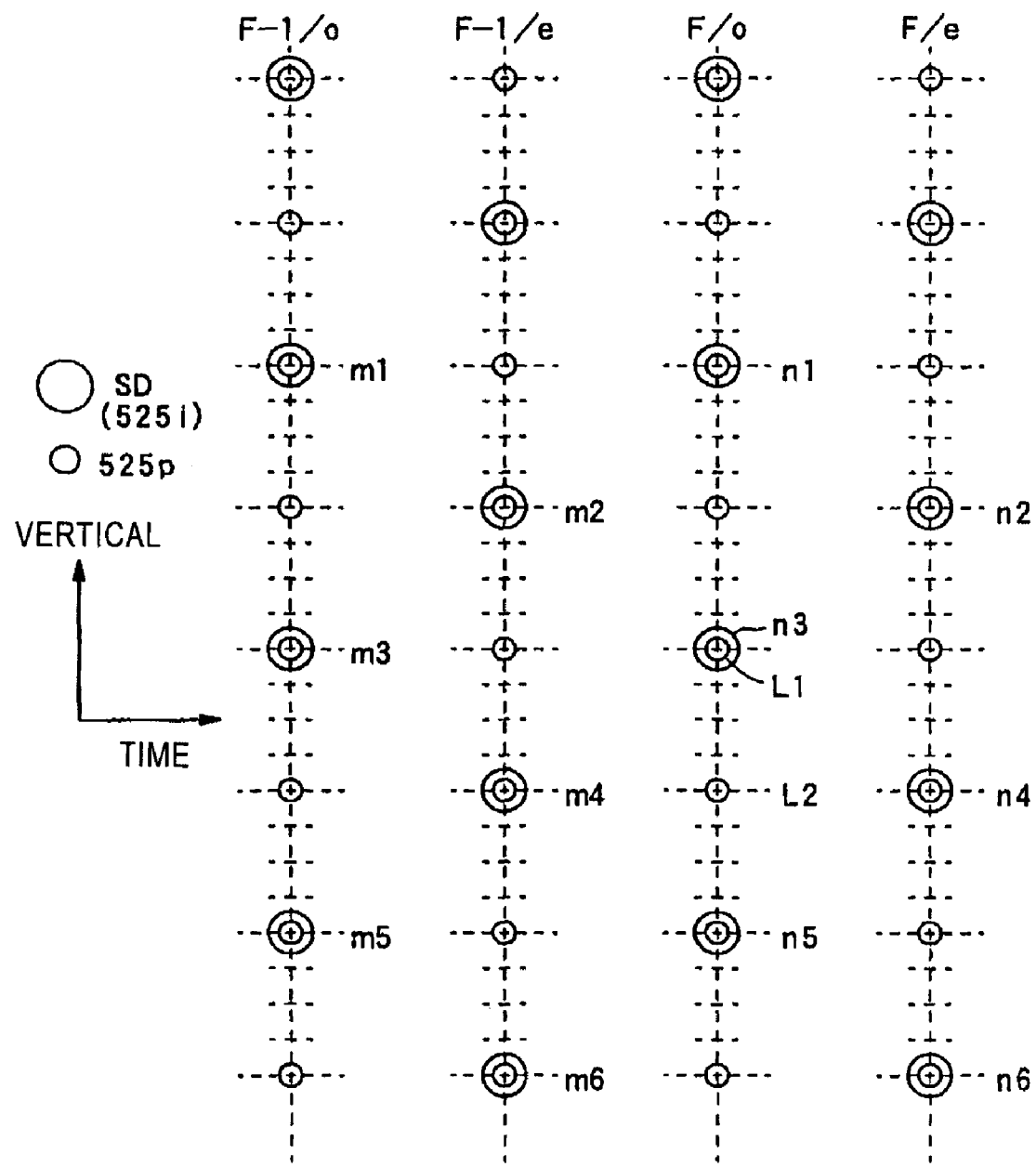
FIG. 19 illustrates a pixel positional relationship between a 525$i$ signal and 525$p$ signal, and a motion class tap.

FIG. 19 specifically illustrates motion class taps (SD pixels) which are selected by the third tap selector 123 when the 525i signal is converted into the 525p signal. FIG. 19 shows a pixel positional relationship of odd fields (o) and even fields (e) in a vertical direction of frames F−1, and F consecutive in time. Referring to FIG. 19, motion class taps for predicting the line data L1 and L2 of a field F/o are SD pixels n2, n4, and n6, contained in a next field F/e, spatially close to a pixel of the 525p signal to be produced (a target pixel), SD pixels n1, n3, and n5, contained in a field F/o, spatially close to a pixel of the 525p signal to be produced, SD pixels m2, m4, and m6, contained a preceding field F−1/e, spatially close to a pixel of the 525p signal to be produced, and SD pixels m1, m3, and m5, contained in a preceding field F−1/o, spatially close to a pixel of the 525p signal to be produced. Vertical positions of the SD pixels n1-n6 respectively agree with vertical positions of the SD pixels m1-m6.

Figure 20:
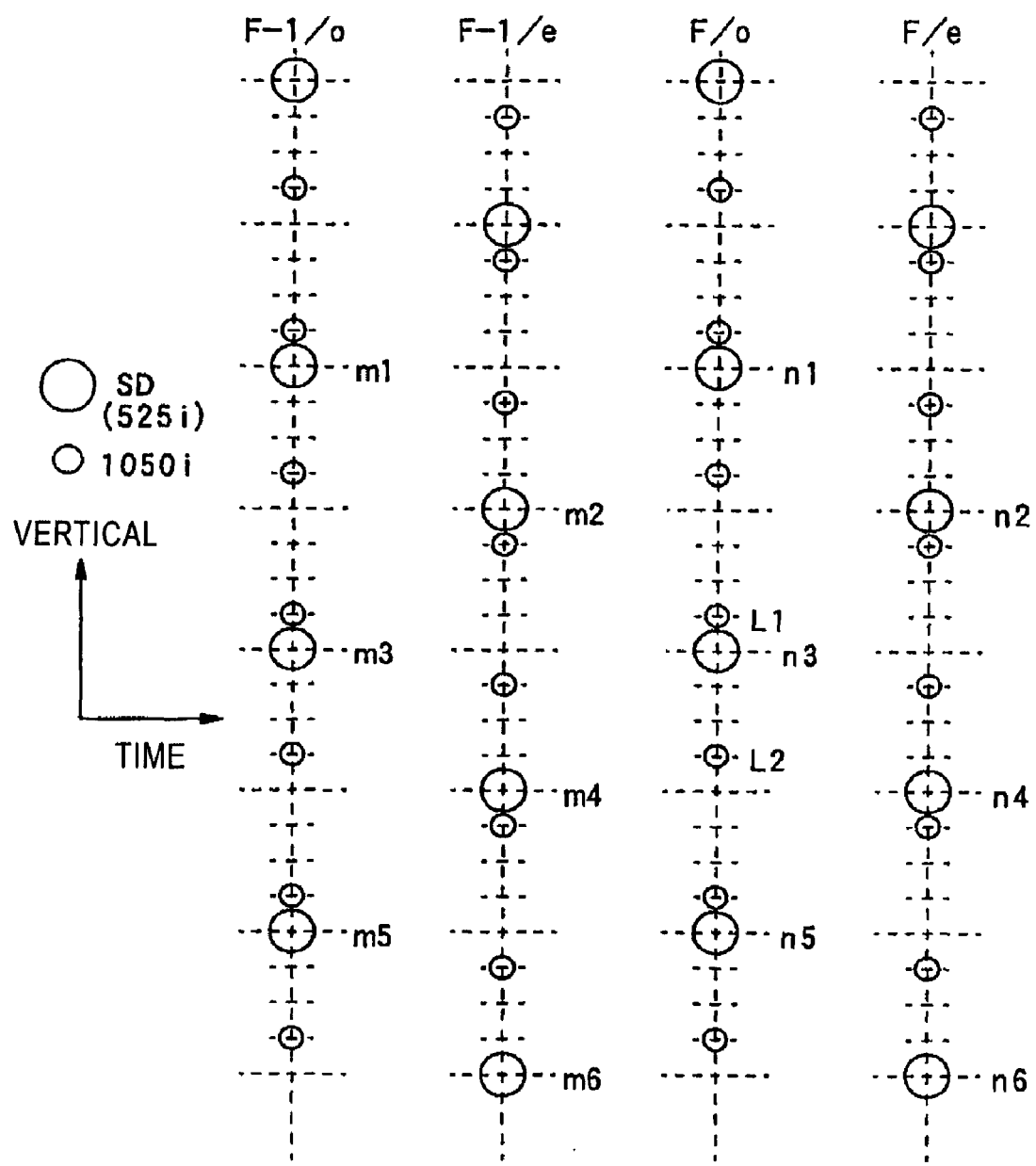
FIG. 20 illustrates a pixel positional relationship between a 525$i$ signal and 1050$i$ signal, and a motion class tap.

FIG. 20 specifically illustrates motion class taps (SD pixels) which are selected by the third tap selector 123 when the 525i signal is converted into the 1050 signal. FIG. 20 shows a pixel positional relationship of odd fields (o) and even fields (e) in a vertical direction of frames F−1, and F consecutive in time. Referring to FIG. 20, motion class taps for predicting the line data L1 and L2 of a field F/o are SD pixels n2, n4, and n6, contained in a next field F/e, spatially close to a pixel of the 1050i signal to be produced, SD pixels n1, n3, and n5, contained in a field F/o, spatially close to a pixel of the 1050i signal to be produced, SD pixels m2, m4, and m6, contained a preceding field F−1/e, spatially close to a pixel of the 1050i signal to be produced, and SD pixels m1, m3, and m5, contained in a preceding field F−1/o, spatially close to a pixel of the 1050i signal to be produced. Vertical positions of the SD pixels n1-n6 respectively agree with vertical positions of the SD pixels m1-m6.

Returning to FIG. 8, the processing unit 9 includes a space class detector 124. The space class detector 124 detects a level distribution pattern of data (SD data) of space class taps elected by the second tap selector 122, detects a space class based on the level distribution pattern, and outputs resulting class information.

The space class detector 124 performs calculations to compress each piece of the SD pixel data from 8-bit data to 2-bit data. The space class detector 124 outputs compressed data, responsive to the SD pixel data, as the class information of the space class. In this embodiment, data compression is performed using "ADRC (Adaptive Dynamic Range Coding)". Alternatively, one of "DPCM (Differential Pulse Code Modulation)", and "VQ (Vector Quantization)" may be used as information compression means.

The ADRC is a adaptive requantization method developed for high performance encoding intended for use in VCRs (Video Cassette Recorders). Since the ADRC efficiently expresses a localized pattern of a signal level using a short word length, data compression is appropriately performed using the ADRC. When the ADRC is used, let MAX represent the maximum value of the data (SD pixel data) of the space class tap, MIN represent the minimum value of the data, DR represent a dynamic range of the data of the space class tap (=MAX−MIN+1), and P represent a number of requantization bits, and a requantization code Qi as compressed data is obtained with respect to the SD pixel data ki as the data of space class tap through equation (1).

$$Qi=[(ki-\text{MIN}+0.5)]2P/DR]  \quad (1)$$

where brackets [] represent a truncation operation, and i=1, . . . , Na when Na pieces of SD pixel data are available as the data of the space class tap.

The processing unit 9 includes a motion class detector 125. The motion class detector 125 detects a motion class particularly representing the degree of motion, from the data (SD pixel data) of the motion class tap selectively picked out by the third tap selector 123, and outputs resulting class information.

The motion class detector 125 calculates an interframe difference from the data mi and ni of the motion class tap (the SD pixel data) selectively picked out by the third tap selector 123, performs a threshold process on the average of the absolute values of the differences, and thus detects a motion class, which is a measure of motion. Specifically, the motion class detector 125 calculates the average AV of the absolute values of the differences using equation (2). When 12 pieces of SD pixel data m1-m6 and n1-n6 are picked out by the third tap selector 123 as described above, Nb in equation (2) is 6.

$$AV = \frac{\sum_{i=1}^{Nb} |mi - ni|}{Nb} \quad (2)$$

The motion class detector 125 compares the calculated average AV with one or a plurality of thresholds, thereby resulting in class information MV of the motion class. For example, three thresholds th1, th2, and th3 are prepared (th1<th2<th3), and four classes are detected. MV=0 if AV≦th1, MV=1 if th1<AV≦th2, MV=2 if th2<AV≦th3, and MV=3 if th3<AV.

The processing unit 9 also includes a class synthesizer 126. The class synthesizer 126 determines a class code CL indicating a class, to which a pixel of the HD signal (one of the 525p signal and 1050i signal) to be produced (a target pixel) belongs to, based on the requantization code Qi as the class information of the space class output from the space class detector 124, and the class information MV of the motion class output from the motion class detector 125.

The class synthesizer 126 performs calculations on the class code CL using equation (3).

$$CL = \sum_{i=1}^{Na} qi(2^P)^i + MV \cdot 2^{pNa} \quad (3)$$

where Na represents the number of pieces of data of space class taps (SD pixel data), and P represents the number of requantization bits in the ADRC.

The processing unit 9 further includes registers 130 through 133, and coefficient memory 11. A line-by-line converter 129 to be discussed later must switch the operation thereof between when the 525p signal is output and when the 1050i signal is output. The register 130 stores operation designate information to designate the operation of the line-by-line converter 129. The line-by-line converter 129 performs an operation responsive to the operation designate information supplied from the register 130.

The register 131 stores tap position information of a predictive tap selected by the first tap selector 121. The first tap selector 121 selects the predictive tap in accordance with the tap position information supplied from the register 131. For example, the tap position information includes numbers assigned to a plurality of SD pixels that may be selected, and a selected SD pixel is designated by number. The same is true of the remaining tap position information.

The register 132 stores tap position information of the space class tap selected by the second tap selector 122. The second tap selector 122 selects the space class tap in accordance with the tap position information supplied from the register 132.

The register 132 stores tap position information A representing a relatively small amount of motion, and tap position information B representing a relatively large amount of motion. Whether the second tap selector 122 is supplied with the tap position information A or tap position information B is determined by the class information MV of the motion class output from the motion class detector 125.

When MV=0 or MV=1 with no or little motion, the second tap selector 122 is supplied with the tap position information A. The space class taps selected by the second tap selector 122 straddle a plurality of fields as illustrated in FIGS. 15 through 18. When MV=2 or MV=3 with a relatively large motion, the second tap selector 122 is supplied with the tap position information B. The space class taps selected by the second tap selector 122 are only SD pixels (not shown) within the same field as the pixel to be produced, although these SD pixels are not shown.

The register 131 may also store tap position information representing a relatively small amount of motion, and tap position information representing a relatively large amount of motion. The tap position information fed to the first tap selector 121 may be selected by the class information MV of the motion class output from the motion class detector 125.

The register 133 stores tap position information of the motion class tap selected by the third tap selector 123. The third tap selector 123 selects the motion class tap in response to the tap position information supplied from the register 133.

The coefficient memory 11 stores additive data of an estimation equation, to be used by the estimation prediction calculator 127 to be discussed later, on a class by class basis. The additive data is information for converting the 525i signal as the SD signal into one of the 525p signal and 1050i signal as the HD signal.

The class code CL output from the above-referenced class synthesizer 126 is fed to the coefficient memory 11 as read address information, and the additive data corresponding to the class code CL is read from the coefficient memory 11 to be supplied to the estimation prediction calculator 127.

The processing unit 9 includes an information memory bank 135. The information memory bank 135 stores beforehand the operation designate information to be stored in the register 130, and the tap position information to be stored in the registers 131-133.

The information memory bank 135 stores beforehand, as the operation designate information to be stored in the register 130, first operation designate information for operating the line-by-line converter 129 to output the 525p signal, and second operation designate information for operating the line-by-line converter 129 to output the 1050i signal.

The information memory bank 135 stores beforehand, as the tap position information of the predictive tap to be stored in the register 131, first tap position information corresponding to a first conversion method (for the 525p signal), and second tap position information corresponding to a second conversion method (for the 1050i signal). The information memory bank 135 loads the register 131 with one of the first tap position information and the second tap position information in accordance with the selected information about the above-mentioned conversion method.

The information memory bank 135 stores beforehand, as the tap position information of the space class tap to be stored in the register 132, first tap position information corresponding to a first conversion method (for the 525p signal), and second tap position information corresponding to a second conversion method (for the 1050i signal). The first tap position information and second tap position information are respectively formed of tap position information representing a relatively small amount of motion, and tap position information representing a relatively large amount of motion. The information memory bank 135 loads the register 132 with one of the first tap position information and second tap position information in accordance with the selected information about the above-mentioned conversion method.

The information memory bank 135 stored beforehand, as the tap position information of the motion class tap to be stored in the register 133, first tap position information corresponding to a first conversion method (525p), and second tap position information corresponding to a second conversion method (1050i). The information memory bank 135 loads the register 133 with one of the first tap position information and second tap position information in accordance with the selected information about the above-mentioned conversion method.

The information memory bank 135 stores beforehand coefficient type data of classes corresponding to the first and second conversion methods. The coefficient type data is additive data of a generation equation for generating additive data to be stored in the above-referenced coefficient memory 11.

The estimation prediction calculator 127 calculates the HD pixel data y to be produced, using an estimation equation (4), based on the data xi of the predictive tap (the SD pixel data) and additive data Wi read from the coefficient memory 11. If the number of predictive taps selected by the first tap selector 121 is 10 as shown in FIGS. 9 and 12, n in equation (4) is 10.

$$y = \sum_{i=1}^{n} Wi \cdot xi \tag{4}$$

The additive data Wi of equation (4) is input from the outside or generated from predetermined parameters h and v using equation (5). The information memory bank 135 stores coefficient type data w10-wn9 as the additive data of the generation equation on a per conversion method basis and on a per class basis. The conversion method of the coefficient type data will be discussed later.

$$W_1 = w_{10} + w_{11}v + w_{12}h + w_{13}v^2 + \\ w_{14}vh + w_{15}h^2 + w_{16}v^3 + w_{17}v^2h + w_{18}vh^2 + w_{19}h^3 \\ W_2 = w_{20} + w_{21}v + w_{22}h + w_{23}v^2 + w_{24}vh + \\ w_{25}h^2 + w_{26}v^3 + w_{27}v^2h + w_{28}vh^2 + w_{29}h^3 \\ \vdots \\ W_i = w_{i0} + w_{i1}v + w_{i2}h + w_{i3}v^2 + \\ w_{i4}vh + w_{i5}h^2 + w_{i6}v^3 + w_{i7}v^2h + w_{i8}vh^2 + w_{i9}h^3 \\ \vdots \\ W_n = w_{n0} + w_{n1}v + w_{n2}h + w_{n3}v^2 + \\ w_{n4}vh + w_{n5}h^2 + w_{n6}v^3 + w_{n7}v^2h + w_{n8}vh^2 + w_{n9}h^3 \tag{5}$$

The processing unit 9 includes a coefficient generator 136. The coefficient generator 136 generates the additive parameter Wi (i=1, . . . , n) of the estimation equation (4) responsive to the values of the parameters h and v for each class using equation (5), based on the coefficient type data of each class and the values of parameters h and v. The information memory bank 135 loads the coefficient generator 136 with the coefficient type data of the class corresponding to one of the first conversion method and second conversion method in accordance with the selected information of the above-referenced conversion method. The system controller 101 supplies the coefficient generator 136 with the values of parameters h and v.

The additive data Wi (i=1, . . . , n) of each class generated by the coefficient generator 136 is stored in the above-referenced coefficient memory 11. The generation of the additive data Wi of each class is carried out during the vertical blanking period, for example. Even if the values of parameters h and v are modified, the additive data Wi of each class is immediately modified in response to modified values of parameters h and v. The adjustment of resolution is thus smoothly performed.

The processing unit 9 further includes a normalization coefficient generator 137, and normalization coefficient memory 138. The normalization coefficient generator 137 calculates a normalization coefficient S corresponding to the additive data Wi (i=1, . . . , n) of each class generated by the coefficient generator 136 using equation (6). The normalization coefficient memory 138 stores the generated normalization coefficient S on a class by class basis. The normalization coefficient memory 138 is supplied with the class code CL, output from the class synthesizer 126, as address information. The normalization coefficient S corresponding to the class code CL is read from the normalization coefficient memory 138 and is then supplied to a normalization calculator 128.

$$S = \sum_{i=1}^{n} W_i \tag{6}$$

The processing unit 9 further includes an estimation prediction calculator 127. The estimation prediction calculator 127 calculates the data of a pixel of the HD signal to be produced (a target pixel), based on the data xi (SD pixel data) of the predictive tap selectively picked out by the first tap selector 121, and the additive data Wi read form the coefficient memory 11.

When the 525p signal is output, the estimation prediction calculator 127 must generate line data L1 at the same position as the line of the 525i signal and line data L2 at an intermediate position between two adjacent lines of the 525i signal in the odd field (o) and even field (e) as shown in FIG. 9. The estimation prediction calculator 127 must also double the number of pixels at each line. When the 1050i signal is output, the estimation prediction calculator 127 generates line data L1 and L1' close to the line of the 525i signal and line data L2 and L2' far from the 525i signal in the odd field (o) and even field (e) as shown in FIG. 10. The estimation prediction calculator 127 must also double the number of pixels.

The estimation prediction calculator 127 thus generates concurrently data of four pixels forming the HD signal. For example, the data of the four pixels is concurrently generated using estimation equations having different pieces of additive data, and the additive data of the respective estimation equations is supplied from the coefficient memory 11. The estimation prediction calculator 127 calculates the HD pixel data y to be produced, using equation (4), based on the data xi (SD pixel data) of the predictive tap and the additive data Wi read from the coefficient memory 11.

The processing unit 9 further includes the normalization calculator 128. The normalization calculator 128 performs a normalization operation by dividing the HD pixel data y forming the line data L1 and L2 (L1' and L2') output from the estimation prediction calculator 127 by the normalization coefficient S corresponding to the additive data Wi (i=1, . . . , n) used in the generation of each HD pixel data and read from the normalization coefficient memory 138. The coefficient generator 136 determines the additive data of the estimation equation from the coefficient type data. The generated data contains a rounding error, and there is no guarantee that the sum of the additive data Wi (i=1, . . . , n) becomes 1.0. The HD pixel data y calculated by the estimation prediction calculator 127 suffers from variations in the level thereof due to the rounding error. As already discussed, the normalization calculator 128 eliminates such variations in the normalization operation thereof.

The processing unit 9 further includes a line-by-line converter 129. The line-by-line converter 129 performs a ling-by-line process on the line data L1 and L2 (L1' and L2') supplied from the estimation prediction calculator 127 through the normalization calculator 128 by doubling a line rate by halving the horizontal scanning period.

Figure 21:
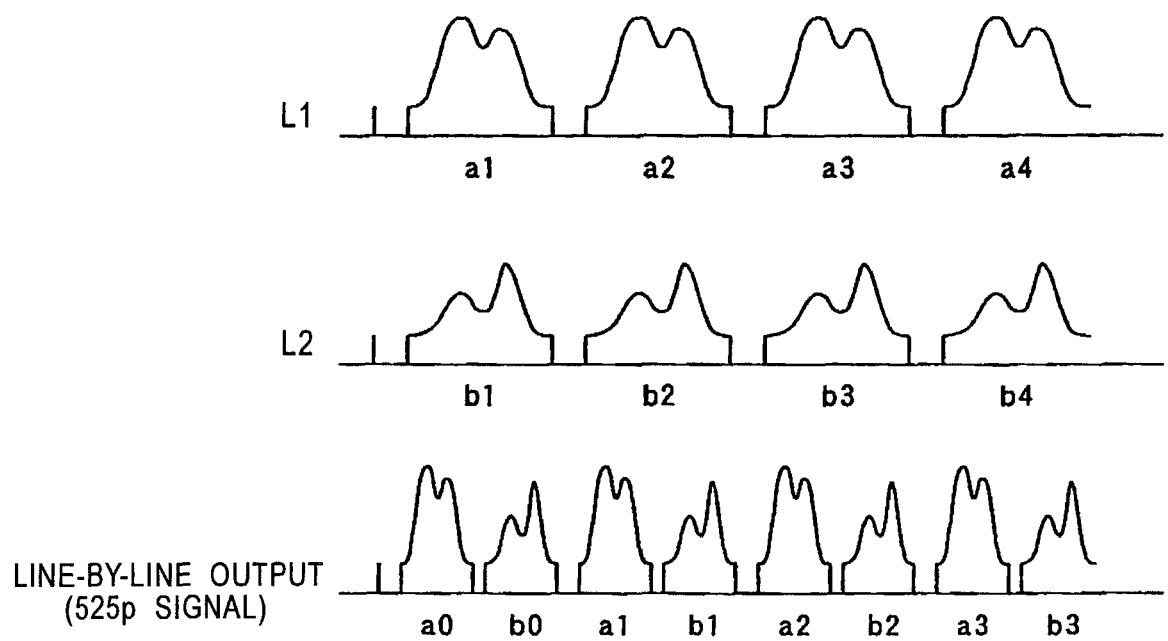
FIG. 21 illustrates a line rate doubling process for outputting a 525p signal.

FIG. 21 illustrates the line rate doubling process to output the 525$p$ signal using analog waveforms. As discussed above, the estimation prediction calculator 127 generates the line data L1 and L2. The line data L1 contains lines a1, a2, a3, . . . in that sequence, and the line date L2 contains lines b1, b2, b3, . . . in that sequence. The line-by-line converter 129 compresses the data of each line in time scale by half, and alternately selects the compressed data, thereby organizing a line-by-line output of a0, b0, a1, b1, . . . in that order.

When the 1050$i$ signal is output, the line-by-line converter 129 generates the line-by-line output so that an interlace relationship between the even field and the odd field is satisfied. To switch between the outputting of the 525$p$ signal and the outputting of the 1050$i$ signal, the line-by-line converter 129 must switch the operation thereof. The operation designate information is supplied from the register 130 as already discussed.

The operation of the processing unit 9 is discussed with reference to FIG. 8.

The second tap selector 122 selectively picks out the data of the space class tap (the SD pixel data) in accordance with the SD signal (the 525$i$ signal) stored in the buffer memory 10. The second tap selector 122 selects the tap based on a preselected conversion method supplied from the register 132 and the tap position information corresponding to the motion class detected by the motion class detector 125.

The data of the space class tap (the SD pixel data) selectively picked out by the second tap selector 122 is fed to the space class detector 124. The space class detector 124 performs the ADRC process on the SD pixel data as the data of the space class tap, thereby resulting in the requantization code Qi as the class information of the space class (chiefly, in a class classification to express a waveform in space) (see equation (1)).

The third tap selector 123 selectively picks out the data of the motion class (the SD pixel data) from the SD signal (the 525$i$ signal) stored in the buffer memory 10. The third tap selector 123 selects the tap based on the tap position information corresponding to the preselected conversion method supplied from the register 133.

The data of the motion class tap selectively picked out by the third tap selector 123 (the SD pixel data) is fed to the motion class detector 125. The motion class detector 125 obtains the class information MV of the motion class (chiefly, in a class classification to express the degree of motion) from the SD pixel data as the data of the motion class tap.

The class information MV and above-referenced requantization code Qi are fed to the class synthesizer 126. From the class information VM and requantization code Qi, the class synthesizer 126 results in the class code CL representing the class to which the (target) pixel of the HD signal to be produced (one of the 525$p$ signal and 1050$i$ signal) belongs to (see equation (3)). The class code CL is then fed to each of the coefficient memory 11 and normalization coefficient memory 138 as read address information.

During the vertical blanking period, the additive data Wi (i=1, . . . , n) of the estimation equation of each class, corresponding to the predetermined parameters h and v and the conversion method, is generated by the coefficient generator 36 and is then stored in the coefficient memory 11. The normalization coefficient S corresponding to the additive data Wi (i=1, . . . , n) generated by the coefficient generator 136 is generated by the normalization coefficient generator 137 and is then stored in the normalization coefficient memory 138.

Since the class code CL is stored together with the read address information in the coefficient memory 11 as already discussed, the additive data Wi corresponding to the class code CL is read from the coefficient memory 11 and is then fed to the estimation prediction calculator 127. In response to the SD signal of the predictive tap (the 525$i$ signal) stored in the buffer memory 10, the first tap selector 121 selectively picks out the data of the predictive tap (the SD pixel data). The first tap selector 121 selects the tap based on the tap position information supplied from the register 131 and corresponding to the preselected conversion method. The data xi of the predictive tap (the SD pixel data) selectively picked out by the first tap selector 121 is fed to the estimation prediction calculator 127.

The estimation prediction calculator 127 calculates the data y (the HD pixel data) of the (target) pixel of the HD signal to be produced (see equation (4)), based on the data xi of the predictive tap (the SD pixel data) and the additive data Wi read from the coefficient memory 11. The data of four pixels forming the HD signal is concurrently generated.

When the first conversion method for outputting the 525$p$ signal is selected, the line data L1 at the same position as the line of the 525$i$ signal and the line date L2 at the intermediate position between two adjacent lines of the 525$i$ signal are generated in the odd field (o) and even field (e) (see FIG. 9). When the second conversion method for outputting the 1050$i$ is selected, the line data L1 and L1' close to the line of the 525$i$ signal and the line-data L2 and L2' far from the line of the 525$i$ signal are generated in the odd field (o) and even field (e) (see FIG. 10).

The line data L1 and L2 (L1' and L2') generated by the estimation prediction calculator 127 are fed to the normalization calculator 128. Since the above-referenced class code CL is fed as the read address code to the normalization coefficient memory 138 as already discussed, the normalization coefficient S corresponding to the class CL, i.e., corresponding to the additive data Wi (i=1, . . . , n) used to generate the HD pixel data y forming the line data L1 and L2 (L1' and L2') output from the estimation prediction calculator 127 is fed to the estimation prediction calculator 127. The normalization calculator 128 performs a normalization process by dividing the HD pixel data y forming the line data L1 and L2 (L1' and L2') output from the estimation prediction calculator 127 by the corresponding normalization coefficient S. This arrangement removes level variations in the information data of a target point due to a rounding error which is involved when the additive data of the estimation equation (see equation (4)) is determined in the generation equation (see equation (5)) using the coefficient type data.

The line data L1 and L2 (L1' and L2') normalized by the normalization calculator 128 is fed to the line-by-line converter 129. The line-by-line converter 129 generates the HD signal by performing a line-by-line process on the line data L1 and L2 (L1' and L2'). In this case, the line-by-line converter 129 operates in accordance with the operation designate information, supplied from the register 130, responsive to the preselected conversion method. When the first conversion method (525p) is selected, the line-by-line converter 129 outputs the 525p signal. When the second conversion method (1050i) is selected, the line-by-line converter 129 outputs the 1050i signal.

As already described, the coefficient generator 136 generates the additive data Wi (i=1, . . . , n) of the estimation equation responsive to the parameters h and v in each class based on the coefficient type data loaded from the information memory bank 135, and then stores the additive data Wi in the coefficient memory 11. The estimation prediction calculator 127 calculates the HD pixel data y based on the additive data Wi (i=1, . . . , n) read in response to the class code CL from the coefficient memory 11. By adjusting the values of the parameters h and v, a vertical image quality and a horizontal image quality of an image obtained from the HD signal are adjusted. The coefficient generator 136 generates the additive data of each class corresponding to the adjusted parameters v and h when used. This arrangement eliminates the need for a large capacity memory for storing a great deal of data.

The information memory bank 135 thus stores the coefficient type data on a per conversion method and on a class by class basis. The coefficient type data is generated in advance using a learning process.

One generation method is now discussed. The coefficient type data w10-wn9 as the additive data of the generation equation (5) is determined.

In the following discussion, ti (i=0, . . . , 9) is defined by equation (7).

$$t0=1, t1=v, t2=h, t3=v^2, t4=vh, t5=h^2, t6=v^3, t7=v^2h,$$
$$t8=vh^2, t9=h^3 \qquad (7)$$

Using equation (7), equation (5) is rewritten as equation (8).

$$W_j = \sum_{i=0}^{9} W_{ji} t_i \qquad (8)$$

Finally, coefficient wxy is determined using a learning process. A coefficient for minimizing a squared error is determined on a per conversion method and on a class by class basis using a plurality of pieces of SD pixel data and HD pixel data. This is the so-called minimum squares method. Let m represent the number of learnings, ek represent a residual error in k-th learning data (1≦k≦m), E represent the sum of squared errors, and the sum E of squared errors is represented by equation (9) using equations (4) and (5). Here, let xik represent k-th pixel data at an i-th predictive tap position in the SD image, and yk represent pixel data of k-th HD image corresponding to yk.

$$E = \sum_{k=1}^{m} e_k^2 \qquad (9)$$

$$= \sum_{k=1}^{m} [y_k - (W_{1 \times 1K} + W_{2 \times 2K} + \ldots + W_{n \times nK})]^2$$

$$= \sum_{k=1}^{m} \{y_k - [(t_0 w_{10} + t_1 w_{11} + \ldots + t_9 w_{19}) \times_{1k} + \ldots +$$

$$(t_0 w_{n0} + t_1 w_{n1} + \ldots + t_9 w_{n9}) \times_{nk}]\}^2$$

-continued $$= \sum_{k=1}^{m} \{y_k - [(w_{10} + w_{11} v + \ldots + w_{19} h^3) \times_{1k} + \ldots +$$

$$(w_{n0} + w_{n1} v + \ldots + w_{n9} h^3) \times_{nk}]\}^2$$

In the solution of the least squares method, wxy is determined so that a differential derivative of equation (9) with respect to wxy becomes zero. Refer to equation (10).

$$\frac{\partial E}{\partial w_{ij}} = \sum_{k=1}^{m} 2\left(\frac{\partial e_k}{\partial w_{ij}}\right) e_k = -\sum_{k=1}^{m} 2 t_j x_{ik} e_k = 0 \qquad (10)$$

If Xipjq and Yip are defined as expressed by equations (11) and (12), equation (10) is rewritten as equation (13) using matrix.

$$X_{ipjq} = \sum_{k=1} x_{ik} t_p x_{jk} t_q \qquad (11)$$

$$Y_{ip} = \sum_{k=1}^{m} x_{ik} t_p y_k \qquad (12)$$

$$\begin{bmatrix} x_{1010} & x_{1011} & x_{1012} & \cdots & x_{1019} & x_{1020} & \cdots & x_{10n9} \\ x_{1110} & x_{1111} & x_{1112} & \cdots & x_{1119} & x_{1120} & \cdots & x_{11n9} \\ x_{1210} & x_{1211} & x_{1212} & \cdots & x_{1219} & x_{1220} & \cdots & x_{12n9} \\ \vdots & \vdots & \vdots & \ddots & \vdots & \vdots & \ddots & \vdots \\ x_{1910} & x_{1911} & x_{1912} & \cdots & x_{1919} & x_{1920} & \cdots & x_{19n9} \\ x_{2010} & x_{2011} & x_{2012} & \cdots & x_{2019} & x_{2020} & \cdots & x_{20n9} \\ \vdots & \vdots & \vdots & \ddots & \vdots & \vdots & \ddots & \vdots \\ n_{n910} & x_{n911} & x_{n912} & \cdots & x_{n919} & x_{n920} & \cdots & x_{n9n9} \end{bmatrix} \begin{bmatrix} w_{10} \\ w_{11} \\ w_{12} \\ \vdots \\ w_{19} \\ w_{20} \\ \vdots \\ w_{n9} \end{bmatrix} = \begin{bmatrix} Y_{10} \\ Y_{11} \\ Y_{12} \\ \vdots \\ Y_{19} \\ Y_{20} \\ \vdots \\ Y_{n9} \end{bmatrix} \qquad (13)$$

Equation (12) is typically called a normal equation. The normal equation is solved for wxy using the sweep method (Gauss-Jordan elimination). The coefficient type data is thus calculated.

Figure 22:
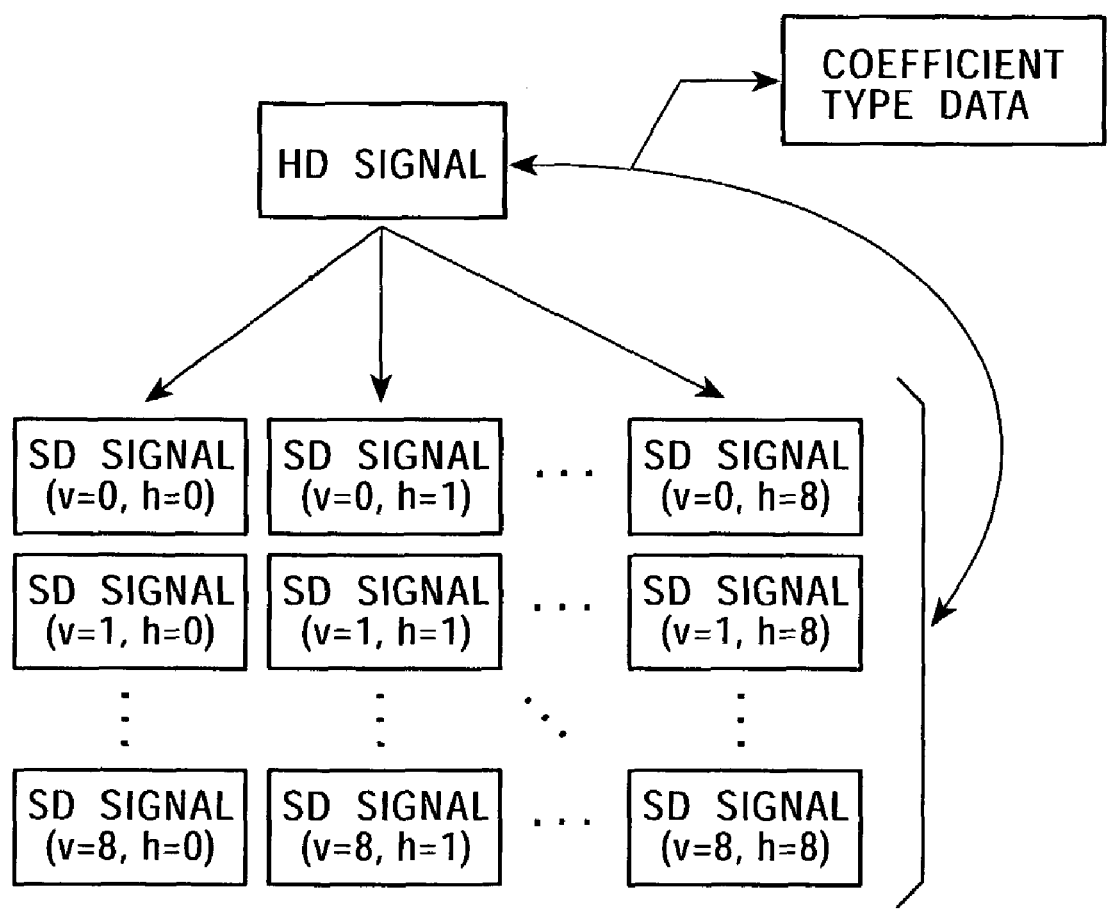
FIG. 22 illustrates a method for generating coefficient type data.

FIG. 22 illustrates the concept of the generation method of the above-referenced coefficient type data. A plurality of SD signals are formed from the HD signal. For example, the parameters h and v respectively vary a horizontal band and a vertical band of a filter which is used when the SD signals are formed from the HD signal. In this case, each of the parameters h and v is varied in steps of 9, thereby forming a total of 81 types of SD signals. A learning process is then performed between the plurality of SD signals and HD signal, resulting in the coefficient type data.

Figure 23:
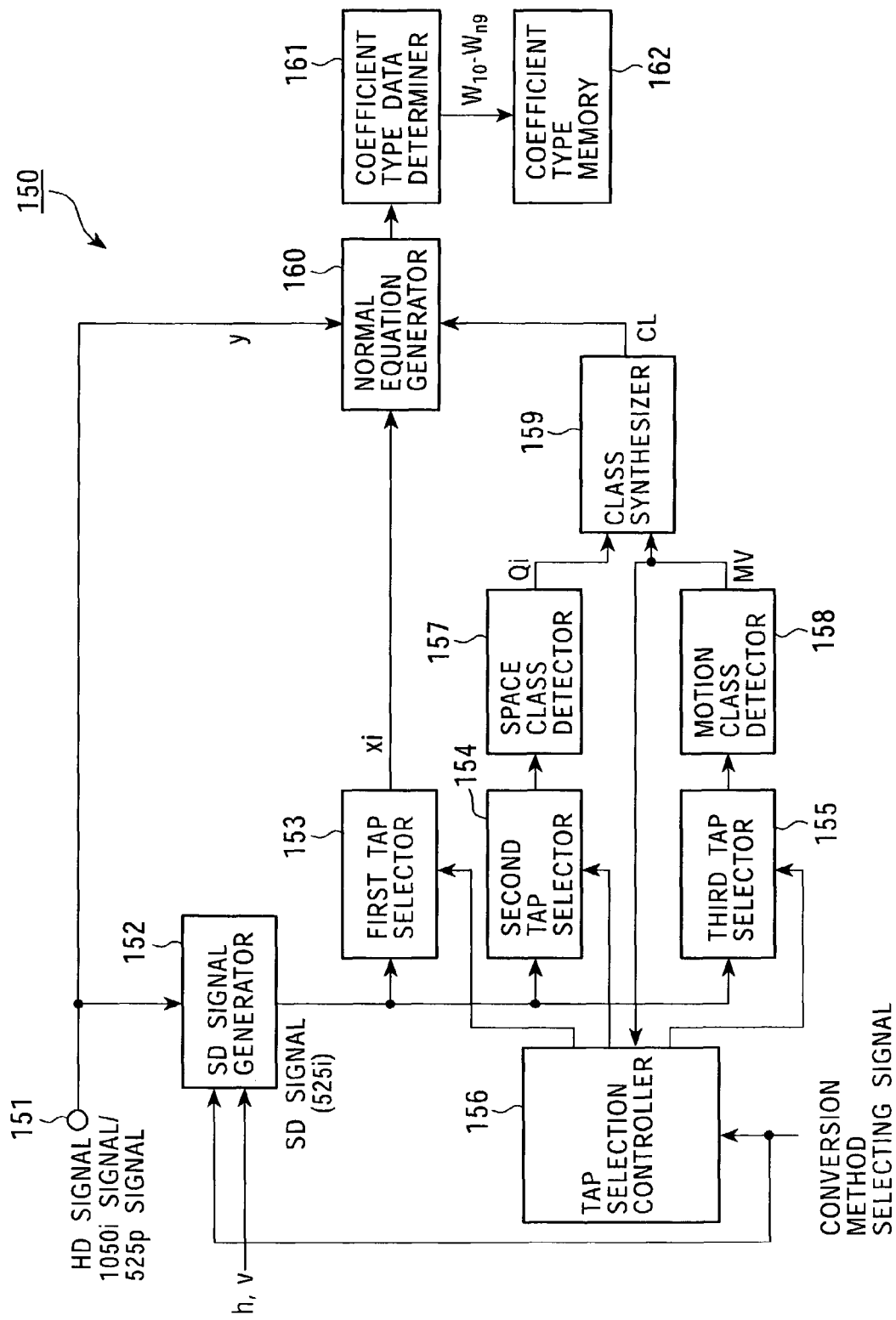
FIG. 23 is a block diagram of a coefficient type data generator.

FIG. 23 illustrates a coefficient type data generator 150 for generating the coefficient type data in the above-discussed concept.

The coefficient type data generator 150 includes an input terminal 151 for receiving the HD signal (525p signal/1050i signal) as a training signal, and an SD signal generator 152 which obtains an SD signal as an input signal by performing a horizontal decimation process and a vertical decimation process on the HD signal.

The SD signal generator 152 receives a conversion method selecting signal as a control signal. When the first conversion method is selected (with the processing unit 9 shown in FIG. 8 resulting in the 525p signal from the 525i signal), the SD signal generator 152 performs a decimation process to the 525p signal, thereby outputting the SD signal (see FIG. 9).

When the second conversion method is selected (with the processing unit 9 shown in FIG. 8 resulting in the 1050i signal from the 525i signal), the SD signal generator 152 performs a decimation process to the 1050i signal, thereby outputting the SD signal (see FIG. 10).

The SD signal generator 152 receives the parameters h and v as the control signals. The horizontal band and vertical band of the filter used in the generation of the SD signal from the HD signal is varied in response to the parameters h and v. Several examples of the filter are discussed below.

Figure 24:
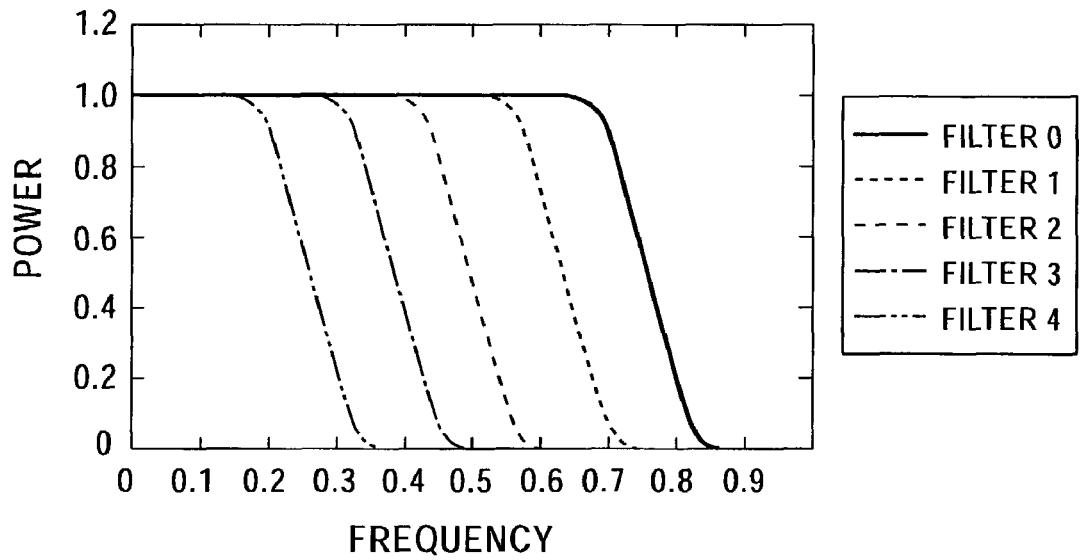
FIG. 24 illustrates a frequency characteristic of a band filter.

A filter may be constructed of a band filter section for limiting a horizontal band and a band filter section for limiting a vertical band. Referring to FIG. 24, frequency characteristics corresponding to stepwise values of the parameters h and v are designed, and are then subjected to an inverse Fourier transform. A one-dimensional filter having a frequency characteristic responsive to a stepwise value of each of the parameters h and v is thus obtained.

It is also contemplated that the filter is constructed of a Gaussian filter including a one-dimensional Gaussian filter section for limiting the horizontal band and a one-dimensional Gaussian filter section for limiting the vertical band. Such a one-dimensional Gaussian filter is expressed in equation (14). Standard deviation may be stepwise varied in response to stepwise values of the parameters h and v. A one-dimensional Gaussian filter having frequency characteristics corresponding to the stepwise values of the parameters h and v is obtained.

$$\text{Out} = \frac{1.0}{\sigma\sqrt{2.0\pi}} e^{\frac{-(4.0 \times -37)^2}{2.0\sigma^2}} \qquad (14)$$

It is also contemplated that the filter is constructed of a two-dimensional filter F(h, v) with the horizontal and vertical frequency characteristics determined by both parameters h and v. The two-dimensional filter is manufactured in a manner similar to the one-dimensional filter. Specifically, two-dimensional frequency characteristics corresponding to the stepwise values of the parameters h and v are designed, and are then subjected to an inverse Fourier transform. A two-dimensional filter having two-dimensional frequency characteristics corresponding to the stepwise values of the parameters h and v is thus obtained.

The coefficient type data generator 150 includes first through third tap selectors 153-155. The first through third tap selectors 153-155 selectively pick out data of a plurality of SD pixels located spatially close to a target pixel of the HD signal (one of the 1050i signal and 525p signal), from the SD signal (the 525i signal) output from the SD signal generator 152.

The first through third tap selectors 153-155 are respectively identical in construction to the first through third tap selectors 121-123 in the already discussed processing unit 9. The taps respectively selected by the first through third tap selectors 153-155 are designated by tap position information output from a tap selection controller 156.

The tap selection controller 156 is supplied with a conversion method selecting signal as a control signal. The tap position information supplied to the first through third tap selectors 153-155 becomes different from when a first conversion method is selected to when a second conversion method is selected. The tap selection controller 156 is also supplied with class information MV of a motion class output from a motion class detector 158 to be discussed later. The tap position information fed to the second tap selector 154 is thus different depending on whether the amount of motion is large or small.

The coefficient type data generator 150 includes a space class detector 157. The space class detector 157 detects a level distribution pattern of the data of the space class tap (the SD pixel data) selectively picked out by the second tap selector 154, detects the space class based on the level distribution pattern, and outputs resulting class information. The space class detector 157 is identical in construction to the space class detector 124 in the already discussed processing unit 9. The space class detector 157 outputs requantization code Qi of each of SD pixel data, as the data of the space class tap, namely, the class information indicating the space class.

The coefficient type data generator 150 further includes the motion class detector 158. The motion class detector 158 detects a motion class chiefly representing the degree of motion, from the data of the motion class tap (the SD pixel data) selectively picked out by the third tap selector 155, and outputs class information MV of the motion class. The motion class detector 158 is identical in construction to the motion class detector 125 in the already discussed processing unit 9. The motion class detector 158 calculates an interframe difference from the data of the motion class tap (the SD pixel data) selectively picked out by the third tap selector 155, and performs a threshold process on the average of absolute values of the differences, thereby detecting the motion class as a measure of motion.

The coefficient type data generator 150 includes a class synthesizer 159. The class synthesizer 159 determines a class code CL indicating a class, to which a target pixel of the HD signal (one of the 525p signal and 1050i signal) belongs to, based on the requantization code Qi as the class information of the space class output from the space class detector 157, and class information MV of the motion class output from the motion class detector 158. The class synthesizer 159 is identical in construction to the class synthesizer 126 in the already discussed processing unit 9.

The coefficient type data generator 150 further includes a normal equation generator 160. The normal equation generator 160 generates a normal equation (see equation (13)) to obtain coefficient type data w10-wn9 for each class, based on the HD pixel data y as target pixel data obtained from the HD signal supplied from the input terminal 151, the data xi of the predictive tap (the SD pixel data) selectively picked out by the first tap selector 153 in response to each HD pixel data y, and class code CL output from the class synthesizer 159 in response to the HD pixel data y.

Learning data is generated by combining a single piece of HD pixel data y and n pieces of predictive tap pixel data. As the parameters h and v to the SD signal generator 152 are successively updated, a plurality of pieces of SD signals with the horizontal band and vertical band thereof varying in a stepwise fashion are successively generated. The normal equation generator 160 thus generates a normal equation in which a great deal of learning data is registered.

The coefficient type data is calculated by learning the HD signal and the SD signal which is generated by applying a narrow-band filter on the HD signal. The coefficient type data is used to result in a HD signal having a higher resolution. Conversely, the coefficient type data is calculated by learning the HD signal and the SD signal which is generated by applying a wide-band filter on the HD signal. The coefficient type data is used to result in a HD signal having a lower resolution. By registering the learning data with a plurality of SD signals successively generated, the coefficient type data for resulting in the HD signal having consecutive resolutions is thus determined.

A delay circuit for synchronizing time arranged as a front stage to the first tap selector 153 may adjust the supply timing of the SD pixel data xi to be fed to the normal equation generator 160 from the first tap selector 153.

The coefficient type data generator 150 includes a coefficient type data determiner 161 and a coefficient type memory 162. The coefficient type data determiner 161, supplied with the data of the normal equation generated for each class by the normal equation generator 160, solves the normal equation for each class, and determines the coefficient type data w10-wn9 for each class. The coefficient type memory 162 stores the determined coefficient type data w10-wn9. The coefficient type data determiner 161 solves the normal equation to determine the additive data w10-wn9 using the sweep method, for example.

The operation of the coefficient type data generator 150 shown in FIG. 23 is discussed below. Upon receiving the HD signal (one of the 525p signal and 1050i signal) as a training signal at the input terminal 151, the SD signal generator 152 performs a horizontal decimation process and a vertical decimation process on the HD signal, thereby generating the SD signal (the 525i signal) as an input signal.

When the first conversion method is selected (with the processing unit 9 shown in FIG. 8 resulting in the 525p signal from the 525i signal), the SD signal generator 152 performs a decimation process to the 525p signal, thereby outputting the SD signal. When the second conversion method is selected (with the processing unit 9 shown in FIG. 8 resulting in the 1050i signal from the 525i signal), the SD signal generator 152 performs a decimation process to the 1050i signal, thereby outputting the SD signal. The SD signal generator 152 is supplied with the parameters h and v as control signals, thereby successively generating a plurality of SD signals with the horizontal and vertical band varying in a stepwise fashion.

The second tap selector 154 selectively picks out the data of the space class (the SD pixel data) located in the vicinity of a target pixel of the HD signal (one of the 525p signal and 1050i signal) from the SD signal (the 525i signal). The second tap selector 154 thus selects the tap based on the selected conversion method supplied from the tap selection controller 156, and the motion class detected by the motion class detector 158.

The data of the space class (the SD pixel data) selectively picked out by the second tap selector 154 is fed to the space class detector 157. The space class detector 157 performs the ADRC process on the SD pixel data as the data of the space class tap, thereby resulting in the requantization code Qi as the class information of the space class (chiefly, in a class classification to express a waveform in space) (see equation (1)).

The third tap selector 155 selectively picks out the data of the motion class (the SD pixel data) in the vicinity of a target pixel of the HD signal, from the SD signal generated by the SD signal generator 152. The third tap selector 155 selects the tap based on the tap position information corresponding to the preselected conversion method supplied from the tap selection controller 156.

The data of the motion class tap selectively picked out by the third tap selector 155 (the SD pixel data) is fed to the motion class detector 158. The motion class detector 158 obtains the class information MV of the motion class (chiefly, in a class classification to express the degree of motion) from the SD pixel data as the data of the motion class tap.

The class information MV and requantization code Qi are fed to the class synthesizer 159. The class synthesizer 159 results in the class code CL representing the class to which the target pixel of the HD signal (one of the 525p signal and 1050i signal) belongs to (see equation (3)), from the class information MV and above-referenced requantization code Qi.

The first tap selector 153 selectively picks out the data of the predictive tap located in the vicinity of a target pixel of the HD signal (the SD pixel data) from the SD signal generated in the SD signal generator 152. In this case, the first tap selector 153 selects the tap based on the tap position information corresponding to the selected conversion method and supplied from the tap selection controller 156.

The normal equation generator 160 generates a normal equation (see equation (13)) to obtain coefficient type data w10-wn9 for each class, based on the HD pixel data y as target pixel data obtained from the HD signal supplied from the input terminal 151, the data xi of the predictive tap (the SD pixel data) selectively picked out by the first tap selector 153 in response to each HD pixel data y, and the class code CL output from the class synthesizer 159 in response to the HD pixel data y.

The coefficient type data determiner 161 solves the normal equation for each class, and determines the coefficient type data w10-wn9 for each class. The determined coefficient type data w10-wn9 is then stored in the coefficient type memory 162 which is partitioned for each class by address.

The coefficient type data generator 150 shown in FIG. 23 generates the coefficient type data w10-wn9 for each class to be stored in the information memory bank 135 in the processing unit 9 shown in FIG. 8. In response to the selected conversion method, the SD signal generator 152 generates the SD signal (the 525i signal) using one of the 525p signal and the 1050i signal. The SD signal generator 152 thus generates the coefficient type data corresponding to the first conversion method (with the processing unit 9 deriving the 525p signal from the 525i signal) and the second conversion method (with the processing unit 9 deriving the 1050i signal from the 525i signal).

Another method of generating the coefficient type data will now be discussed. The coefficient type data w10-wn9 as the additive data of the above-referenced generation equation (5) is determined here.

Figure 25:
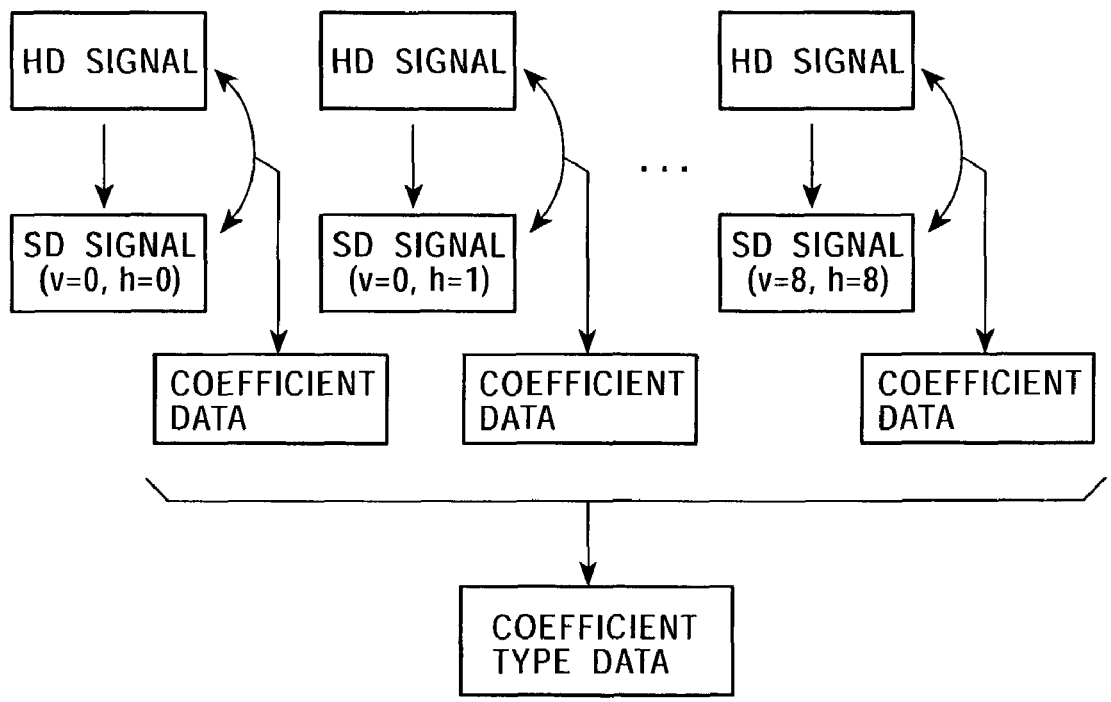
FIG. 25 illustrates another method for generating coefficient type data.

FIG. 25 illustrates the concept of the determination of the coefficient type data. A plurality of SD signals are derived from the HD signal. A total of 81 types of SD signals are generated by varying the parameters h and v in steps of 9. The parameters h and v respectively vary the horizontal band and vertical band of a filter which is used to derive the SD signal from the HD signal. A learning process is performed between the SD signal and HD signal, thereby generating the additive data Wi of the estimation equation (4). The coefficient type data is thus generated using the additive data Wi generated in response to the SD signal.

A method of determining the additive data of the estimation equation is discussed. For example, the additive data Wi (i=1, ..., n) of the estimation equation (4) is determined using the least squares method. As a generalized example, an observation equation (15) is considered with x representing input data, W representing additive data, and Y representing a predictive value. In equation (15), let m represent the number of pieces of learning data, and n represent the number of predictive taps.

$$XW = Y \quad (15)$$

$$X = \begin{bmatrix} x_{11} & x_{12} & \cdots & x_{1n} \\ x_{21} & x_{22} & \cdots & x_{2n} \\ \cdots & \cdots & \cdots & \cdots \\ x_{m1} & x_{m2} & \cdots & x_{mn} \end{bmatrix}, W = \begin{bmatrix} W_1 \\ W_2 \\ \cdots \\ W_n \end{bmatrix}, Y = \begin{bmatrix} y_1 \\ y_2 \\ \cdots \\ y_m \end{bmatrix}$$

The least squares method is applied to data collected using the observation equation (15). A residual equation (16) is considered based on the observation equation (15).

$$XW = Y + E, \quad E = \begin{bmatrix} e_1 \\ e_2 \\ \cdots \\ e_m \end{bmatrix} \quad (16)$$

From the residual equation (16), the most probable value of each Wi establishes the condition that maximizes $e^2$ in equation (17). In other words, it suffices to satisfy conditions in equation (18).

$$e^2 = \sum_{i=1}^{m} e_i^2 \quad (17)$$

$$e_1 \frac{\partial e_1}{\partial W_i} + e_2 \frac{\partial e_2}{\partial W_i} + \ldots + e_m \frac{\partial e_m}{\partial W_i} = 0 \quad (i = 1, 2, \ldots, n) \quad (18)$$

In equation (18), W1, W2, ..., Wn satisfying i (=1, ..., n) conditions are calculated. Equation (19) is obtained from the residual equation (16). Equation (20) is obtained from equations (15) and (19).

$$\frac{\partial e_i}{\partial W_1} = \times i_1, \frac{\partial e_i}{\partial W_2} = \times i_2, \ldots, \frac{\partial e_i}{\partial W_n} = \times i_n \quad (i = 1, 2, \ldots, m) \quad (19)$$

$$\sum_{i=1}^{m} e_i \times i_1 = 0, \sum_{i=1}^{m} e_i \times i_2 = 0, \ldots, \sum_{i=1}^{m} e_i \times i_n = 0 \quad (20)$$

Equation (21) is obtained from equations (16) and (20).

$$\begin{cases} \left(\sum_{j=1}^{m} \times j_1 \times j_1\right) W_1 + \left(\sum_{j=1}^{m} \times j_1 \times j_2\right) W_2 + \ldots + \left(\sum_{j=1}^{m} \times j_1 \times j_n\right) W_n = \left(\sum_{j=1}^{m} \times j_1 y_j\right) \\ \left(\sum_{j=1}^{m} \times j_2 \times j_1\right) W_1 + \left(\sum_{j=1}^{m} \times j_2 \times j_2\right) W_2 + \ldots + \left(\sum_{j=1}^{m} \times j_2 \times j_n\right) W_n = \left(\sum_{j=1}^{m} \times j_2 y_j\right) \\ \ldots \\ \left(\sum_{j=1}^{m} \times j_n \times j_1\right) W_1 + \left(\sum_{j=1}^{m} \times j_n \times j_2\right) W_2 + \ldots + \left(\sum_{j=1}^{m} \times j_n \times j_n\right) W_n = \left(\sum_{j=1}^{m} \times j_n y_j\right) \end{cases} \quad (21)$$

The normal equation (21) allows equations of the number equal to the number n of unknown quantities to be formulated. The most probable value of each Wi is thus calculated. The sweep method is used to solve simultaneous equations.

The method of determining the coefficient type data using the additive data generated in response to each SD data is discussed below.

Let kvhi represent additive data of a given class obtained through a learning process using the SD signal corresponding to the parameter h and v. Here, i is a predictive tap number. The coefficient type data of this class is obtained from kvhi.

The additive data Wi (i=1, ..., n) is expressed by equation (5) using the coefficient type data w10-wn9. If the use of the least squares method in the additive data Wi is contemplated, the residual is expressed in equation (22).

$$e_{vhi} = k_{vhi} - (w_{i0} + w_{i1}v + w_{i2}h + w_{i3}v^2 + w_{i4}vh + w_{i5}h^2 + \quad (22)$$

$$w_{i6}v^3 + w_{i7}v^2h + w_{i8}vh^2 + w_{i9}h^3)$$

$$= k_{vhi} - \sum_{j=0}^{9} w_{ij}t_j$$

Here, tj is expressed in equation (7). If the least squares method is applied to equation (22), equation (23) results.

$$\frac{\partial}{\partial w_{i,j}} = \sum_v \sum_h (e_{vhi})^2 = \sum_v \sum_h 2\left(\frac{\partial e_{vhi}}{\partial w_{i,j}}\right) e_{vhi} \quad (23)$$

$$= -\sum_v \sum_h 2 t_j e_{vhi}$$

$$= 0$$

If Xjk and Yj are respectively defined by equations (24) and (25), equation (23) is rewritten as equation (26). Equation (26) is also a normal equation. By solving equation (26) using a typically available method such as the sweep method, the coefficient type data w10-wn9 are calculated.

$$X_{jk} = \sum_v \sum_h t_j t_k \quad (24)$$

$$Y_j = \sum_v \sum_h t_j k_{vhi} \quad (25)$$

-continued $$\begin{bmatrix} x_{00} & x_{01} & \cdots & x_{09} \\ x_{10} & x_{11} & \cdots & x_{19} \\ \vdots & \vdots & \ddots & \vdots \\ x_{90} & x_{91} & \cdots & x_{99} \end{bmatrix} \begin{bmatrix} w_{i0} \\ w_{i1} \\ \vdots \\ w_{i9} \end{bmatrix} = \begin{bmatrix} Y_0 \\ Y_1 \\ \vdots \\ Y_9 \end{bmatrix} \quad (26)$$

Figure 26:
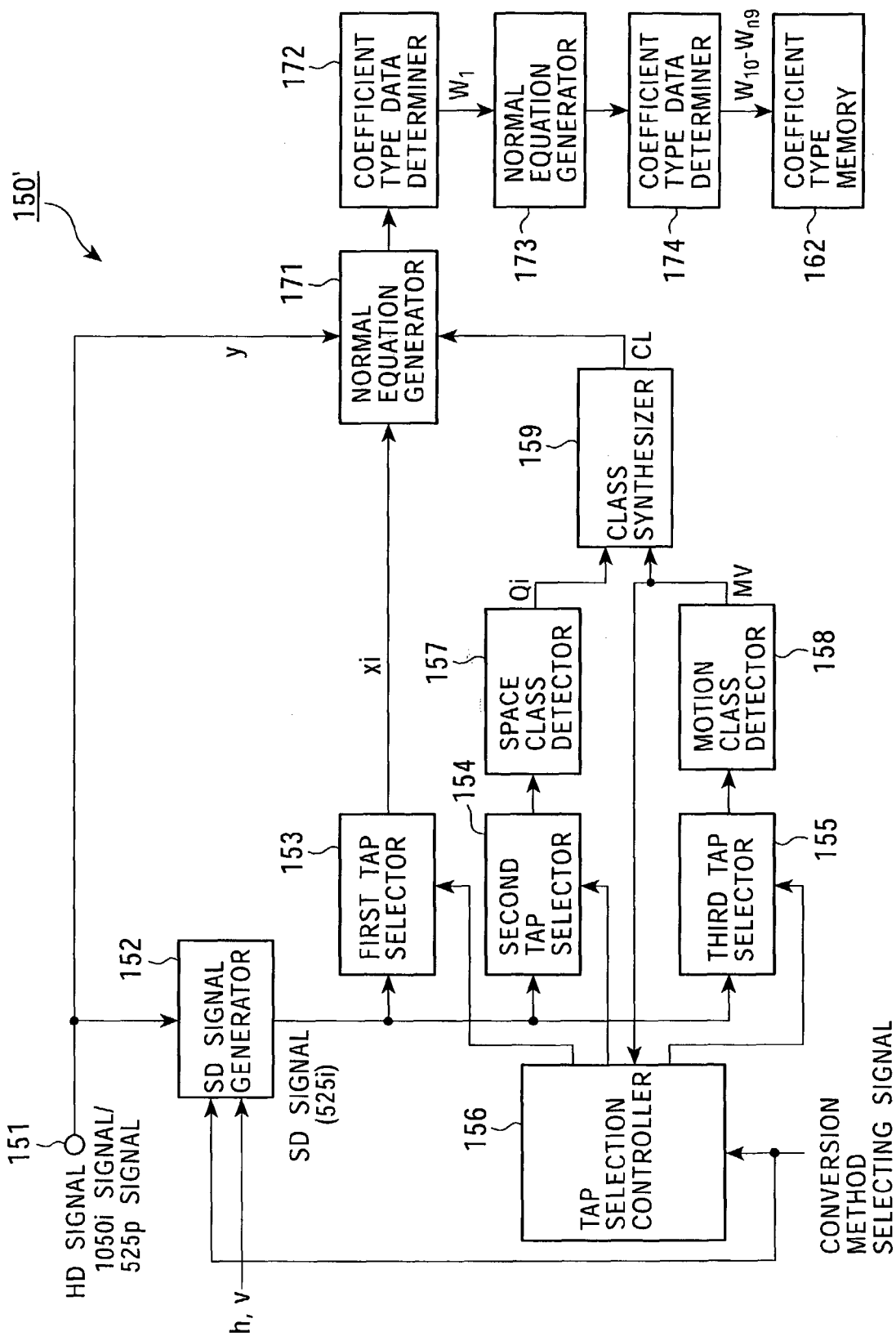
FIG. 26 is a block diagram illustrating another coefficient type data generator.

FIG. 26 illustrates a coefficient type data generator 150' which generates the coefficient type data based on the concept shown in FIG. 25. In FIG. 26, components identical to those described with reference to FIG. 25 are designated with the same reference numerals, and the detailed discussion thereof is omitted here.

The coefficient type data generator 150' includes a normal equation generator 171. The normal equation generator 171 generates a normal equation (see equation (21)) to obtain coefficient type data Wi for each class, based on the HD pixel data y as target pixel data obtained from the HD signal supplied from the input terminal 151, the data xi of the predictive tap (the SD pixel data) selectively picked out by the first tap selector 153 in response to each HD pixel data y, and the class code CL output from the class synthesizer 159 in response to the HD pixel data y.

Learning data is generated by combining a single piece of HD pixel data y and n pieces of predictive tap pixel data responsive to the HD pixel. As the parameters h and v to the SD signal generator 152 are successively updated, a plurality of pieces of SD signals with the horizontal band and vertical band thereof varying in a stepwise fashion are successively generated. The learning data is generated between the HD signal and SD signals. In response to each SD signal, the normal equation generator 171 thus generates a normal equation which is intended to obtain the additive data Wi (i=1, . . ., n) for each class.

The coefficient type data generator 150' further includes a normal equation generator 171, additive data determiner 172, and normal equation generator 173. Upon receiving the data of the normal equation generated by the normal equation generator 171, the additive data determiner 172 solves the normal equation, thereby determining the additive data Wi of each class responsive to the SD signal. The normal equation generator 173 generates a normal equation (see equation (26)) for determining the coefficient type data w10-wn9 for each class based on the additive data Wi of each class responsive to the SD signal.

The coefficient type data generator 150' further includes a coefficient type determiner 174 and coefficient type memory 162. Upon receiving the data of the normal equation generated for each class by the normal equation generator 173, the coefficient type determiner 174 solves the normal equation, thereby determining the coefficient type data w10-wn9 for each class. The coefficient type memory 162 stores the determined coefficient type data w10-wn9 for each class.

The rest of the coefficient type data generator 150' shown in FIG. 26 remains identical in construction to the coefficient type data generator 150 shown in FIG. 23.

The operation of the coefficient type data generator 150' shown in FIG. 26 will now be discussed. Upon receiving the HD signal (one of the 525p signal and 1050i signal) as a training signal at the input terminal 151, the SD signal generator 152 performs a horizontal decimation process and a vertical decimation process on the HD signal, thereby generating the SD signal (the 525i signal) as an input signal.

When the first conversion method is selected (with the processing unit 9 shown in FIG. 8 resulting in the 525p signal from the 525i signal), the SD signal generator 152 performs a decimation process to the 525p signal, thereby outputting the SD signal. When the second conversion method is selected (with the processing unit 9 shown in FIG. 8 resulting in the 1050i signal from the 525i signal), the SD signal generator 152 performs a decimation process to the 1050i signal, thereby outputting the SD signal. The SD signal generator 152 is supplied with the parameters h and v as control signals, thereby successively generating a plurality of SD signals with the horizontal and vertical band varying in a stepwise fashion.

The second tap selector 154 selectively picks out the data of the space class (the SD pixel data) located in the vicinity of a target pixel of the HD signal (one of the 525p signal and 1050i signal) from the SD signal (the 525i signal). The second tap selector 154 thus selects the tap based on the selected conversion method supplied from the tap selection controller 156, and the motion class detected by the motion class detector 158.

The data of the space class (the SD pixel data) selectively picked out by the second tap selector 154 is fed to the space class detector 157. The space class detector 157 performs the ADRC process on the SD pixel data as the data of the space class tap, thereby resulting in the requantization code Qi as the class information of the space class (chiefly, in a class classification to express a waveform in space) (see equation (1)).

The third tap selector 155 selectively picks out the data of the motion class (the SD pixel data) in the vicinity of a target pixel of the HD signal, from the SD signal generated by the SD signal generator 152. The third tap selector 155 selects the tap based on the tap position information, corresponding to the preselected conversion method, supplied from the tap selection controller 156.

The data of the motion class tap selectively picked out by the third tap selector 155 (the SD pixel data) is fed to the motion class detector 158. The motion class detector 158 obtains the class information MV of the motion class (chiefly, in a class classification to express the degree of motion) from the SD pixel data as the data of the motion class tap.

The class information MV and above-referenced requantization code Qi are fed to the class synthesizer 159. The class synthesizer 159 results in the class code CL representing the class to which the target pixel of the HD signal (one of the 525p signal and 1050i signal) belongs to (see equation (3)), from the class information MV and requantization code Qi.

The first tap selector 153 selectively picks out the data of the predictive tap located in the vicinity of a target pixel of the HD signal (the SD pixel data) from the SD signal generated in the SD signal generator 152. In this case, the first tap selector 153 selects the tap based on the tap position information corresponding to the selected conversion method and supplied from the tap selection controller 156.

The normal equation generator 171 generates a normal equation (see equation (21)) to obtain the additive data Wi (i=1, . . . , n) for each class for each SD signal generated by the SD signal generator 152, based on the HD pixel data y as target pixel data obtained from the HD signal supplied from the input terminal 151, the data xi of the predictive tap (the SD pixel data) selectively picked out by the first tap selector 153 in response to each HD pixel data y, and the class code CL output from the class synthesizer 159 in response to the HD pixel data y.

The additive data determiner 172 solves the normal equation, thereby determining the additive data Wi for each class responsive to the SD signal. The normal equation generator 173 generates the normal equation (see equation (26)) for determining the coefficient type data w10-wn9 for each class based on the additive data Wi of each class responsive to the SD signal.

The coefficient type determiner 174 solves the normal equation, thereby determining the coefficient type data w10-wn9 for each class. The determined coefficient type data w10-wn9 are stored in the coefficient type memory 162 which is partitioned on a class by class basis according to address.

The coefficient type data generator 150' illustrated in FIG. 26 also generates the coefficient type data w10-wn9 of each class stored in the information memory bank 135 in the processing unit 9 shown in FIG. 8. In this case, the SD signal generator 152 generates the SD signal (the 525i signal) using one of the 525p signal and the 1050i signal in accordance with the selected conversion method, thereby outputting the coefficient data in response to the first conversion method (with the processing unit 9 resulting in the 525p signal from the 525i signal) or the second conversion method (with the processing unit 9 resulting in the 1050i signal from the 525i signal).

The processing unit 9 shown in FIG. 8 uses the generation equation (5) to determine the additive data Wi (i=1, ..., n). Alternatively, equation (27) or equation (28) may be employed. Furthermore, the processing unit 9 may use a polynomial having a different number of terms, or a formula expressing another function.

$$W_1 = w_{10} + w_{11}v + w_{12}h + w_{13}v^2 + w_{14}h^2 + w_{15}v^3 + w_{16}h^3 \quad (27)$$
$$W_2 = w_{20} + w_{21}v + w_{22}h + w_{23}v^2 + w_{24}h^2 + w_{25}v^3 + w_{26}h^3$$
$$\vdots$$
$$W_i = w_{i0} + w_{i1}v + w_{i2}h + w_{i3}v^2 + w_{i4}h^2 + w_{i5}v^3 + w_{i6}h^3$$
$$\vdots$$
$$W_n = w_{n0} + w_{n1}v + w_{n2}h + w_{n3}v^2 + w_{n4}h^2 + w_{n5}v^3 + w_{n6}h^3$$

$$W_1 = w_{10} + w_{11}v + w_{12}h + w_{13}v^2 + w_{14}vh + w_{15}h^2 \quad (28)$$
$$W_2 = w_{20} + w_{21}v + w_{22}h + w_{23}v^2 + w_{24}vh + w_{25}h^2$$
$$\vdots$$
$$W_i = w_{i0} + w_{i1}v + w_{i2}h + w_{i3}v^2 + w_{i4}vh + w_{i5}h^2$$
$$\vdots$$
$$W_n = w_{n0} + w_{n1}v + w_{n2}h + w_{n3}v^2 + w_{n4}vh + w_{n5}h^2$$

The processing unit 9 shown in FIG. 8 sets the parameter h designating a horizontal resolution, and the parameter v designating a vertical resolution. The horizontal and vertical resolutions are thus adjusted by adjusting the values of parameters h and v. For example, a parameter z designating a noise reduction ratio may be accounted for. By adjusting the parameter z, the noise reduction ratio on an image is adjusted.

Equation (29) or (30) may be used as a generation equation for generating additive data Wi (i=1, ..., n). Alternatively, a polynomial having a different number of terms, and a formula expressing a different function may be used.

$$W_1 = w_{10} + w_{11}z + w_{12}z^2 + w_{13}z^3 \quad (29)$$
$$W_2 = w_{20} + w_{21}z + w_{22}z^2 + w_{23}z^3$$
$$\vdots$$
$$W_i = w_{i0} + w_{i1}z + w_{i2}z^2 + w_{i3}z^3$$
$$\vdots$$
$$W_n = w_{n0} + w_{n1}z + w_{n2}z^2 + w_{n3}z^3$$

-continued
$$W_1 = w_{10} + w_{11}z + w_{12}z^2 \quad (30)$$
$$W_2 = w_{20} + w_{21}z + w_{22}z^2$$
$$\vdots$$
$$W_i = w_{i0} + w_{i1}z + w_{i2}z^2$$
$$\vdots$$
$$W_n = w_{n0} + w_{n1}z + w_{n2}z^2$$

The coefficient type data generator 150 illustrated in FIG. 23 or the coefficient type data generator 150' illustrated in FIG. 26 may be used to generate the coefficient type data as the additive data of the generation equation containing the above-mentioned parameter z as in the case in which the coefficient type data as the additive data of the generation equation containing the above-referenced parameters h and v is generated.

The SD signal generator 152 is supplied with the parameter z as a control signal, and varies a noise addition state in response to the SD signal in a stepwise manner in accordance with the parameter z when the SD signal is generated from the HD signal. Learning data is registered by varying the noise addition state in response to the SD signal in a stepwise manner, and coefficient type data for obtaining a consecutively changing noise reduction ratio is thus generated.

Several methods of adding noise in accordance with the parameter z will now be discussed.

Figure 27A:
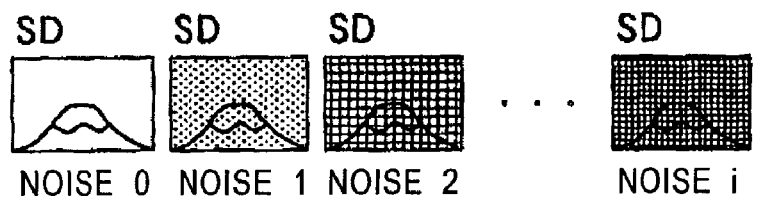
FIGS. 27A-27C illustrate a noise addition method.

Referring to FIG. 27A, an SD signal containing noise having a level thereof changing in a stepwise manner is generated by adding a noise signal having the amplitude thereof changing in a stepwise manner to the SD signal.

Figure 27B:
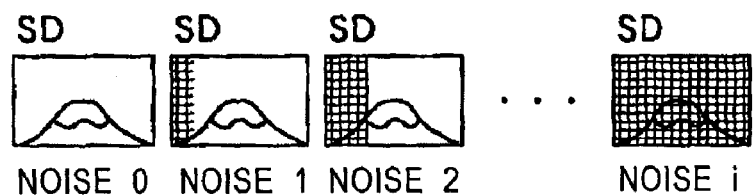

A noise signal having a constant amplitude is added to the SD signal as shown in FIG. 27B, and a noise added display area is varied in a stepwise manner.

Figure 27C:
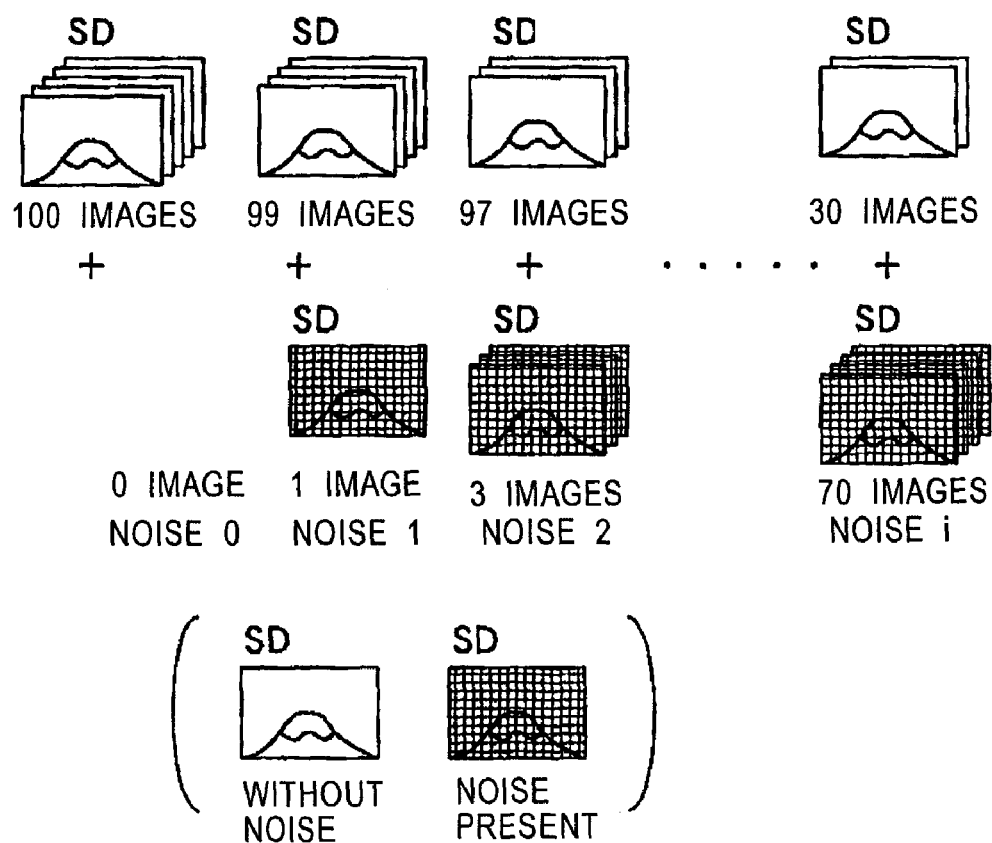

Referring to FIG. 27C, SD signals (on a per screen basis) containing noise and SD signals containing no noise are prepared. When the normal equation is generated, a plurality of learnings are performed on each SD signal.

For example, 100 learning cycles are performed on the noise free SD signals in the "noise zero" case, 30 learning cycles are performed on the noise free SD signals in the "noise i" case, and 70 learning cycles are performed on the SD signals having noise. The "noise i" case becomes a learning system which calculates coefficient type data providing a higher noise reduction ratio. In this way, the learning process is performed with the learning cycles changing in a stepwise manner to the SD signals containing noise and the SD signals containing no noise. The coefficient type data for obtaining a consecutively changing noise reduction ratio results.

This method may be performed by adding the normal equations. A learning process is performed to calculate the additive data of an estimation equation in the "noise zero" case through the "noise i" case. The normal equation then becomes equation (21). If Pij and Qj are respectively defined by equations (31) and (32), equation (21) is rewritten as equation (33). Here, let xij represent an i-th learned value of the SD pixel data of a j-th predictive tap position, yi represent an i-th learned value of the HD pixel data, and Wi represent a coefficient.

$$P_{ij} = \sum_p x_{pi} x_{pj} \quad (31)$$

-continued $$Q_j = \sum_p x_{pj} y_p \quad (32)$$

$$\begin{bmatrix} P_{11} & P_{12} & \cdots & P_{1n} \\ P_{21} & P_{22} & \cdots & P_{2n} \\ \vdots & \vdots & \ddots & \vdots \\ P_{n1} & P_{n2} & \cdots & P_{nn} \end{bmatrix} \begin{bmatrix} W_1 \\ W_2 \\ \vdots \\ W_n \end{bmatrix} = \begin{bmatrix} Q_1 \\ Q_2 \\ \vdots \\ Q_n \end{bmatrix} \quad (33)$$

When the learning process is performed on the SD signal containing no noise, the left-hand side of equation (33) is defined as [P1ij] and the right-hand side as [Q1i]. Similarly, when the learning process is performed on the SD signal containing noise, the left-hand side of equation (33) is defined as [P2ij] and the right-hand side as [Q2i]. [Paij] and [Qai] are respectively defined by equations (34) and (35):

$$[Paij]=(1-a)[P1ij]+a[P2ij] \quad (34)$$

$$[Qai]=(1-a)[Q1i]+a[Q2i] \quad (35)$$

where $0 \leq a < 1$.

When a=0, the normal equation becomes equation (36). This equation is equivalent to a normal equation with the "noise zero" case as shown in FIG. 27C. When a=0.7, the equation is equivalent to a normal equation with the "noise i" case.

$$[Paij][Wi]=[Qai] \quad (36)$$

Target coefficient type data may be obtained by formulating a normal equation of noise level with the value a changed in a stepwise manner. As already discussed in connection with the coefficient type data generator 150' shown in FIG. 26, the additive data Wi is calculated from the normal equation at each noise level, and the coefficient type data is thus determined based on the additive data at each level.

The normal equation for determining the coefficient type data expressed by the above-referenced equation (13) may be generated by combining the normal equations et each noise level. This method will now be specifically discussed. The normal equation for determining the coefficient type data is here generated using equation (30).

A learning process is performed beforehand by generating the SD signal at a noise level corresponding to several parameters z. [P] expressed as [Pnij], and [Q] expressed as [Qni] respectively represented by equations (34) and (35) are prepared. Equation (7) is rewritten as equation (37).

$$t0=1, t1=z, t2=z2 \quad (37)$$

The above-referenced equations (24) and (25) are respectively rewritten as equations (38) and (39). Coefficient type data wij is determined by solving equation (40). A variable expressing the total number of predictive taps is rewritten as m.

$$X_{ipjq} = \sum_Z t_p t_q P_{zij} \quad (38)$$

$$Y_{ip} = \sum_Z t_p Q_{zi} \quad (39)$$

$$\begin{bmatrix} X_{1010} & X_{1011} & X_{1012} & X_{1020} & \cdots & X_{10m2} \\ X_{1110} & X_{1111} & X_{1112} & X_{1120} & \cdots & X_{11m2} \\ X_{1210} & X_{1211} & X_{1212} & X_{1220} & \cdots & X_{12m2} \\ X_{2010} & X_{2011} & X_{2012} & X_{2020} & \cdots & X_{20m2} \\ \vdots & \vdots & \vdots & \vdots & \ddots & \vdots \\ X_{m210} & X_{m211} & X_{m212} & X_{m220} & \cdots & X_{m2m2} \end{bmatrix} \begin{bmatrix} w_{10} \\ w_{11} \\ w_{12} \\ w_{20} \\ \vdots \\ w_{m2} \end{bmatrix} = \begin{bmatrix} Y_{10} \\ Y_{11} \\ Y_{12} \\ Y_{20} \\ \vdots \\ Y_{m2} \end{bmatrix} \quad (40)$$

The processing unit 9 shown in FIG. 8 sets the parameter h designating a horizontal resolution, and the parameter v designating a vertical resolution. The horizontal and vertical resolutions are thus adjusted by adjusting the values of parameters h and v. The horizontal and vertical resolutions may be adjusted by a single parameter. For example, a single parameter r designating the horizontal and vertical resolutions is set. Specifically, the correspondence of the single parameter becomes as follows: r=1 means h=1 and v=1, r=2 means h=2 and v=2, . . . , or r=1 means h=1 and v=2, r=2 means h=2 and v=3, . . . A generation equation for generating the additive data Wi (i=1, . . . , n) may be a polynomial of r.

Furthermore, the processing unit 9 shown in FIG. 8 sets the parameter h designating a horizontal resolution, and the parameter v designating a vertical resolution. The horizontal and vertical resolutions are thus adjusted by adjusting the values of plurality of types of parameters h and v. Alteratively, a parameter r designating the horizontal and vertical resolutions and a parameter z designating the degree of noise reduction (noise reduction ratio) are set. The horizontal and vertical resolutions, and the noise reduction ratio of an image are adjusted by adjusting the plurality of parameters r and z.

For example, equation (41) may be used as a generation equation to generate the additive data Wi (i=1, . . . , n). Alternatively, a polynomial having a different number of terms, and a formula expressing a different function may be used.

$$W_1 = w_{10} + w_{11}r + w_{12}z + w_{13}r^2 + w_{14}rz + \\ w_{15}z^2 + w_{16}r^3 + w_{17}r^2z + w_{18}rz^2 + w_{19}z^3$$

$$W_2 = w_{20} + w_{21}r + w_{22}z + w_{23}r^2 + w_{24}rz + \\ w_{25}z^2 + w_{26}r^3 + w_{27}r^2z + w_{28}rz^2 + w_{29}z^3$$

$$\vdots$$

$$W_i = w_{i0} + w_{i1}r + w_{i2}z + w_{i3}r^2 + \\ w_{i4}rz + w_{i5}z^2 + w_{i6}r^3 + w_{i7}r^2z + w_{i8}rz^2 + w_{i9}z^3$$

$$\vdots$$

$$W_n = w_{n0} + w_{n1}r + w_{n2}z + w_{n3}r^2 + w_{n4}rz + \\ w_{n5}z^2 + w_{n6}r^3 + w_{n7}r^2z + w_{n8}rz^2 + w_{n9}z^3$$

$$(41)$$

The coefficient type data generator 150 illustrated in FIG. 23 or the coefficient type data generator 150' illustrated in FIG. 26 may be used to generate the coefficient type data as the additive data of the generation equation containing the above-mentioned parameters r and z as in the case in which the coefficient type data as the additive data of the generation equation containing the above-referenced parameters h and v is generated.

The SD signal generator 152 is supplied with the parameters r and z as control signals, and varies the horizontal band and vertical band of the SD signal, and a noise addition state in response to the SD signal in a stepwise manner in accordance with the parameters r and z when the SD signal is generated from the HD signal.

Figure 28:
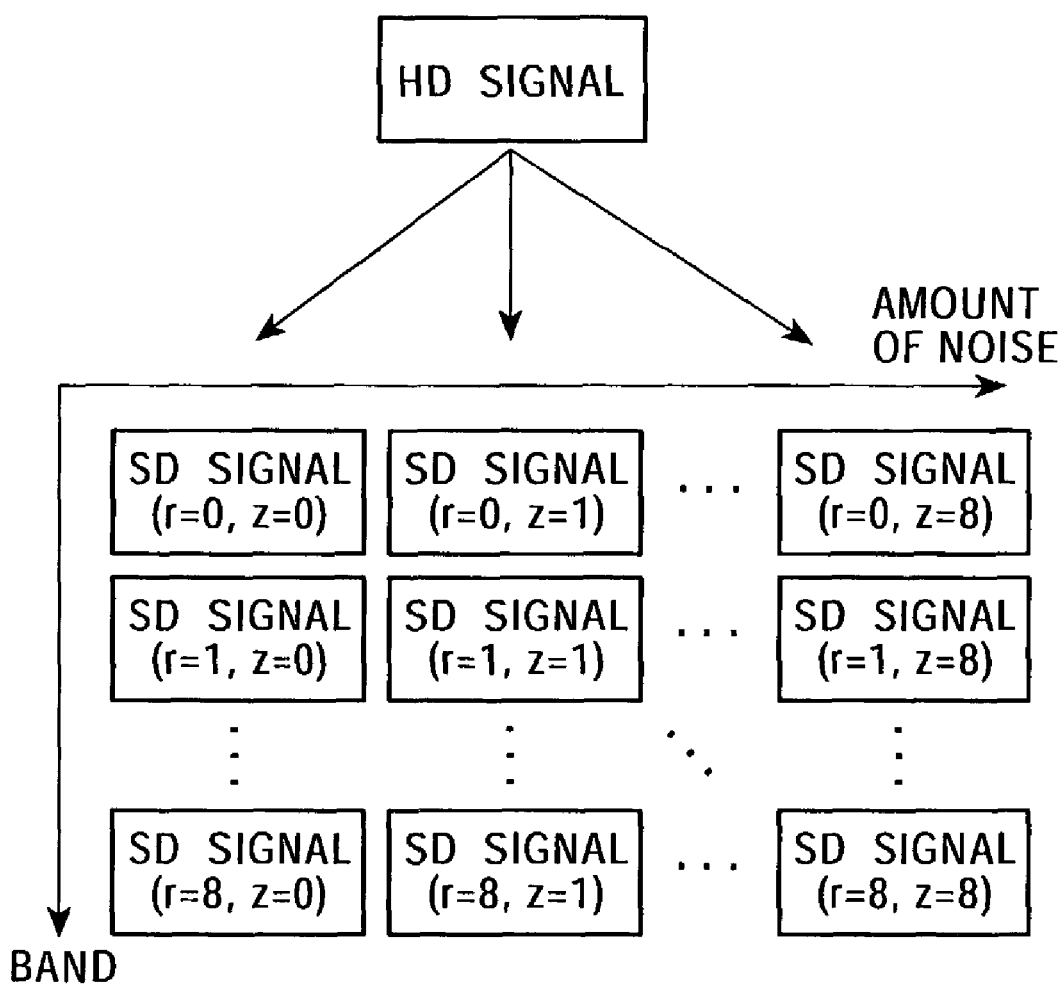
FIG. 28 illustrates generated SD signals (parameters r and z)

FIG. 28 illustrates the SD signal which is generated in response to the values of the parameters r and z. In this case, a total of 81 types of SD signals are generated by varying the parameters r and v in steps of 9. It is acceptable if the parameters r and z are varied in steps of more than 9. In such a case, however, the amount of calculation is increased although the accuracy level of the calculated coefficient type data its heightened.

In the above discussion, the processing unit 9 shown in FIG. 8 sets the parameter h designating a horizontal resolution, and the parameter v designating a vertical resolution. The horizontal and vertical resolutions are thus adjusted by adjusting the values of parameters h and v. In addition to the parameters h and v, a parameter z designating the noise reduction ratio may be set so that the horizontal and vertical resolutions and the noise reduction ratio of an image are adjusted.

In this case, equation (42) may be used, for example, as a generation equation to generate the additive data Wi (i= 1, . . . , n). Alternatively, a polynomial having a different number of terms, and a formula expressing a different function may be used.

$$\begin{aligned}
W_1 = {} & w_{1\_0} + w_{1\_1}v + w_{1\_2}h + w_{1\_3}z + w_{1\_4}v^2 + \\
& w_{1\_5}h^2 + w_{1\_6}z^2 + w_{1\_7}vh + w_{1\_8}hz + w_{1\_9}zv + \\
& w_{1\_10}v^3 + w_{1\_11}h^3 + w_{1\_12}z^3 + w_{1\_13}v^2h + w_{1\_14}vh^2 + \\
& w_{1\_15}vhz + w_{1\_16}vz^2 + w_{1\_17}h^2z + w_{1\_18}hz^2 + w_{1\_19}z^3 \\
W_2 = {} & w_{2\_0} + w_{2\_1}v + w_{2\_2}h + w_{2\_3}z + w_{2\_4}v^2 + \\
& w_{2\_5}h^2 + w_{2\_6}z^2 + w_{2\_7}vh + w_{2\_8}hz + w_{2\_9}zv + \\
& w_{2\_10}v^3 + w_{2\_11}h^3 + w_{2\_12}z^3 + w_{2\_13}v^2h + w_{2\_14}vh^2 + \\
& w_{2\_15}vhz + w_{2\_16}vz^2 + w_{2\_17}h^2z + w_{2\_18}hz^2 + w_{2\_19}z^3 \\
& \vdots \\
W_i = {} & w_{i\_0} + w_{i\_1}v + w_{i\_2}h + w_{i\_3}z + w_{i\_4}v^2 + \\
& w_{i\_5}h^2 + w_{i\_6}z^2 + w_{i\_7}vh + w_{i\_8}hz + w_{i\_9}zv + \\
& w_{i\_10}v^3 + w_{i\_11}h^3 + w_{i\_12}z^3 + w_{i\_13}v^2h + w_{i\_14}vh^2 + \\
& w_{i\_15}vhz + w_{i\_16}vz^2 + w_{i\_17}h^2z + w_{i\_18}hz^2 + w_{i\_19}z^3 \\
& \vdots \\
W_n = {} & w_{n\_0} + w_{n\_1}v + w_{n\_2}h + w_{n\_3}z + w_{n\_4}v^2 + \\
& w_{n\_5}h^2 + w_{n\_6}z^2 + w_{n\_7}vh + w_{n\_8}hz + w_{n\_9}zv + \\
& w_{n\_10}v^3 + w_{n\_11}h^3 + w_{n\_12}z^3 + w_{n\_13}v^2h + w_{n\_14}vh^2 + \\
& w_{n\_15}vhz + w_{n\_16}vz^2 + w_{n\_17}h^2z + w_{n\_18}hz^2 + w_{n\_19}z^3
\end{aligned} \quad (42)$$

The coefficient type data generator 150 illustrated in FIG. 23 or the coefficient type data generator 150' illustrated in FIG. 26 may be used to generate the coefficient type data as the additive data of the generation equation containing the above-mentioned parameters h, v, and z as in the case in which the coefficient type data as the additive data of the generation equation containing the above-referenced parameters h and v is generated.

The SD signal generator 152 is supplied with the parameters h, v, and z as control signals, and varies the horizontal band and vertical band of the SD signal, and a noise addition state in response to the SD signal in a stepwise manner in accordance with the parameters h, v, and z when the SD signal is generated from the HD signal.

Figure 29:
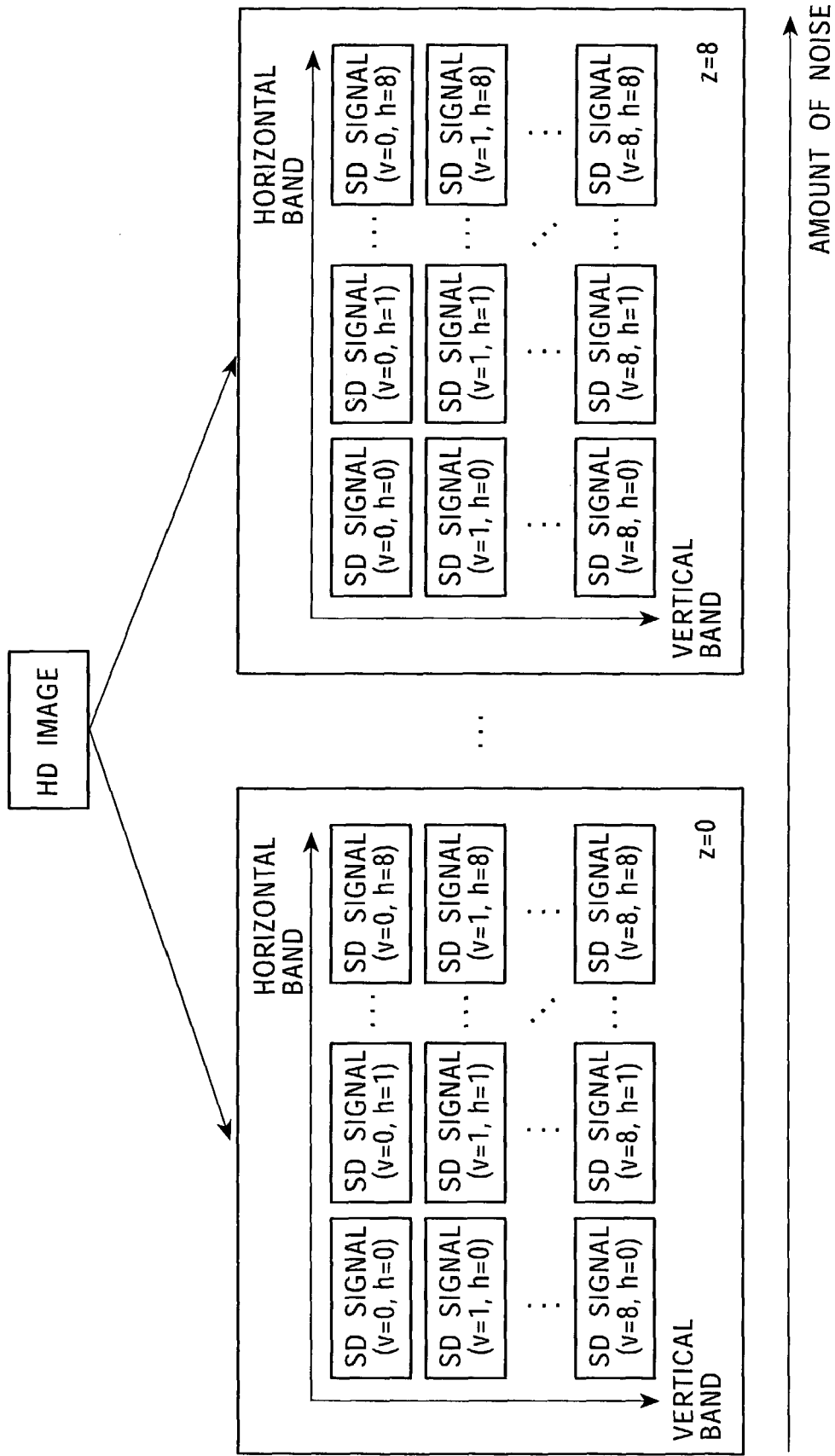
FIG. 29 illustrates generated SD signals (parameters h, v, and z)

FIG. 29 illustrates the SD signal which is generated in response to the values of the parameters h, v, and z. In this case, a total of 729 types of SD signals are generated by varying the parameters h, v and z in steps of 9. It is acceptable if the parameters h, v, and z are varied in steps of more than 9. In such a case, however, the amount of calculation is increased although the accuracy level of the calculated coefficient type data is heightened.

Figure 30:
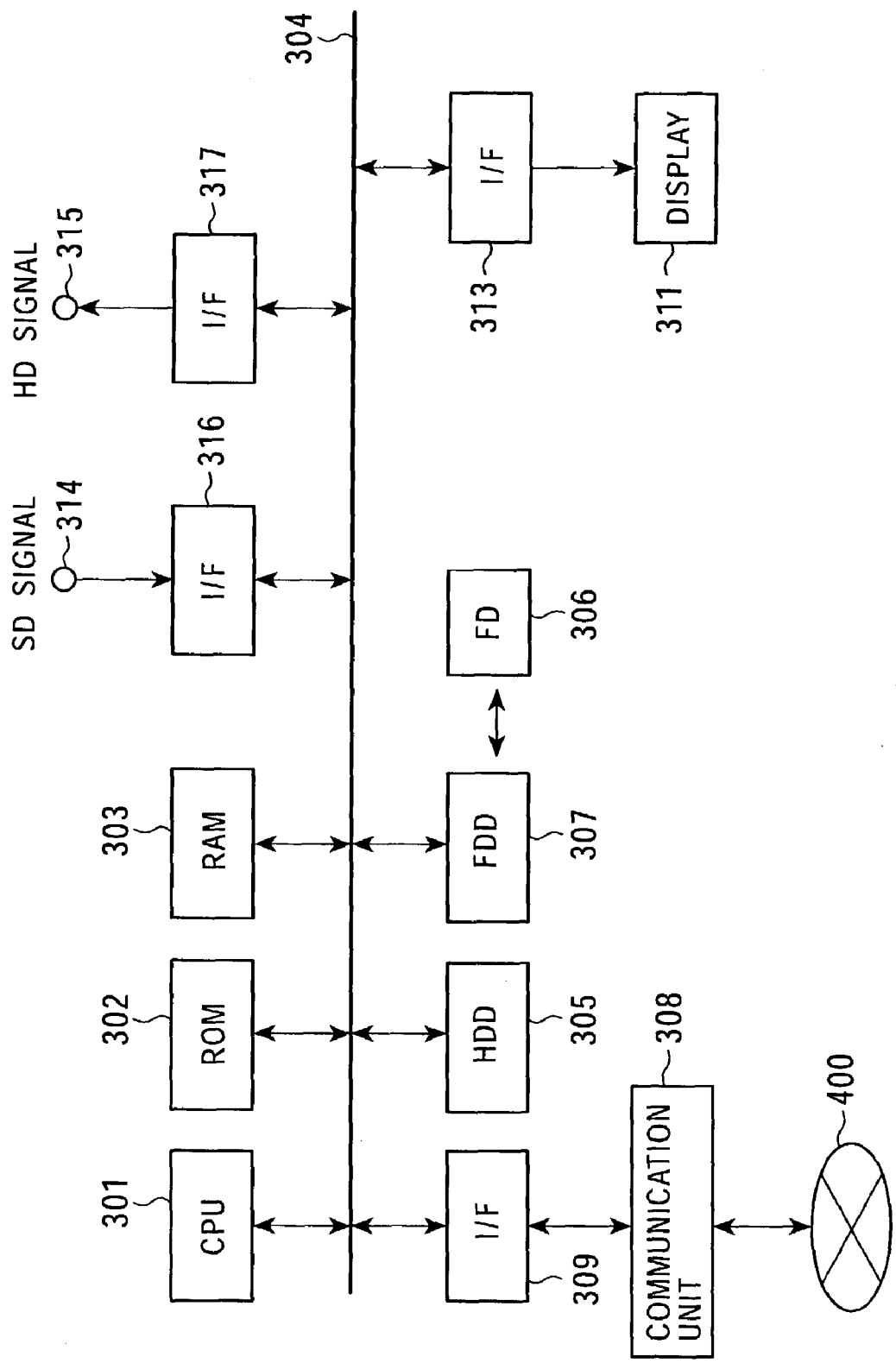
FIG. 30 is a block diagram illustrating a video signal processing apparatus which processes a video signal using software.

The process of the processing unit 9 shown in FIG. 8 may be carried out using software of a video signal processing apparatus 300 shown in FIG. 30.

The video signal processing apparatus 300 is discussed below with reference to FIG. 30. The video signal processing apparatus 300 includes a CPU 301 for controlling the entire apparatus, ROM (Read-Only Memory) 302 for storing an operation program of the CPU 301 and the coefficient type data, etc., and RAM (Random Access Memory) 303 serving as a working area for the CPU 301. The CPU 301, ROM 302, and RAM 303 are respectively connected to a bus 304.

The video signal processing apparatus 300 further includes a hard disk drive (HDD) 305 as an external disk drive and floppy disk drive (FDD) 307 for driving a floppy disk 306. These drives 305 and 307 are respectively connected to the bus 304.

The video signal processing apparatus 300 further includes a communication unit 308 which is connected to a communication network 400 such as the Internet using a wired or wireless link. The communication unit 308 is connected to the bus 304 through an interface 309.

The video signal processing apparatus 300 also includes an input terminal 314 for receiving the SD signal, and an output terminal 315 for outputting the HD signal. The input terminal 314 is connected to the bus 304 through an interface 316, and the output terminal 315 is connected to the bus 304 through an interface 317.

Rather than storing the processing program, coefficient type data, etc. in the ROM 302, the processing program and coefficient type data may be downloaded from the communication network 400 such as the Internet via the communication unit 308, and stored in the hard disk or RAM 303. The processing program, coefficient type data, etc. may be supplied in the floppy disk 306.

The SD signal to be processed may be stored beforehand in the hard disk instead of being input through the input terminal 314, or may be downloaded from the communication network 400 such as the Internet through the communication unit 308. Instead of or in parallel with being output through the output terminal 315, the processed HD signal may be supplied to a display 311, may be stored in the hard disk, or may be output to the communication network 400 such as the Internet through the communication unit 308.

A video signal process of the video signal processing apparatus 300 shown in FIG. 30 for obtaining the HD signal from the SD signal are discussed with reference to a flow diagram shown in FIG. 31.

The video signal process starts at step ST1. The SD pixel data is input on a frame by frame basis or a field by field basis in step ST2. When the SD pixel data is input through the input terminal 314, the SD pixel data is temporarily stored in the RAM 303. When the SD pixel data is stored in the hard disk, the hard disk drive 305 reads the SD pixel data, and temporarily stores the SD pixel data in the RAM 303. In step ST3, the video signal processing apparatus 300 determines whether an entire frame or an entire field of the processing of the input SD pixel data is completed. If it is determined that the processing of the entire frame or the entire field is completed, the video signal process ends in step ST4. If it is determined that the processing of the entire frame or the entire field is not completed, the algorithm proceeds to step ST5.

In step ST5, image quality designate values (such as parameters h and v) are read into the RAM 303. In step ST6, the additive data Wi of the estimation equation (see equation (4)) is generated using the generation equation (e.g., equation (5)) based on the read image quality designate values and the coefficient type data of each class.

In step ST7, pixel data of the class tap and predictive tap is acquired in response to each HD pixel data to be generated, from the SD pixel data input in step ST2. In step ST8, the video signal processing apparatus 300 determines whether the process for obtaining the HD pixel data in all regions of the input SD pixel data is completed. If it is determined that the process is completed, the algorithm loops to step ST2 to start over again with an input step of the SD pixel data of a next frame or a next field. If it is determined that the process is not completed, the algorithm proceeds to step ST9.

In step ST9, the class code CL is generated from the SD pixel data of the class tap acquired in step ST7. In step ST10, the HD pixel data is generated using the estimation equation based on the additive data responsive to the class code CL and the SD pixel data of the predictive tap. The algorithm then loops to step ST7 to start over again with the above-mentioned process.

Figure 31:
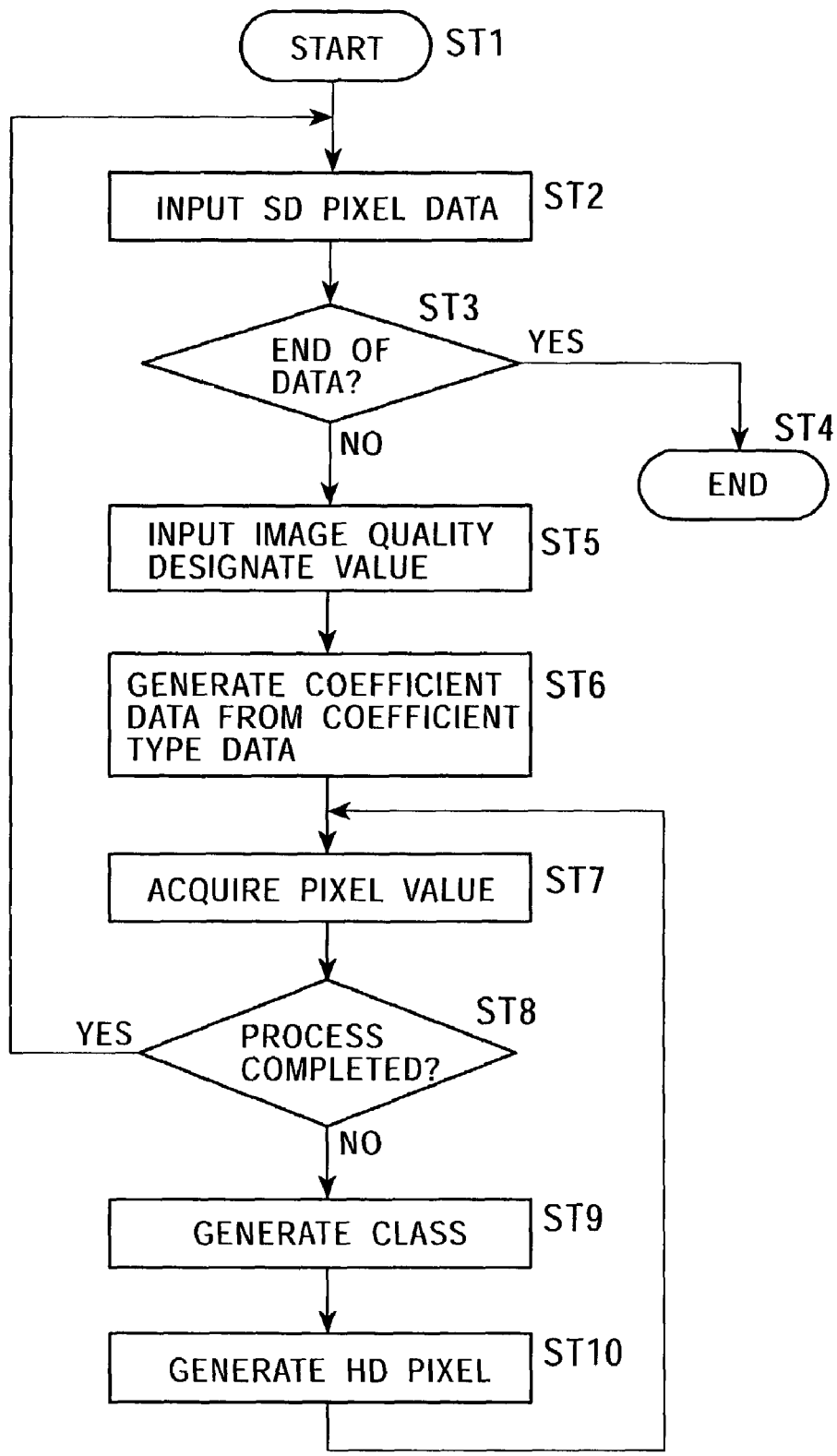
FIG. 31 is a flow diagram illustrating steps for processing a video signal.

In this way, the SD pixel data forming the input SD signal is processed in accordance with the flow diagram illustrated in FIG. 31. The HD pixel data forming the HD signal is thus obtained. As discussed above, the HD signal thus processed is output to the output terminal 315, fed to the display 311 to present the image corresponding thereto, or fed to the hard disk drive 305 to be stored in the hard disk thereof.

The process of the coefficient type data generator 150 shown in FIG. 23 may be carried out using software although the configuration of the software is not shown in drawings.

The process of generating the coefficient type data is discussed below referring to a flow diagram shown in FIG. 32.

In step ST21, the algorithm of the process starts. In step ST22, an image quality pattern (determined by the parameters h and v, for example) to be used in a learning process is selected. In step ST23, the coefficient type data generator 150 determines whether the learning of all image quality patterns is completed. If it is determined that the learning of all image quality patterns is not yet completed, the algorithm proceeds to step ST24.

In step ST24, known HD pixel data is input on a frame by frame basis or a field by field basis. It is determined in step ST25 whether the processing of all HD pixel data is completed. If it is determined that the processing of all HD pixel data is completed, the algorithm loops to step ST 22. A next image quality pattern is selected and the above-referenced process steps are repeated. If it is determined that the process of all HD pixel data is not completed, the algorithm proceeds to step ST26.

In step ST26, the SD pixel data is generated from the HD pixel data input in step ST24, based on the image quality pattern selected in step ST22. In step ST27, pixel data of the class tap and the predictive tap is acquired in response to each HD pixel data input in step ST24, from the SD pixel data generated in step ST26. It is determined in step ST28 whether a learning process is completed in all regions of the generated SD pixel data. If it is determined in step S28 that the learning process is completed, the algorithm loops to step ST24. The inputting of next HD pixel data is performed to repeat the above-referenced process steps. If it is determined the learning process is not completed, the algorithm proceeds to step ST29.

In step ST29, the class code CL is generated from the SD pixel data of the class tap acquired in step ST27. In step ST30, the normal equation (see equation (13)) is generated. The algorithm then loops to step ST27.

If it is determined in step ST23 that the learning process of all image quality patterns is completed, the algorithm proceeds to step ST31. In step ST31, the coefficient type data of each class is calculated by solving the normal equation using the sweep method. In step ST32, the coefficient type data is stored in memory. In step ST33, the process ends.

Figure 32:
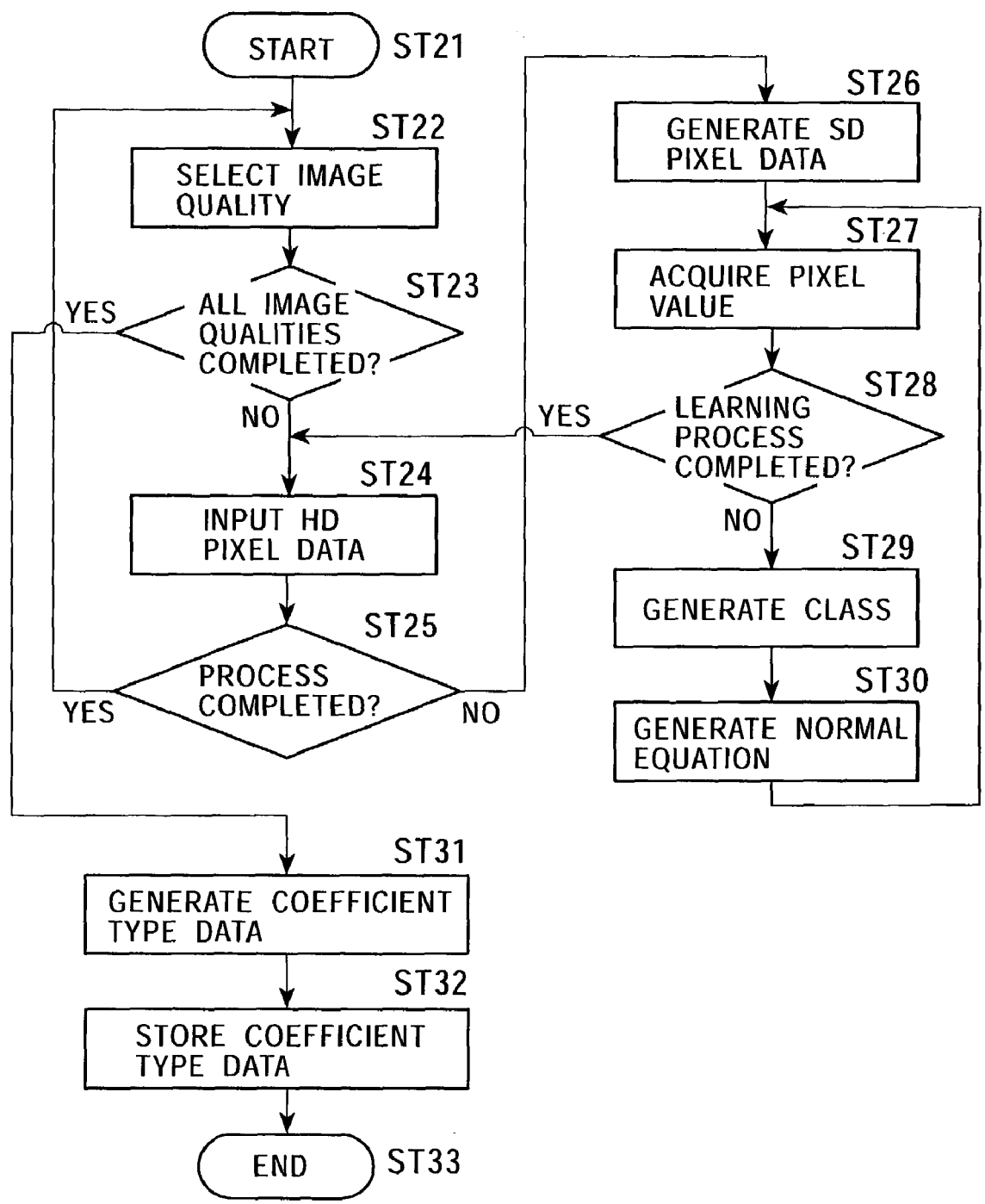
FIG. 32 is a flow diagram of a process (1) for generating coefficient type data.

The coefficient type data of each class is obtained in the process illustrated in the flow diagram shown in FIG. 32 in the same manner as the process of the coefficient type data generator 150 shown in FIG. 23.

The process of the coefficient type data generator 150' shown in FIG. 26 is also carried out using software although the configuration of the software is not shown.

The process of generating the coefficient type data is discussed below referring to a flow diagram shown in FIG. 33.

In step ST41, the process starts. In step ST42, an image quality pattern (determined by the parameters h and v, for example) to be used in a learning process is selected. It is determined in step ST43 whether the calculation of the additive data to all image quality patterns is completed. If it is determined that the calculation is not completed, the algorithm proceeds to step ST44.

In step ST44, known HD pixel data is input on a frame by frame basis or a field by field basis. It is determined in step ST45 whether the processing of all HD pixel data is completed. If it is determined that the processing of all HD pixel data is not completed, the SD pixel data is generated in step ST46 from the HD pixel data input in step ST44, based on the image quality pattern selected in step ST42.

In step ST47, pixel data of the class tap and the predictive tap is acquired in response to each HD pixel data input in step ST44, from the SD pixel data generated in step ST46. It is determined in step ST48 whether a learning process is completed in all regions of the generated SD pixel data. If it is determined in step S48 that the learning process is completed, the algorithm loops to step ST44. The inputting of next HD pixel data is performed to repeat the above-referenced process steps. If it is determined the learning process is not completed, the algorithm proceeds to step ST49.

In step ST49, the class code CL is generated from the SD pixel data of the class tap acquired in step ST47. In step ST50, the normal equation (see equation (21)) for acquiring the additive data is generated. The algorithm then loops to step ST47.

If it is determined in step ST45 that the processing of all HD pixel data is completed, the additive data of each class is calculated in step ST51 by solving the normal equation generated in step ST50 using the sweep method. Returning to step S42, an next image quality pattern is selected. A similar process is repeated to determined the additive data for each class for a next image pattern.

If it is determined in step ST43 that the calculation of the additive data of all image quality patterns is completed, the algorithm proceeds to step S52. In step ST52, a normal equation (see equation (26)) for determining the coefficient type data is generated from the additive data corresponding to all image quality patterns.

In step ST53, the coefficient type data of each class is calculated by solving the normal equation generated in step ST52 using the sweep method or the like. In step ST54, the coefficient type data is stored in memory, and the process ends in step ST55.

Figure 33:
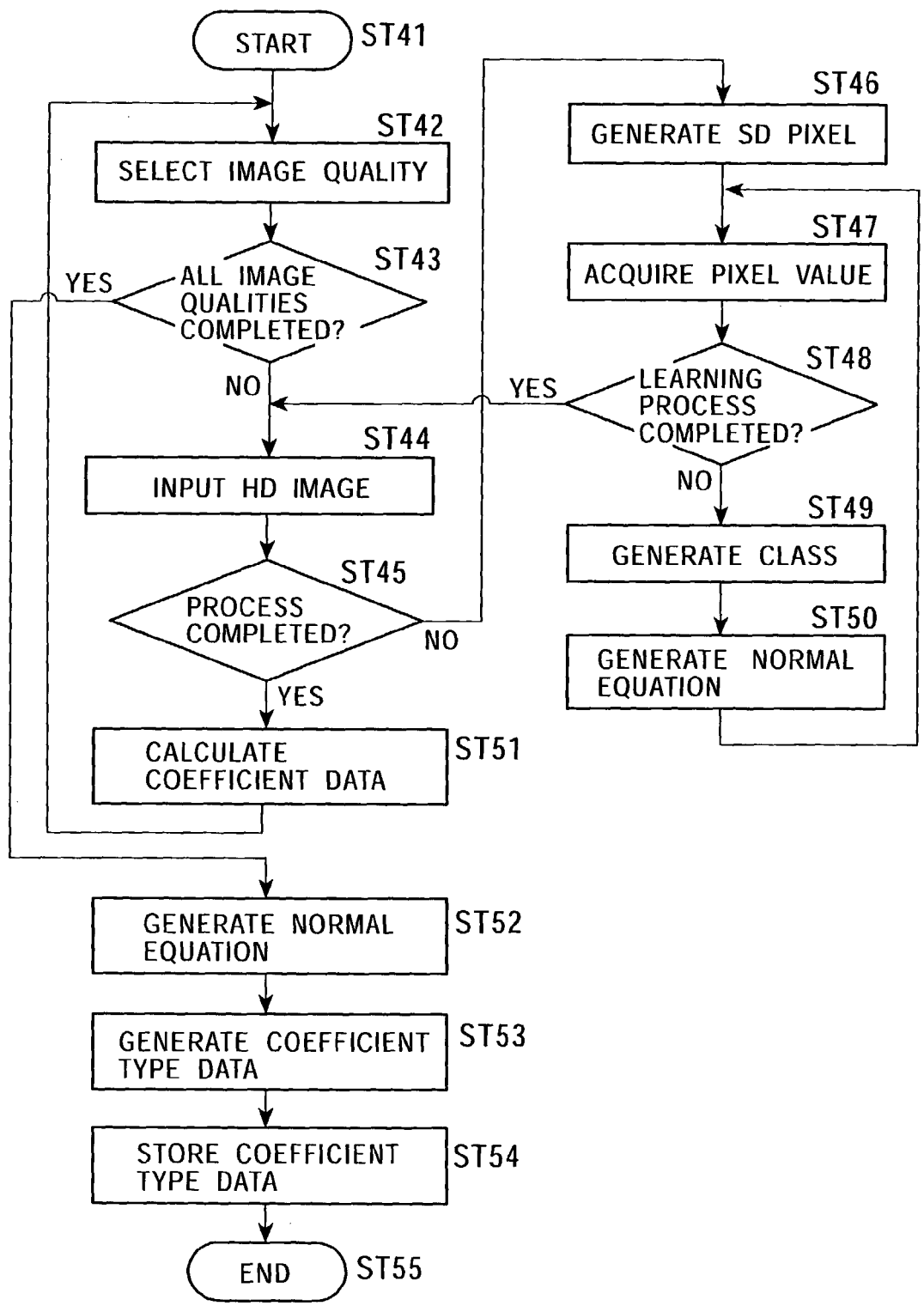
FIG. 33 is a flow diagram of a process (2) for generating coefficient type data.

The coefficient type data of each class is obtained in the process illustrated in the flow diagram shown in FIG. 33 in the same manner as the process of the coefficient type data generator 150' shown in FIG. 26.

In the above discussion, a linear equation of the first degree is used as the estimation equation for generating the HD signal. The present invention is not limited to this. For example, equations of the higher degree may be used.

In the above-referenced embodiments, the SD signal (the 525$i$ signal) is converted into the HD signal (one of the 525$p$ signal and 1050$i$ signal). The present invention is not limited to this case. The present invention may be equally applied when a first video signal is converted into a second video signal using an estimation equation.

The information signal is a video signal in the above discussion. The present invention is not limited to the video signal. For example, the present invention is equally applied when the information signal is an audio signal.

In accordance with the "class classification adaptive process", the additive data of the estimation equation used in the conversion of a first information signal to a second information signal is generated using the coefficient type data. A quality of the output obtained from the second information signal, for example, an image quality of an image is smoothly adjusted without any steps. The additive data of each class responsive to the parameter determining the quality of the output is generated using the coefficient type data each time. This arrangement eliminates the need for storing a large amount of additive data in memory. Memory conservation is thus promoted.

In accordance with the "class classification adaptive process", the sum of the additive data of the estimation equation generated using the coefficient type data is determined. The sum of the additive data is divided by the sum of information data of a target point generated using the estimation. This arrangement removes level variations of the information data of the target point due to the rounding error which is introduced when the additive data of the estimation equation is determined using the coefficient type data.

Business Method Implementing the Present Invention

Figure 34:
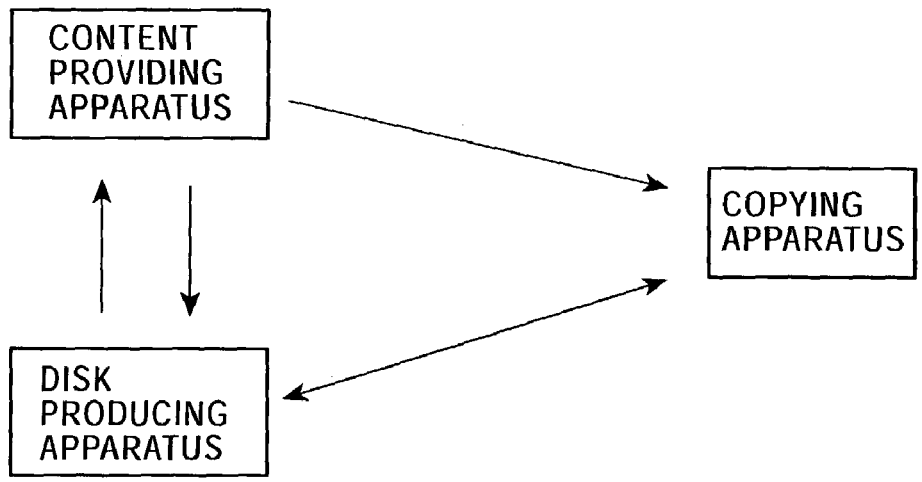
FIG. 34 is a block diagram illustrating a business method in which the present invention is applied.

A business method implementing the present invention may be embodied using a content providing apparatus, a disk producing device (a semiconductor device manufacturing apparatus), and a copying apparatuse as shown in FIG. 34. The content providing apparatus provides information to be recorded on the semiconductor device. A semiconductor device manufacturing apparatus manufactures a semiconductor device having no information recorded thereon. The copying apparatus records the information provided by the content providing apparatus on the semiconductor device having no information recorded thereon. The content providing apparatus, the semiconductor device manufacturing apparatus, and the copying apparatus are owned and operated by different entities (a content provider, a semiconductor device manufacturer, and a copyier).

Figure 35:
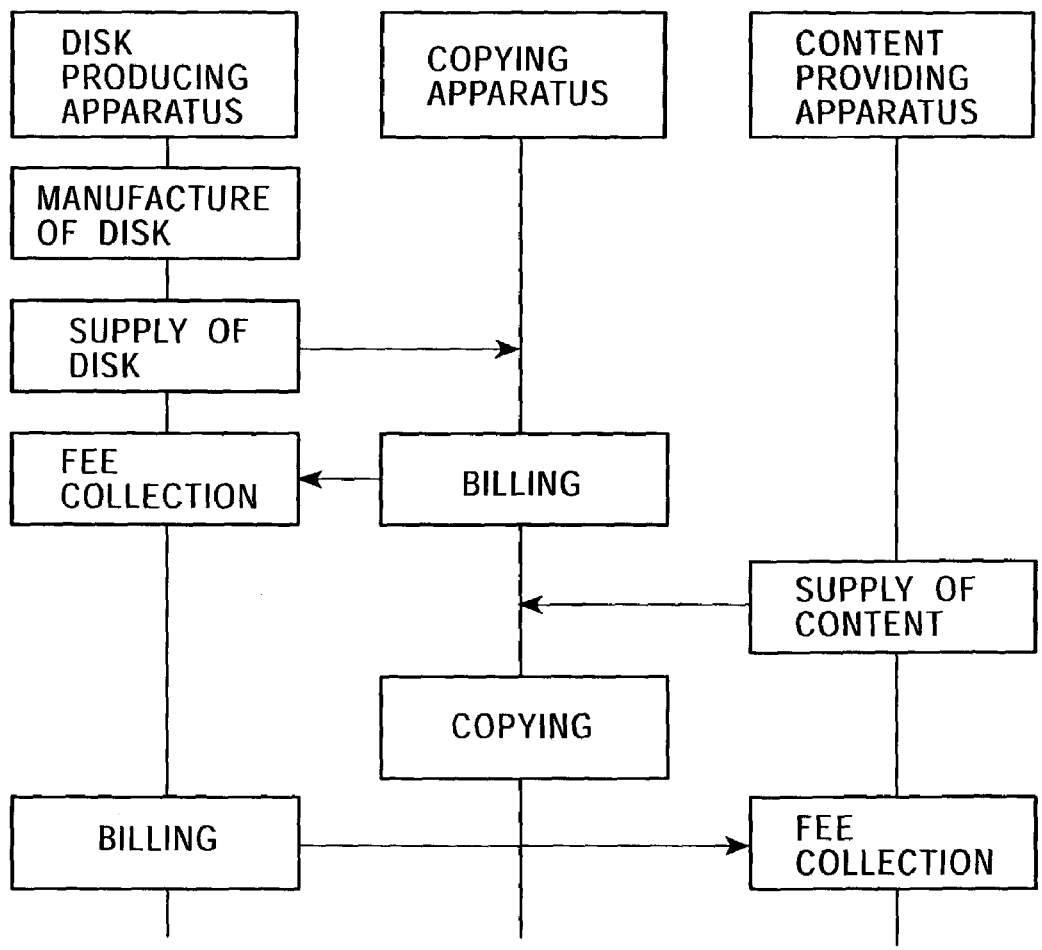
FIG. 35 is a flow diagram illustrating the business method.

As shown in FIG. 35, the semiconductor device manufacturing apparatus (semiconductor device manufacturer) manufactures a semiconductor device, and supplies the semiconductor device to the copying apparatus (copier). The copying apparatus (copier) is charged, and the semiconductor device manufacturing apparatus (semiconductor device manufacturer) collects fees. The fee includes the manufacturing costs of the semiconductor device, and copying fee of a content.

The content providing apparatus (content provider) supplies the copying apparatus (copier) with information (content), and an operation of copying the information is carried out. The semiconductor device subjected to the copying operation has the basic information and additive information recorded in accordance with the present invention. The semiconductor device manufacturing apparatus (semiconductor device manufacturer) is charged, and the content providing apparatus (content provider) collects fees. The fees contain a content copying fee.

The copying apparatus (copier) pays the fees to the semiconductor device manufacturing apparatus (semiconductor device manufacturer) only. Paying to not only the semiconductor device manufacturing apparatus (semiconductor device manufacturer) but also the content providing apparatus (content provider) is assured.

Since the reproduced information is at a quality level higher than the basic information in the semiconductor device, the reproduced information is larger in an amount of information than the basic information. If an attempt to record the reproduced information on a disk type recording medium as is, a large amount of recording medium is required.

Since the calculation data is at a quality level higher than the basic information, the calculation data is larger in an amount of information than the basic data. If an attempt to record the calculation data on a disk type recording medium as is, a large-capacity semiconductor device or a large-capacity disk recording medium is required.

The present invention thus provides a semiconductor device from which data copying is difficult.

What is claimed is:

1. A semiconductor device having a plurality of data recording areas, comprising:

an input port receiving basic information;

an additive data recording area on which additive data serving as information additive to the basic information is recorded;

a processing unit which encodes the basic information based on the basic information and the additive data; and a calculation data recording area on which calculation data encoded by the processing unit is recorded, wherein the calculation data encoded by the processing unit is at a quality level higher than the basic information, and wherein the processing unit controls the additive data recording area in response to a classification of the received basic information, the classification being based on a space class and a motion class.

2. A semiconductor device having a plurality of data recording areas, comprising:

an input port receiving basic data into which basic information is encoded;

a basic data recording area on which the basic data is recorded;

an additive data recording area on which additive data serving as information additive to the basic information is recorded;

a processing unit which performs a calculation process based on the basic data and the additive data; and an output port which outputs calculation data obtained as a result of the calculation process of the processing unit, wherein the calculation data calculated by the processing unit is at a quality level higher than the basic information, and wherein the processing unit controls the additive data recording area in response to a classification of the received basic information, the classification being based on a space class and a motion class.

3. A semiconductor device according to claim 2, wherein the additive data comprises a coefficient which is used in the calculation process performed on the basic data.

4. A semiconductor device according to claim 2, wherein the additive information is generated using a class classification adaptive process.

5. A semiconductor device according to claim 2, wherein the basic information comprises video information, and wherein the calculation data comprises data that corresponds to the video information that is higher in resolution than the basic information.

6. A semiconductor device according to claim 2, wherein the basic information comprises video information, and wherein the calculation data comprises data that corresponds to the video information that is the basic information with noise removed therefrom.

7. A semiconductor device according to claim 2, wherein the basic information comprises video information, and wherein the calculation data comprises data that corresponds to the video information that is higher in time resolution than the basic information.

8. A semiconductor device according to claim 2, wherein the basic information comprises video information, and wherein the calculation data comprises data that corresponds to the video information that is higher in tonal gradation than the basic information.

9. A semiconductor device according to claim 2, further comprising an encoder that encodes the basic information into basic data.

10. A semiconductor device according to claim 2, wherein the basic data is input from an external source to that of the semiconductor device.

11. A semiconductor device according to claim 2, wherein a plurality of pieces of additive data are recorded on the additive data recording area.

12. A semiconductor device according to claim 11, wherein the additive data recording area comprises a additive data selector which selects additive data from a plurality of pieces of additive data and supplies the processing unit with the selected additive data.

13. A semiconductor device according to claim 12, wherein the additive data selector comprises a detector for detecting features of the plurality of pieces of additive data, and an extractor for extracting additive data from the plurality of pieces of additive data in accordance with the detection result of the detector.

14. A semiconductor device according to claim 13, wherein the basic information comprises video information, wherein the feature of the additive data detected by the detector comprises a coefficient representing an amount of motion, and wherein the calculation data comprises data corresponding to information relating to a vibration caused by a vibrator.

15. A semiconductor device according to claim 13, wherein the basic information comprises video information, wherein the feature of the additive data detected by the detector comprises a coefficient representing an amount of motion, and wherein the calculation data comprises data corresponding to information relating to a volume of audio sound reproduced by an audio reproducer.

16. A semiconductor device according to claim 13, wherein the basic information comprises video information, wherein the feature of the additive data detected by the detector comprises a coefficient representing an amount of motion, and wherein the calculation data comprises data corresponding to information relating to a flow of air caused by a blower.

* * * * *